(12) United States Patent
Akiba et al.

(10) Patent No.: US 6,559,967 B1
(45) Date of Patent: May 6, 2003

(54) IMAGE STORAGE APPARATUS

(75) Inventors: Rieko Akiba, Shizuoka-ken (JP);
Hideyuki Ikegami, Shizuoka-ken (JP);
Shunsaku Kondo, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/422,562

(22) Filed: Oct. 21, 1999

(30) Foreign Application Priority Data

Oct. 29, 1998 (JP) ........................................ 308681/1998
Oct. 29, 1998 (JP) ........................................ 308682/1998

(51) Int. Cl.$^7$ ............................................. G06K 15/00
(52) U.S. Cl. ..................................... 358/1.16; 358/1.13
(58) Field of Search ................................ 358/1.1, 1.13, 358/1.16, 401, 403, 444, 296, 300, 437, 450; 400/61, 62, 63, 67, 70, 76; 707/505, 508, 501.1, 522

(56) References Cited

U.S. PATENT DOCUMENTS 5,164,842 A * 11/1992 Gauronski et al. .......... 358/296

* cited by examiner

*Primary Examiner*—Arthur G. Evans
(74) *Attorney, Agent, or Firm*—Fitzpatrick, Cella, Harper & Scinto

(57) ABSTRACT

In order to improve the ease of use of personal boxes provided in a copier connected to a host computer via a network, a large-capacity hard disk is provided. A personal-box region having a plurality of storage regions corresponding to respective users are present within the hard disk. The copier performs control so that a printing mode changed through an operation unit returns to a printing mode set by the host computer in accordance with a predetermined instruction. When a plurality of image data to be printed are selected from a personal box, it is prohibited to change the printing mode set by the host computer.

72 Claims, 42 Drawing Sheets

RIGHT/LEFT OPENING

UP/DOWN OPENING

IMAGE STORAGE APPARATUS

BACKGROUND OF THE INVENTION

1. Field of the Invention

The present invention relates to an image storage apparatus for storing image data in a storage region, and the like.

2. Description of the Related Art

Conventionally, there exist digital copiers, each having a large-capacity hard disk (HD). The large-capacity hard disk is mainly used for executing an electronic sorting function.

The electronic sorting function reads images of all originals to be copied, stores image data representing the respective images on a hard disk, and prints the images by repeatedly performing control of reading the image data page by page in the correct page order. It is thereby possible to discharge copying sheets in a sorted state even if a sorting device having a plurality of bins is not provided.

The digital copier can receive PDL (page discription language) data from a host computer via a network, develop the PDL data into a bit-map image, temporarily store the bit-map image on the hard disk, and print images by reading them from the hard disk.

Recently, digital copiers having a personal-box function have been proposed. The personal-box function provides a storage region on a hard disk for each person (each user, e.g.), temporarily stores images received from a host computer in the region (the personal box) assigned to the user in question by the host computer, and prints the images from the personal box.

When printing image data from a personal box, the user assigns the personal box through an operation unit of the digital copier, selects desired image data from among the image data stored in the assigned personal box, and prints images represented by the selected image data.

Image data is stored in a personal box so as to correspond to a printing mode (the number of copies of the image data, the size of recording sheets to be output, sheet discharging processing, and the like) set in advance by the host computer. The digital copier prints the image data based on the printing mode set in advance by the host computer.

In printing image data from a personal box, it has been proposed to select a plurality of desired image data from among image data stored in the personal box, and to print the plurality of image data at a time.

It has also been proposed to allow a change of the printing mode set by the host computer through the operation unit of the digital copier.

However, when allowing a change of the printing mode set by the host computer through the operation unit, in order to reset the printing mode to the printing mode set previously by the host computer, the user must memorize the printing mode set by the host computer, resulting in a complicated operation for the user and additional time and labor for the user.

When selecting a plurality of desired image data from among image data stored in a personal box and also changing the printing mode set by the host computer through the operation unit, the user must keep in mind all the respective printing modes for the plurality of desired image data and change the printing mode accordingly, again resulting in a complicated operation for the user and the possibility that the user makes a mistake and does not obtain the printout of desired data.

SUMMARY OF THE INVENTION

It is an object of the present invention to provide an image storage apparatus in which the above-described problems are solved.

It is another object of the present invention to improve the ease of use of a storage region for storing image data in an image storage apparatus.

According to one aspect of the present invention, an image storage apparatus includes storage means for storing a series of image data in a storage region and storing an image forming mode corresponding to the series of image data, changing means for changing the image forming mode stored in the storage means, and control means for returning or resetting the image forming mode, as changed by the changing means, to a state before being stored in the storage means, in accordance with a predetermined instruction.

According to another aspect of the present invention, an image storage apparatus includes storage means for storing a plurality of respective series of image data in a storage region and storing an image forming mode corresponding to each series of image data, and control means for executing a first step, in which one series of image data of the plurality of respective series of image data stored in the storage region is selected, a second step, in which an image forming mode corresponding to the series of image data selected in the first step is changed, and a third step, in which a shift from the first step to the second step is prohibited in accordance with selection of at least two series of image data in the first step.

According to still another aspect of the present invention, a method for controlling an image storage apparatus including storage means for storing a series of image data in a storage region and storing an image forming mode corresponding to the series of image data, includes a changing step, in which the image forming mode stored in the storage means is changed, and a control step, in which the image forming mode changed in the changing step is returned or reset to what it was before storage of a mode in the storage means, in accordance with a predetermined instruction.

According to yet another aspect of the present invention, a method for controlling an image storage apparatus including storage means for storing a plurality of respective series of image data in a storage region and storing an image forming mode corresponding to each series of image data, includes a first step, of selecting one series of image data of the plurality of respective series of image data stored in the storage region, a second step, of changing an image forming mode corresponding to the series of image data selected in the first step, and a third step, of prohibiting a shift from the first step to the second step in accordance with selection of at least two series of image data in the first step.

According to yet a further aspect of the present invention, a storage medium capable of being read by a computer stores a program for causing an image storage apparatus, including storage means for storing a series of image data in a storage region and storing an image forming mode corresponding to the series of image data, to execute a changing step, of changing the image forming mode stored in the storage means, and a control step, of returning or resetting the image forming mode changed by the changing means to what it was before mode storage in the storage means, in accordance with a predetermined instruction.

According to still another aspect of the present invention, a storage medium capable of being read by a computer stores a program for causing an image storage apparatus, including storage means for storing a plurality of respective series of image data in a storage region and storing an image forming mode corresponding to each series of image data, to execute a first step, of selecting one series of image data of the plurality of respective series of image data stored in the storage region, a second step, of changing an image forming mode corresponding to the series of image data selected in the first step, and a third step, of prohibiting a shift from the first step to the second step, in accordance with selection of at least two series of image data in the first step.

The foregoing and other objects, advantages and features of the present invention will become more apparent from the following description of the preferred embodiment taken in conjuction with the accompanying drawings.

DESCRIPTION OF THE PREFERRED EMBODIMENT

Figure 1:
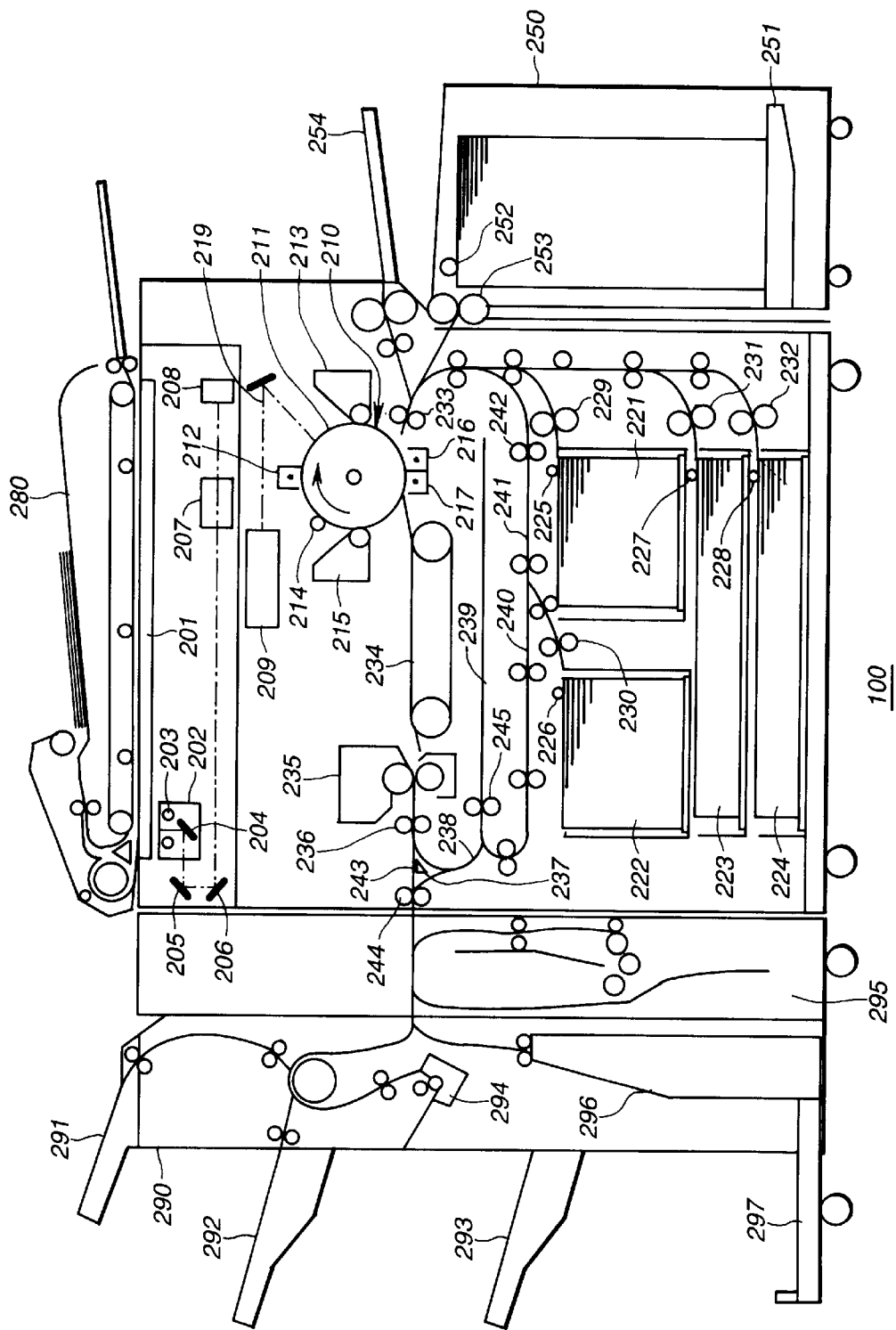
FIG. 1 is a cross-sectional view of a copier.

FIG. 1 is a cross-sectional view illustrating a copier 100 according to a preferred embodiment of the present invention.

An automatic document feeder (DF) 280 is provided at an upper portion of the copier 100. An original is mounted on platen glass 201. A scanner 202 includes an original-illuminating lamp 203, a scanning mirror 204 and the like.

The scanner 202 is caused to perform reciprocating scanning in predetermined directions by a motor (not shown). Reflected light from the original is focused onto a CCD (charge-coupled device) sensor within an image sensor unit 208 afte being reflected by scanning mirrors 204–206 and passing through a lens 207.

An exposure control unit 209 includes a laser, a polygonal scanner and the like, and projects a laser beam 219, modulated based on an image signal subjected to predetermined image processing after being converted into an electrical signal by the image sensor unit 208, onto a photosensitive drum 211.

A primary charger 212, a developing unit 213, a transfer charger 216, a pre-exposure lamp 214 and a cleaning device 215 are disposed around the photosensitive drum 211.

In an image forming unit 210, the photosensitive drum 211 is rotated in a direction indicated by the arrow by a motor (not shown), and is charged to a desired potential by the primary charger 212. The laser beam 219 from the exposure control unit 209 is projected onto the photosensitive drum 211, to form an electrostatic latent image. The electrostatic latent image formed on the photosensitive drum 211 is developed by the developing unit 213, to form a visualized toner image.

A recording sheet fed from a right cassette deck 221, a left cassette deck 222, an upper cassette 223 or a lower cassette 224 via a pickup roller 225, 226, 227 or 228 is fed toward the copier main body by a pair of sheet feeding rollers 229, 230, 231 or 232, respectively. The recording sheet is further fed to a transfer belt 234 by a pair of registration rollers 233, and the visualized toner image is transferred onto the recording sheet by a transfer charger 216. Toner particles remaining on the photosensitive drum 211 after the image transfer are cleaned off by the cleaning device 215, and charges remaining on the photosensitive drum 211 are erased by the pre-exposure lamp 214. The recording sheet after the image transfer is separated from the photosensitive drum 211 by a separation charger 217, and is fed to a fixing unit 235 by the transfer belt 234. The fixing unit 235 fixes the image on the recording sheet by means of pressure and heat, and the recording sheet is then discharged to the outside of the copier 100 by a pair of discharging rollers 236.

A deck 250 capable of accommodating, for example, 4,000 recording sheets is mounted in the copier 100. A lifter 251 of the deck 250 is raised in accordance with the number of recording sheets so that the top of the stack of recording sheets always contact a pickup roller 252, and the recording sheets are individually fed to the copier main body by a pair of sheet feeding rollers 253. A multisheet manual insertion tray 254 capable of accommodating 100 recording sheets is also mounted on the copier 100.

A sheet discharging flapper 237 performs switching between a conveying path 238 and a discharging path 243. A lower conveyance path 240 guides the recording sheet fed from the sheet discharging rollers 236 to a sheet refeeding path 241 via a reversal path 239 by turning the recording sheet. A recording sheet fed from the left cassette deck 222 by the sheet feeding rollers 230 is also guided to the sheet refeeding path 241.

Sheet refeeding rollers 242 refeed the recording sheet to the image forming unit 210. Sheet discharging rollers 244 are disposed near the sheet discharging flapper 237, and discharge the recording sheet switched to the discharging path 243 by the sheet discharging flapper 237 to the outside of the copier 100. When performing duplex recording (copying on both surfaces of a recording sheet), a recording sheet having an image formed on one surface thereof is guided to the sheet refeeding path 241 via the conveyance path 238, the reversal path 239 and the lower conveyance path 240 by raising the sheet discharging flapper 237 upward. At that time, the recording sheet is drawn into the reversal path 239 to a position in which the trailing edge of the recording sheet completely leaves the conveyance path 238, by reversal rollers 245, and the recording sheet is grasped by the reversal rollers 245, and is then fed to the conveyance path 240 by inversely rotating the reversal rollers 245.

When discharging the recording sheet from the copier main body by being reversed, by raising the sheet discharging flapper 237 upward, drawing the recording sheet by the reversal rollers 245 into the reversal path 239 to a position of a state in which the trailing edge of the recording sheet remains in the conveyance path 228, and then inversely rotating the reserval rollers 245, the recording sheet is fed to the discharging rollers 244 in a state of being turned (i.e., with the side which has already been rcorded or arranged to face away from drum 211).

A sheet discharging processing apparatus 290 aligns recording sheets individually discharged from the copier 100 in a state of being mounted on a processing tray 294. Upon completion of discharge of one copy of recording sheets, a bundle of the recording sheets is stapled (if stapling is called for) and discharged onto a discharged-sheet tray 292 or 293. The discharged-sheet tray 293 is subjected to vertical movement control by a motor (not shown), and is moved to the position of the processing tray 294 before starting an image processing operation.

A sheet tray 291 mounts delimiting sheets to be inserted between discharged recording sheets. A Z folding machine 295 performs Z folding of discharged recording sheets, if appropriate. A binding machine 296 performs binding (again, if appropriate) by folding a copy of discharged recording sheets along a center line and stapling the folded recording sheets. The bound bundle is discharged onto a discharged-sheet tray 297.

Figure 2:
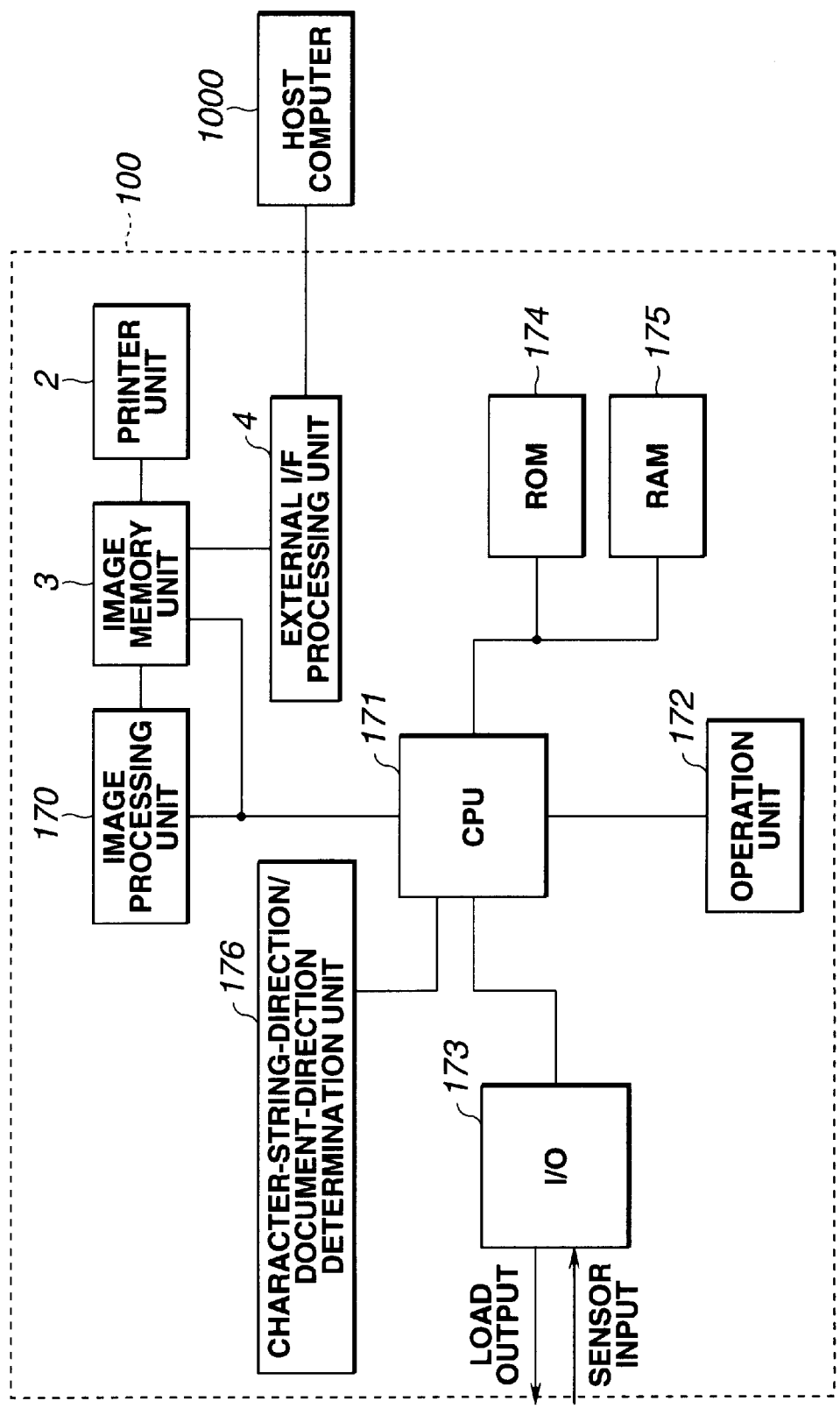
FIG. 2 is a block diagram illustrating the configuration of control within the copier shown in FIG. 1.

FIG. 2 is a block diagram illustrating the configuration of control within the copier 100. In FIG. 2, a CPU (central processing unit) 171 performs basic control of the copier 100. Each of a ROM (read-only memory) 174 in which control programs are written, a working RAM (random access memory) 175 for performing processing, and an input/output I/O) port 173 is connected to the CPU 171 via an address bus or a data bus.

Various additional components (not shown), such as motors, clutches and the like, for controlling the copier 100, and a sensor for detecting the position of a sheet (not shown) are connected to the input/output port 173. The CPU 171 sequentially performs input/output control via the input/output port 173, and executes an image forming operation.

An operation unit 172 for displaying the state of the copier 100 is connected to the CPU 171. An image processing unit 170 for performing processing for an electrical signal obtained from the image sensor unit 208, and an image memory unit 3 for storing image data processed by the image processing unit 170 are also connected to the CPU 171.

An external I/F (interface) processing unit 4 develops PDL data from a host computer 1000 (serving in this illustration as an external apparatus) into bit-map data, and outputs the bit-map data to the image memory unit 3.

Figure 3:
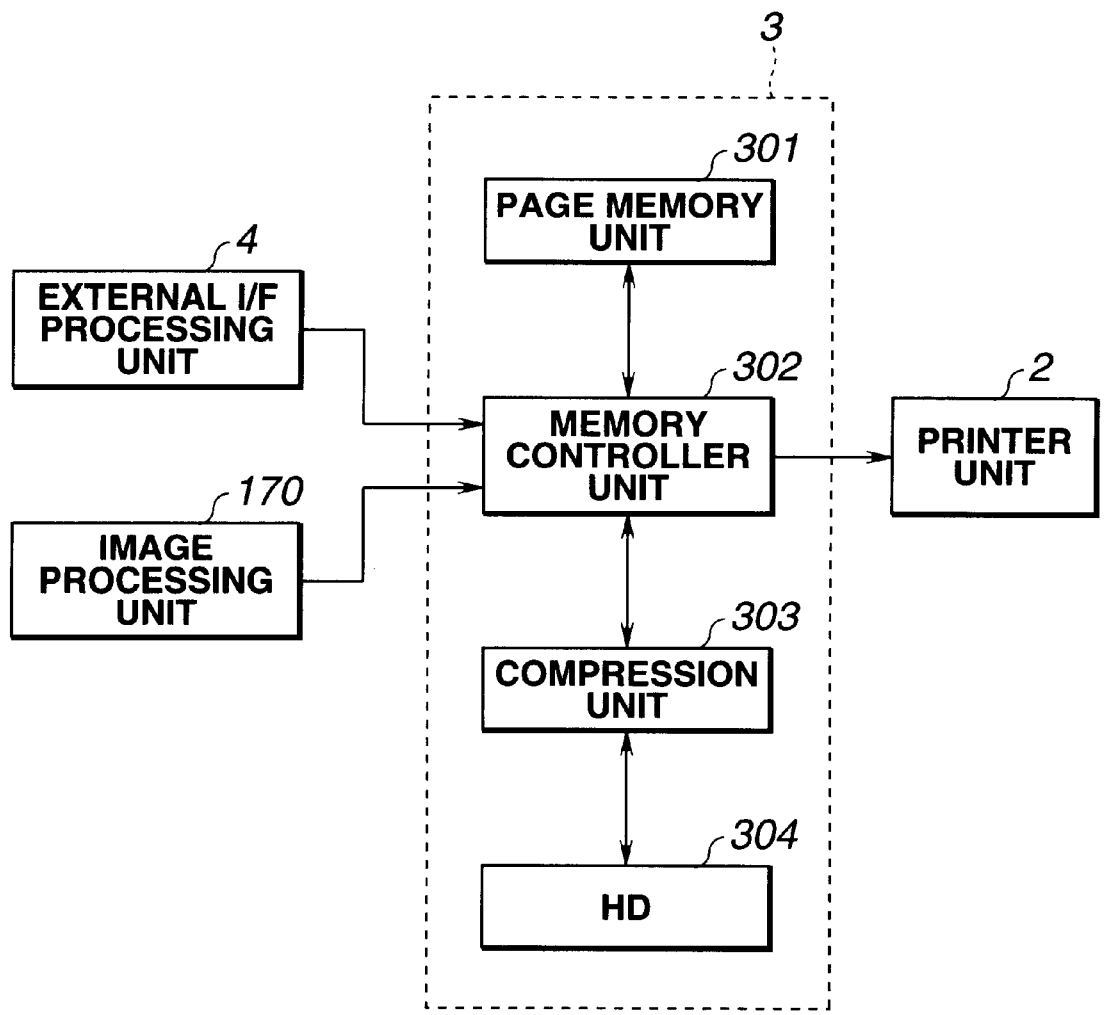
FIG. 3 is a block diagram illustrating the configuration of an image memory unit shown in FIG. 2.

The image memory unit 3 will now be described in detail with reference to FIG. 3. The image memory unit 3 includes a page memory unit 301 comprising a memory, such as a DRAM (dynamic RAM) or the like, a memory controller unit 302, a compression unit 303, and a hard disk (hereinafter abbreviated as "HD") 304.

In the image memory unit 3, writing processing is performed so as to write binary image data from the external I/F unit 4 or the image processing unit 170 into the page memory unit 301 via the memory controller unit 302, and processing to read image data to the printer unit 2 is also performed.

In the image memory unit 3, input/output access to write/read image data to/from the HD 304, serving as a large-capacity storage medium, is also performed. In the compression unit 303, compression processing and decompression processing are performed in accordance with input/output of image data to/from the HD 304.

The memory controller unit 302 generates a DRAM refreshing signal for the page memory unit 301, and also arbitrates access to the page memory unit 301 from the external I/F unit 4, the image processing unit 170 and the HD 304. The memory controller unit 302 also controls a write address to the page memory unit 301, a read address from the page memory unit 301, the direction of reading, or the like in accordance with an instruction from the CPU 171. The CPU 171 thereby controls layout processing of arranging a plurality of original-image data in the page memory unit 301, output processing of image data to the printer unit 2, processing of segmenting only a part of an image and outputting the segmented image, and image rotation processing.

Figure 4:
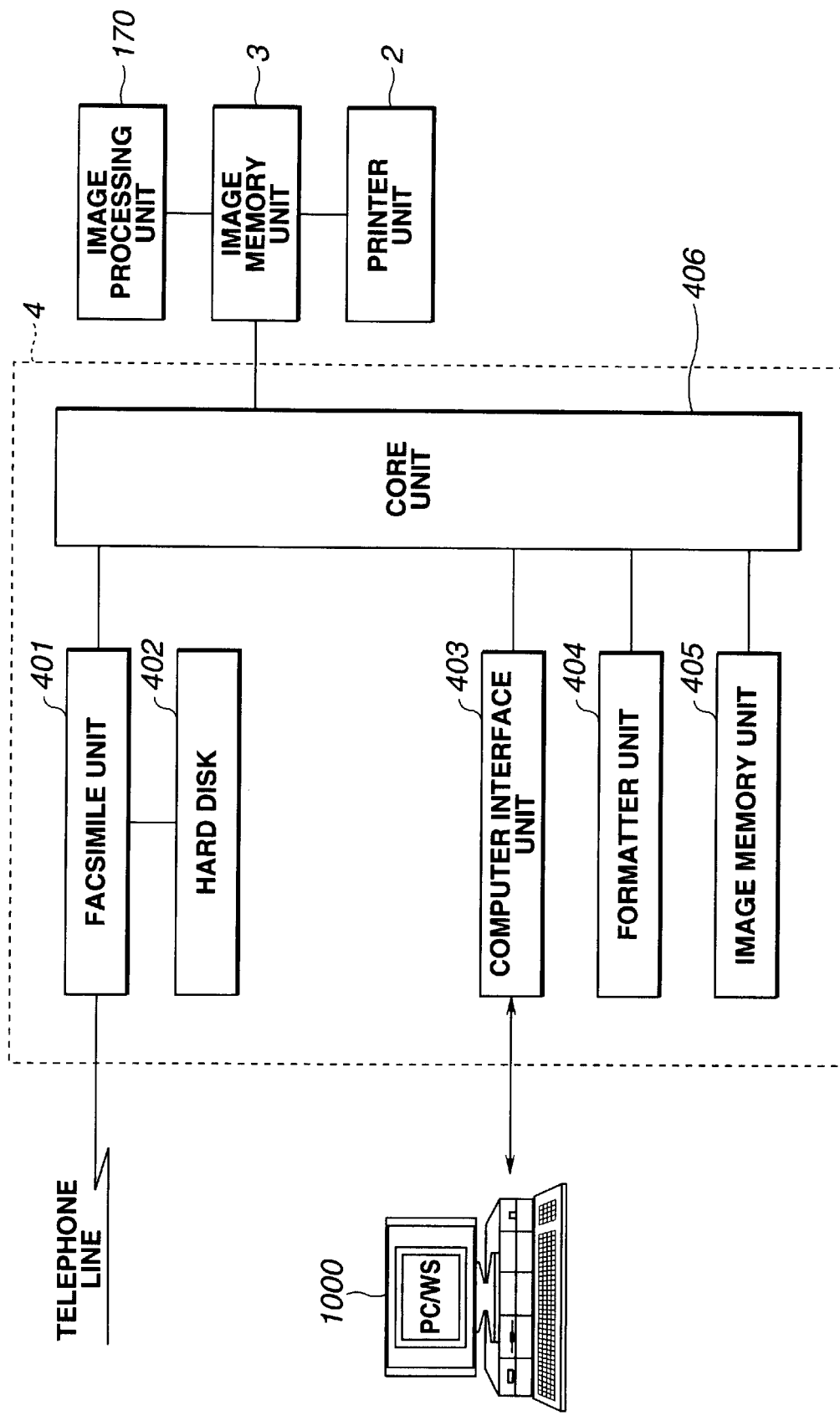
FIG. 4 is a block diagram illustrating the configuration of an external I/F unit shown in FIG. 2.

The configuration of the external I/F processing unit 4 will now be described with reference to FIG. 4. The external I/F processing unit 4 receives image data from the host computer 1000, and outputs the image data to the printer unit 2 via the image memory unit 3.

The external I/F processing unit 4 includes a core unit 406, a facsimile unit 401, a hard disk 402 for preserving communication image data of a facsimile unit 401, a computer interface unit 403 for connecting the external processing unit 4 to the host computer 1000, a formatter unit 404, and an image memory unit 405.

The facsimile unit 401 is connected to a public network via a modem (not shown), and performs reception of facsimile communication data from the public network, and transmission of facsimile communication data to the public network.

In the facsimile unit 401, processing for image data for facsimile communication stored on the hard disk 402 so as to perform facsimile transmission at an assigned time and transmission of image data in response to an inquiry using an assigned password from the communication partner, serving as a facsimile function, is performed.

Thus, when executing the facsimile function for image data stored on the hard disk 402, facsimile transmission can be performed without using the image memory unit 3.

The computer interface unit 403 performs data communication with the host computer 1000, and includes a local area network (hereinafter abbreviated as "LAN"), a serial I/F (interface), an SCSI (small computer system interface), a Centronics I/F for data input from a printer, and the like. The state of the copier 100 is communicated to the host computer 1000, image data read by the copier 100 is transferred to the host computer 1000 based on an instruction from the host computer 1000, and image data is received from the host computer 1000, via the computer interface unit 403.

Since printing data communicated from the host computer 1000 via the computer interface unit 403 is described in dedicated printer codes, the formatter unit 404 converts the printer codes into raster-image data. The formatter unit 404 also develops the raster-image data in the image memory 405. The image memory unit 405 is thus used as a memory for developing raster-image data. The image memory unit 405 is also used in a case in which, when transmitting an image read by the copier 100 to the host computer 1000 via the computer interface unit 403 (an image scanner function), image data from the image memory unit 3 is developed and converted into a data format suitable for transmission to the host computer 1000, and the resultant data is transmitted from the computer interface unit 403.

The facsimile unit 401, the computer interface unit 403, the formatter unit 404 and the image memory unit 405 are connected to the core unit 406, which controls data transfer with the image memory unit 3. Thus, even if the external I/F processing unit 4 has a plurality of image output units, or only one image transfer channel to the image memory unit 3 is provided, image output is effected by performing exclusive control and priority control under the control of the core unit 406.

Figure 5:
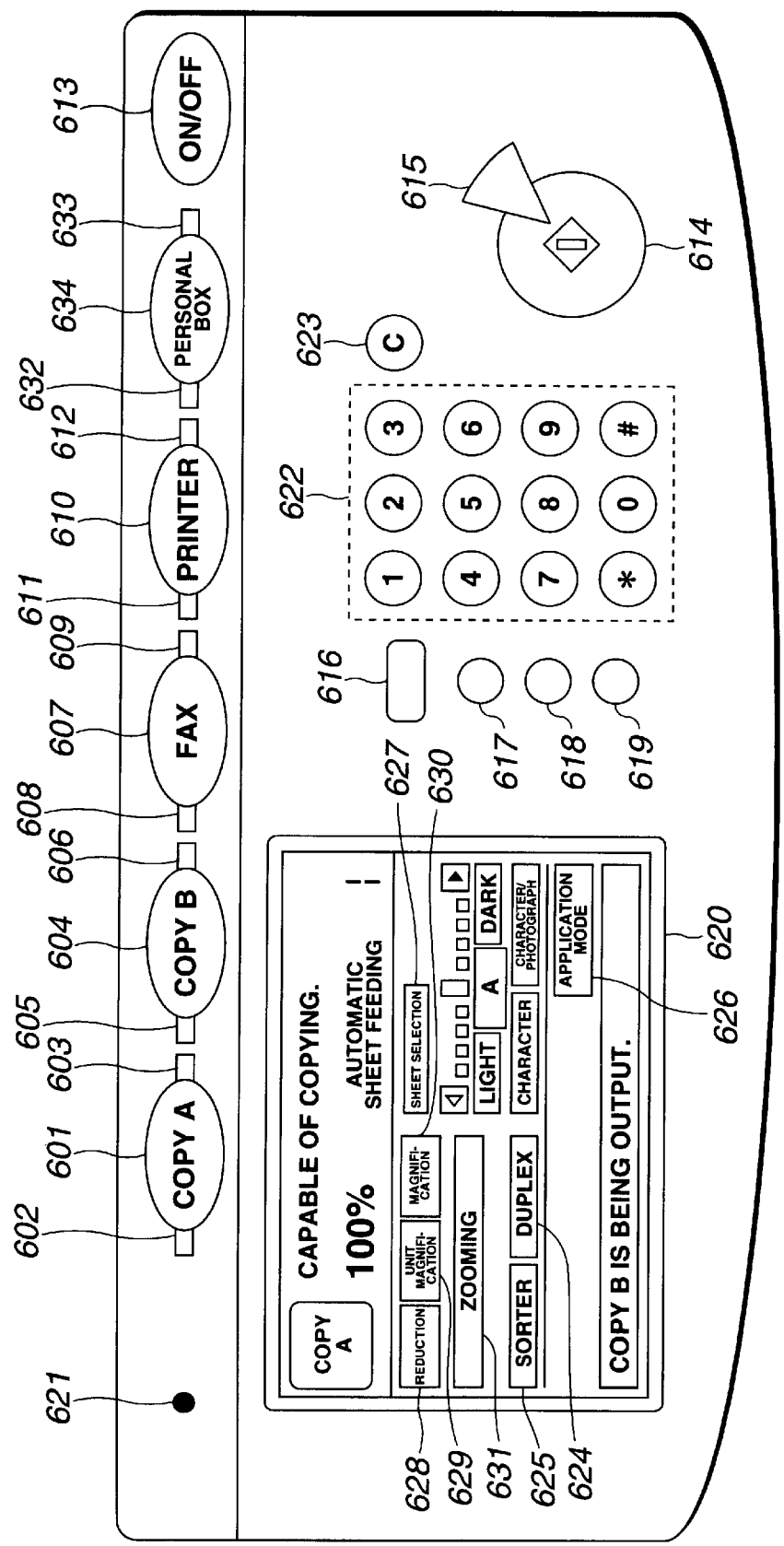
FIG. 5 is a diagram illustrating an operation unit shown in FIG. 2.

FIG. 5 is a diagram illustrating the operation unit 172 of the copier 100. A power lamp 621 indicates that the power supply of the copier 100 is turned on. A power switch 613 is lit/unlit in accordance with the on/off state of the power supply, respectively. A ten-digit keypad 622 is used when inputting a numerical value in order to set the number of copies, an operation mode, or the like, and is also used when inputting a telephone number on a facsimile-setting picture frame.

A clear key 623 is used when clearing setting input through the ten-digit keypad 622. A reset key 616 is used when returning or resetting a mode, such as the set number of copies, the operation mode, the selected sheet feeding stage or the like, to a predefined or default value.

By depressing a start key 614, an image forming operation is started. Red and green LEDs (light-emitting diodes, not shown) indicating whether or not image forming processing can be started, are provided at the center of the start key 614. When an image forming operation cannot be started, the red LED is lit, and when an image forming operation can be started, the green LED is lit.

A stop key 615 is used to stop a copying operation. If another key is depressed after depression of a guide key 617, the description of the function capable of being set by that other key is displayed on a display panel 620. To release this guide display, the guide key 617 is again depressed.

A user setting key 618 is used when the user intends to change the setting of the copier 100. Settings which can be changed by the user are, the time until the setting for the copier 100 is automatically cleared, setting of a predefined value for a mode when the reset key 618 is depressed, and the like. When an interrupt key 619 is depressed during an image forming operation, the image forming operation is interrupted, and a copying operation can then be performed without using the automatic document feeder 280.

The display panel 620 is configured by a liquid crystal and the like. The contents of display on the display panel 620 are switched in accordance with a setting mode, in order to facilitate detailed mode setting. The picture surface of the display panel 620 is configured by a touch panel. By touching a portion within a frame for a displayed function on the touch panel the function can be realized.

A picture frame for setting a copying operation mode is displayed on the display panel 620 shown in FIG. 5. Keys 624, 625, 626, 627, 628, 629, 630 and 631 are displayed within the display panel. By depressing one or more of these keys, mode setting for the copier 100 is performed.

A duplex-printing setting key 624 sets duplex printing, and is used when setting a "simplex-duplex mode", in which two simplex originals (each having an image only on one surface) are output as a duplex original, a "duplex-duplex mode", in which a duplex original is output as a duplex original, a "duplex-simplex mode", in which a duplex original is output as two simplex original, and the like.

A key 627 is used for selecting a sheet type. Keys 628, 629, 630 and 631 are used when setting a copying magnification in a copying operation.

An application-mode key 626 is used when setting an applicational function mode, such as a pamphlet mode, in which image forming processing is performed in an order suitable for forming a pamphlet, a multiplex operation, a reduced-layout mode, a magnified layout mode, a cover/combined sheet mode for inserting a cover and combined sheets in recording sheets, or the like. By depressing the application-mode key 626, a picture frame for setting one of the above-described applicational function modes.is displayed on the display panel 620. The user sets an applicational function mode on this picture frame.

By indicating the portion of each key which cannot be used from among keys displayed within the display panel 620 with broken lines (halftone dot meshing), it is shown that the key cannot be operated.

At an upper portion within the display panel 620, each of the set contents of the copying operation and the current state of the operation is displayed within a range of one line. FIG. 5 illustrates a setting picture frame for copy A.

At a lower portion within the display panel 620, the operational state of another functional mode is displayed within a range of one line. In the case of FIG. 5, it is indicated that copy B is being output to the printer unit.

In FIG. 5, each of a copy-A function key 601, a copy-B function key 604, the facsimile function key 607, a printer function key 610, and a personal-box key 634 (to be described later) is used when switching the contents of display on the display panel 620 of the operation unit in order to set each function of a copying operation and a system operation.

Each of these function keys is configured by a semi-transparent key button, and a display lamp (not shown), such as an LED or the like, is provided within the key. When the user selects one of these keys, only the lamp within the key corresponding to the selected operational picture frame is lit, and lamps within other keys are not lit. Green LEDs 603, 606, 609, 612 and 633 disposed at the right of the corresponding function keys are turned on/off so as to indicate the states of operations of the corresponding functions.

For example, by depressing the copy-B function key 604, the operational picture frame for copy B is displayed on the display panel 620. When copy B is in a standby state, the LED 606 for copy B is not lit. When the copy B is being output as shown in FIG. 5, the LED 606 for copy B is flashed. When the image of copy B is stored on the HD 304 of the image memory unit 3 and a printing operation of copy B is not performed, the LED 606 is lit.

The LED 609 of the facsimile function key 607 is flashed during a communication operation, a printing operation or an operation of reading received data, and is lit when a facsimile image is stored on the hard disk 402 of the facsimile unit.

Each of LEDs 602, 605, 608, 611 and 632 disposed at the left of the keys 601, 604, 607, 610 and 634, respectively, is lit when an abnormality occurs in the corresponding function so as to indicate the abnormality.

For example, the LED 605 for copy B is flashed when an abnormality, such as interruption due to absence of sheets, a sheet jam or the like, has occurred. At that time, by depressing the copy-B function key 604 in order to switch to the copy-B function, the state of abnormality of that function is displayed on the display panel 620, so that the details of the abnormality can be known.

The above-described function keys 601, 604, 607, 610 and 634 can be depressed irrespective of operational states. By changing the contents to be displayed on the display panel 620, the operation unit is switched.

Each of keys which are not provided within the display panel 620, such as the above-described stop key 615, start key 614, reset key 616, and the like, can perform an operation corresponding to a function selected from the functions of the copy-A function key 601, the copy-B function key 604, the facsimile function key 607, the printer function key 610 and the personal-box key 634 (to be described later).

Accordingly, for example, even if the stop key 615 is depressed while the operational picture frame for copy A is displayed on the display panel 620, the output operation of copy B is not stopped.

A copying operation of copy B is stopped while the operational picture,frame for copy A is displayed on the display panel 620 by depressing the stop key 615 after switching the operational picture frame by depressing the copy-B function key 604.

Since the contents changed through the user setting key 618 are for the function selected at the time of the change, the contents can be set for each function.

A description will now be provided of a method for setting duplex printing, with reference to FIGS. 6, 7, 8, 9, 10, 11 and 12. Duplex printing indicates printing on both surfaces of a recording sheet: for example, output of a duplex original from two simplex originals.

Figure 6:
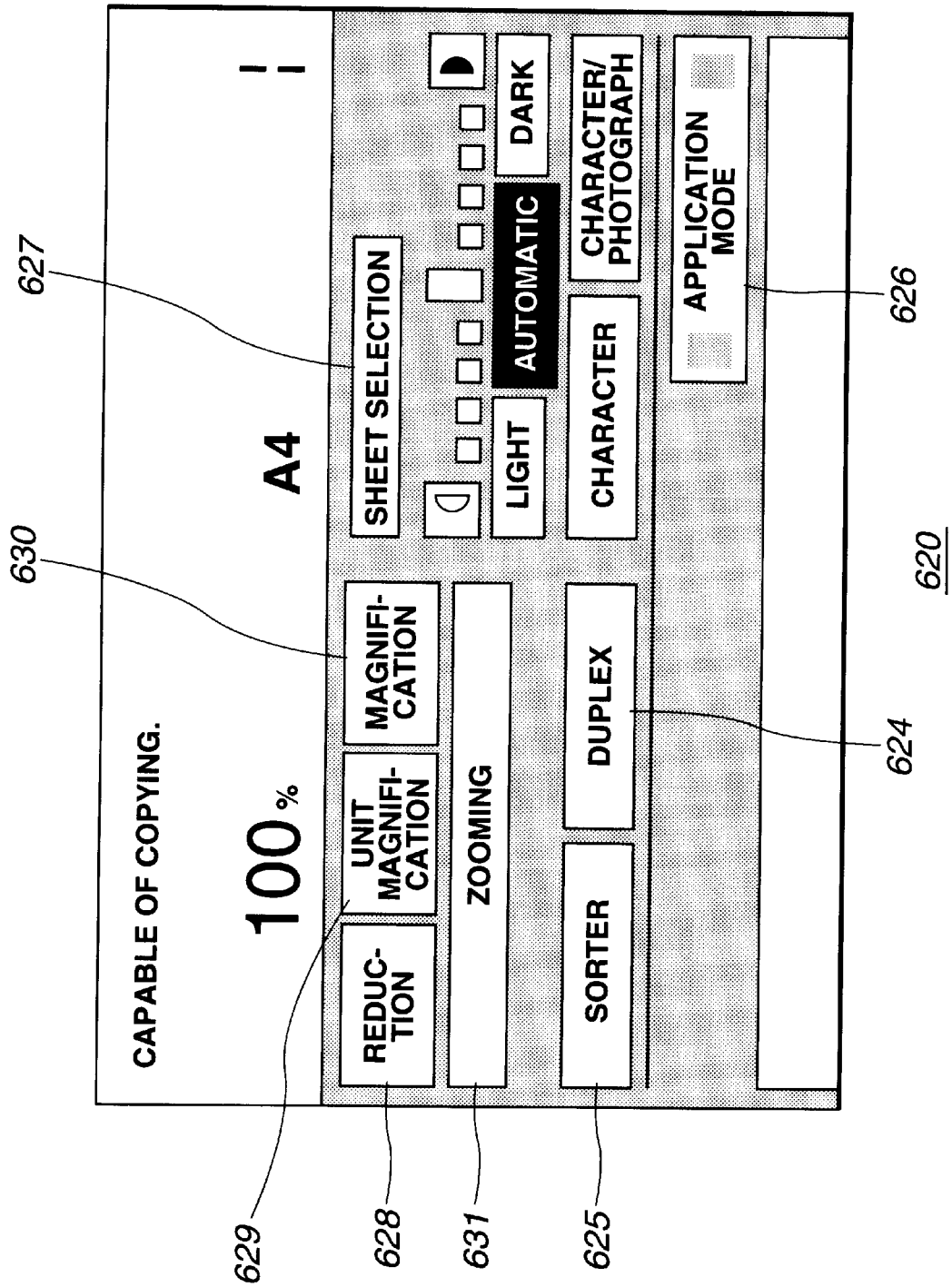
FIGS. 6–8 are diagrams, each illustrating a picture frame on the operation unit shown in FIG. 5.
Figure 7:
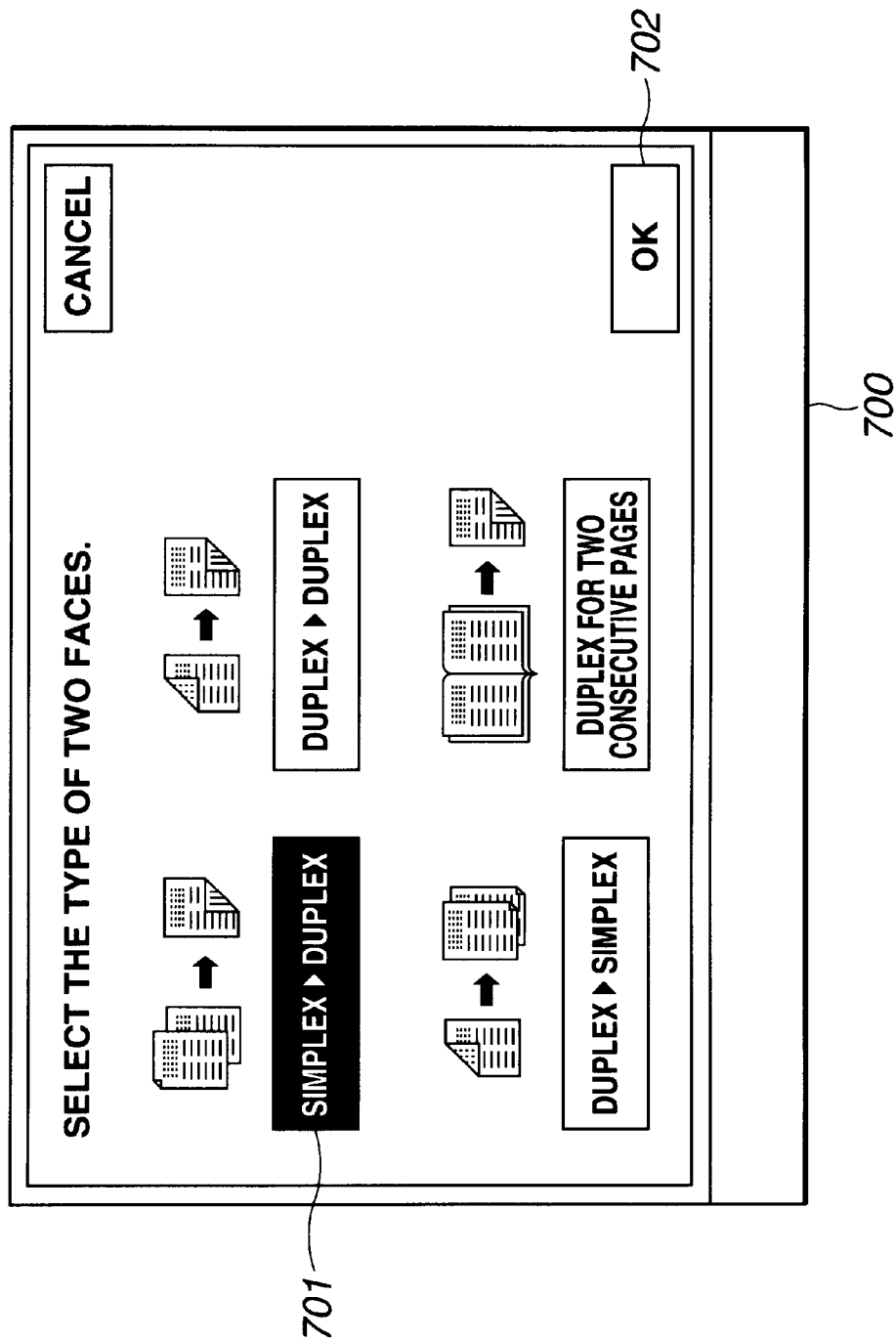

FIG. 6 is a diagram illustrating the basic picture frame on the display panel 620 of the operation unit shown in FIG. 5. When the user depresses the duplex-printing setting key 624 on this picture frame, the picture frame is switched to a picture frame shown in FIG. 7. FIG. 7 illustrates a picture frame 700 for setting duplex printing.

In this case, a method for performing duplex printing from simplex originals wil be described. When the user depresses a setting key 701 shown in FIG. 7, the setting key 701 is subjected to black-and-white reversal display, and a state of being capable of selecting setting is provided. When the user depresses an OK key 702 in this state, the picture frame 700 is switched to a picture frame shown in FIG. 8.

Figure 8:
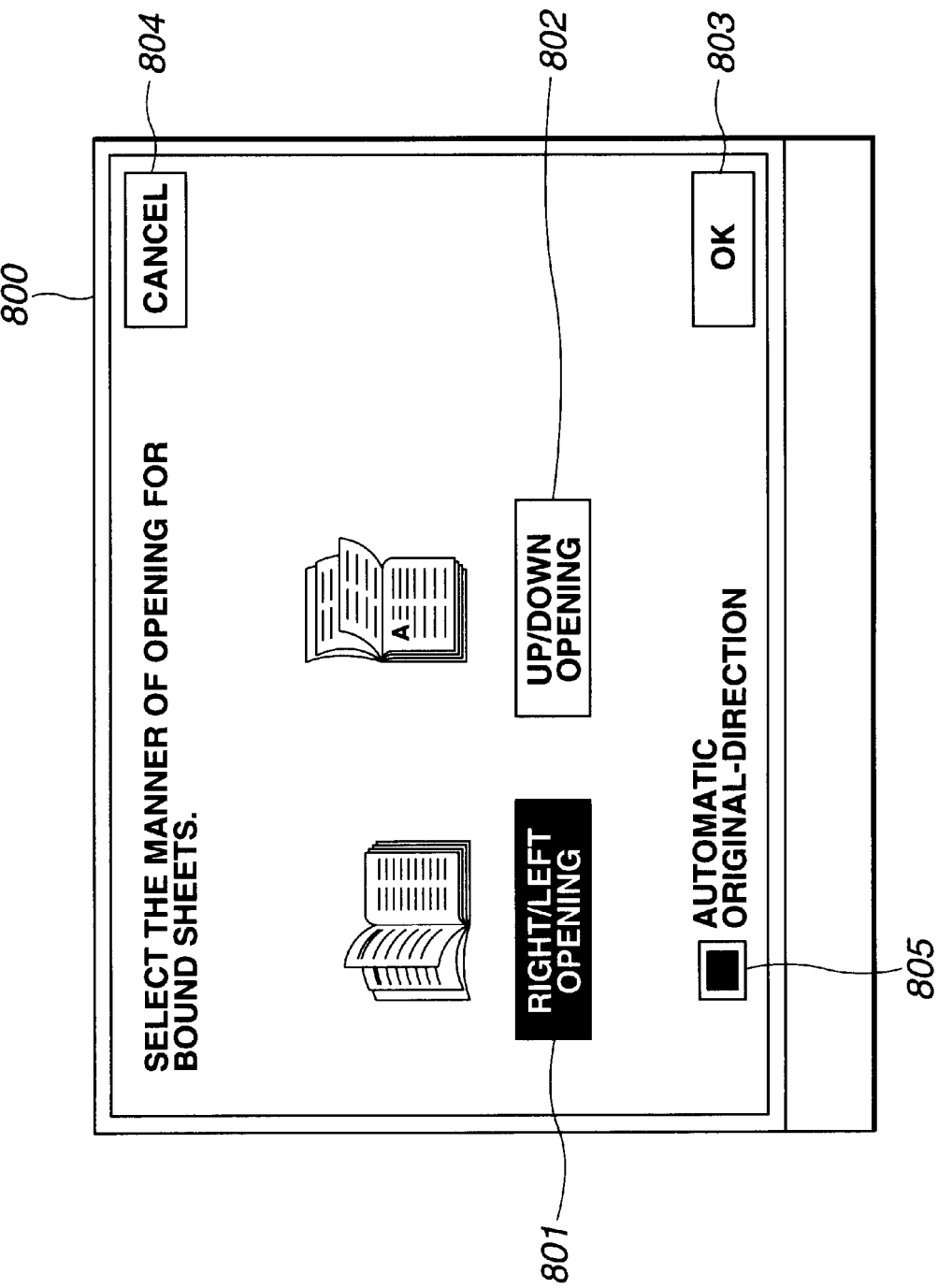

A picture frame 800 shown in FIG. 8 is for setting a manner of opening copied sheets output in duplex printing setting selected in the picture frame 700 shown in FIG. 7. In the case of FIG. 8, a picture frame for setting a manner of opening copied sheets obtained by performing duplex printing of simplex originals is shown.

Figure 9:
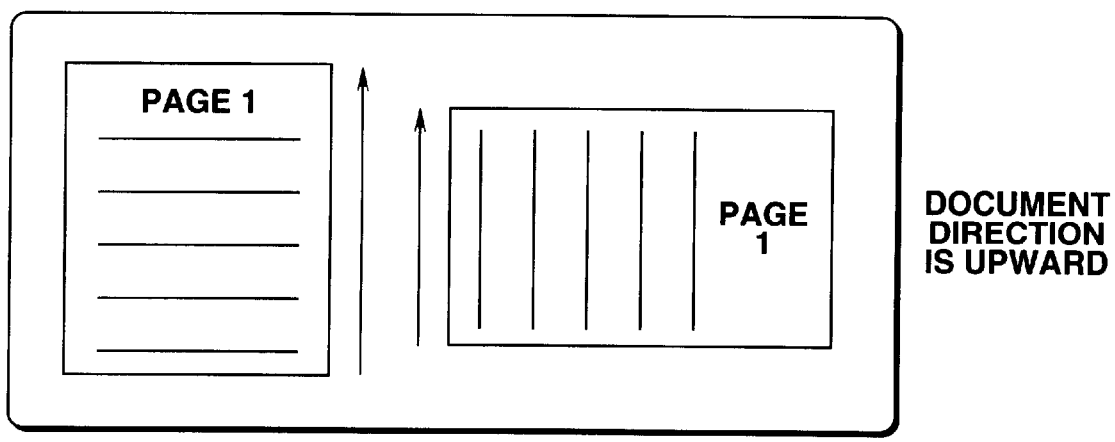
FIG. 9 is a diagram for defining the direction of a document.

The user selects one of right/left opening and up/down opening, using the corresponding one of setting keys 801 and 802. In this embodiment, the direction (orientation) of document (portrait or landscape) is defined as shown in FIG. 9.

Figure 10:
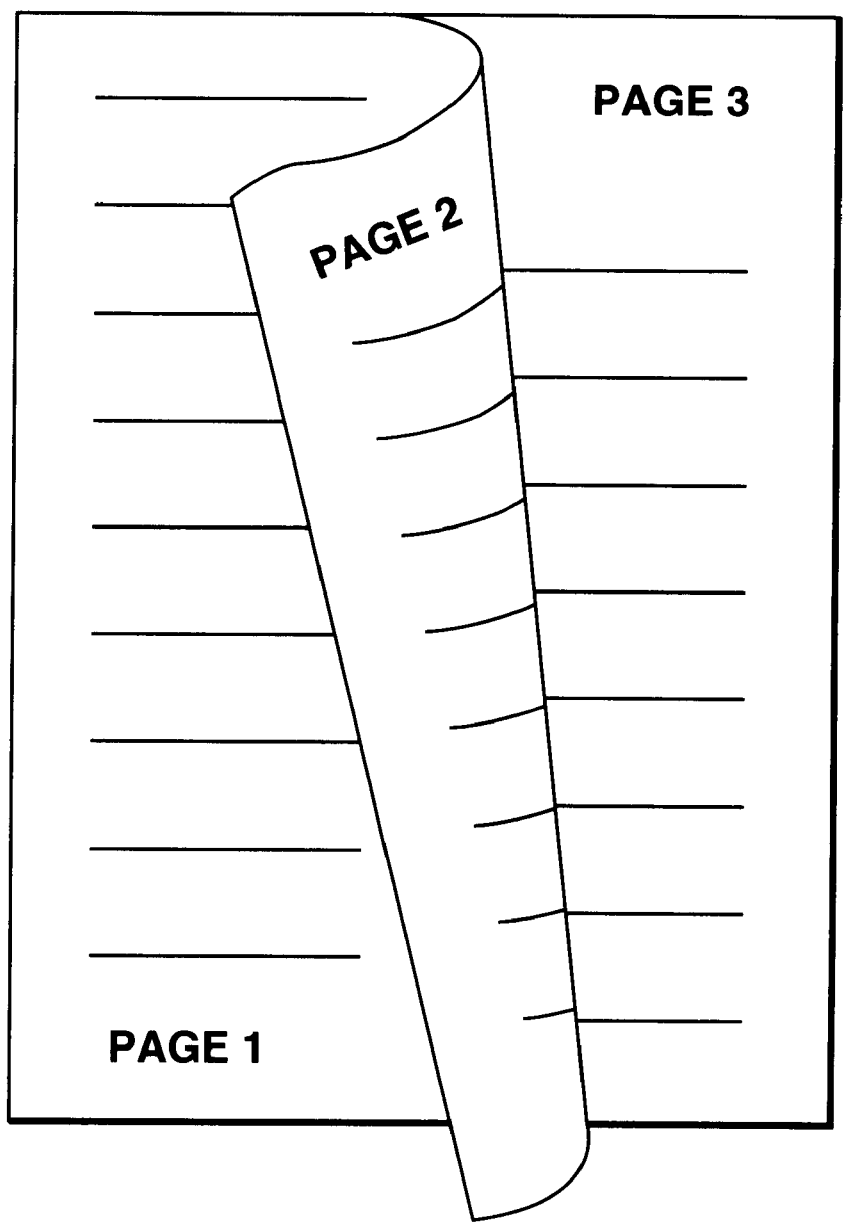
FIG. 10 is a diagram illustrating right/left opening.
Figure 11:
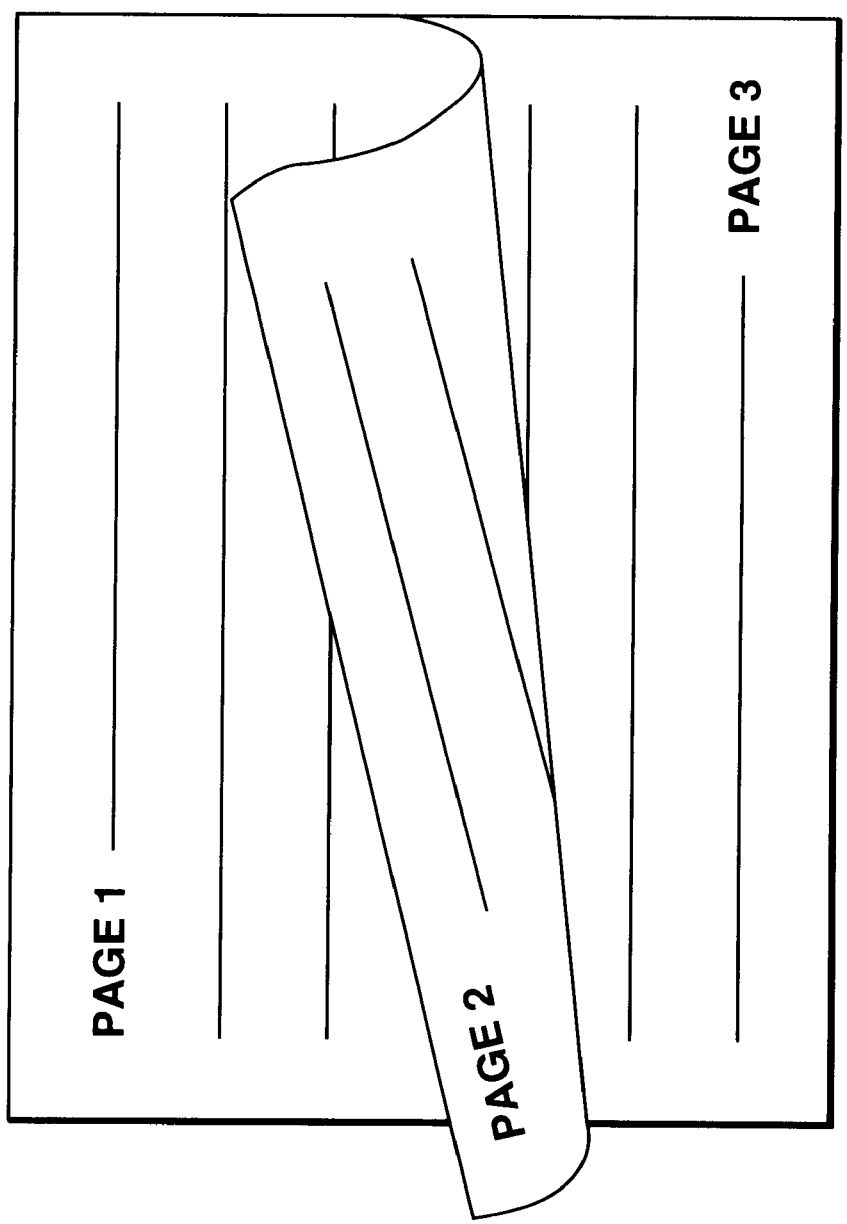
FIG. 11 is a diagram illustrating up/down opening.

The right/left opening indicates an arrangement of opening copied sheets to right and left with respect to the direction of document (for example, a book), as shown in FIG. 10. The up/down opening indicates an arrangement of opening copied sheets up and down with respect to the direction of document (for example, a calendar), as shown in FIG. 11.

For example, when the user depresses the setting key 801 on the picture frame 800 shown in FIG. 8, the setting key 801 is subjected to black-and-white reserval display as shown in FIG. 8, and in this state, selection results in selecting right/left opening. When the user depresses the setting key 802, the setting key 802 is subjected to black-and-while reversal display, and in this state, one can select up/down opening. A cancel key 804 is used to cancel a setting made, but not yet entered, by the user in the picture frame 800 shown in FIG. 8, and to return to the picture frame 700 shown in FIG. 7.

Figure 12:
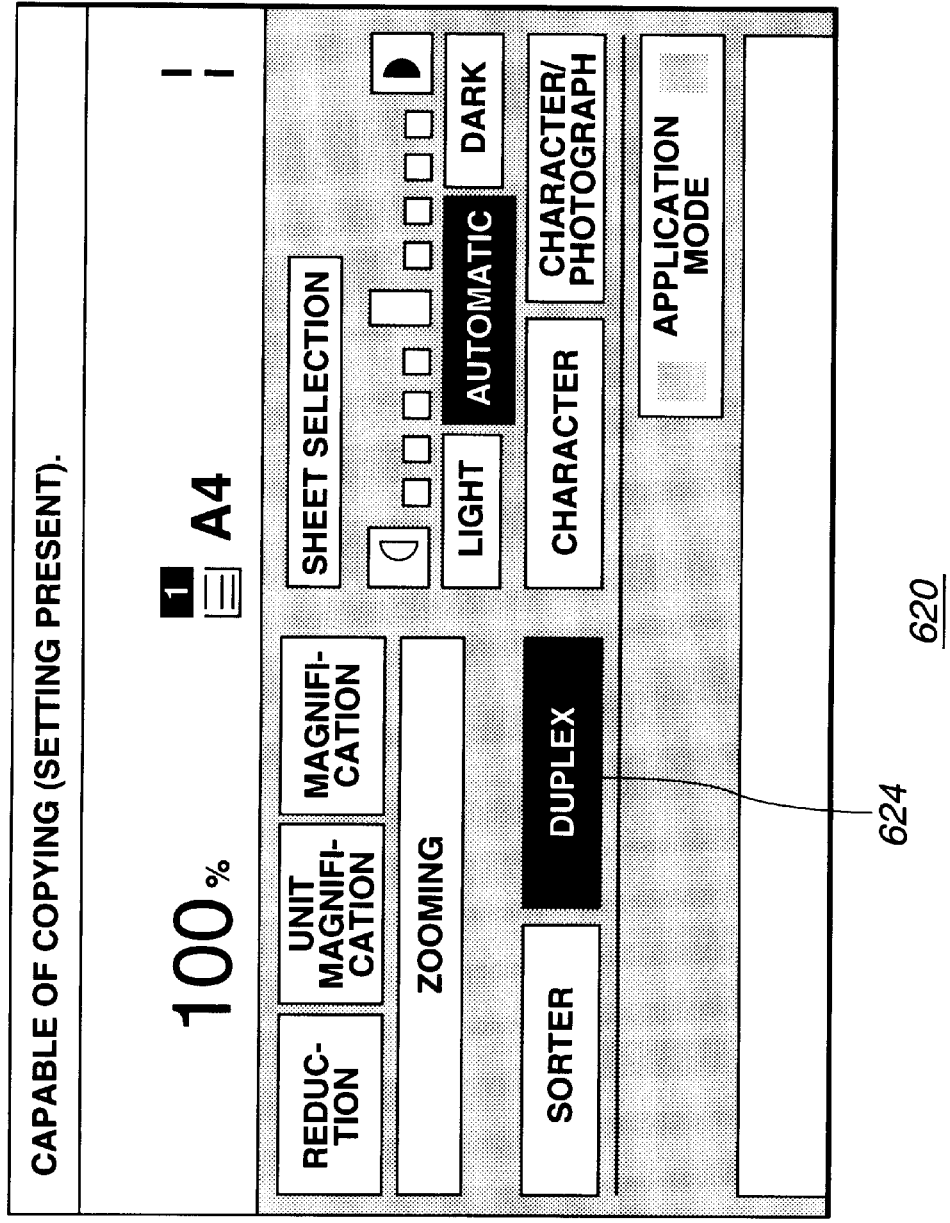
FIGS. 12–34 are diagrams, each illustrating a picture frame on the operation unit shown in FIG. 5.

When the user selects the setting key 801 or 802, and depresses an OK key 803, the picture frame is switched to a picture frame shown in FIG. 12. The duplex-printing key 624 in the picture frame shown in FIG. 12 is subjected to black-and-white reversal display, indicating completion of setting of the desired duplex-printing mode. When the user depresses the start key 614 on the operation unit in this state, the copier 100 starts a copying operation based on the setting of duplex printing performed by the user in the picture frames shown in FIGS. 7 and 8.

An original-direction automatic detection button 805 shown in FIG. 8 is for selecting whether or not automatic detection of the direction of an original is to be performed. When the user depresses the original-direction automatic detection button 805, the button 805 is subjected to black-and-white reversal display as shown in FIG. 8, and the setting of automatically detecting the direction of the original is provided. When the user again depresses the button 805 in the state in which the button 805 is subjected to black-and-white reversal display, the setting of not performing automatic detection of the direction of the original is provided.

An operation for when performing reduced layout will now be described with reference to FIG. 13. A picture frame 1300 shown in FIG. 13 is displayed on the display panel 620 when the user has depressed the application-mode key 626 of the operation unit shown in FIG. 5.

Figure 13:
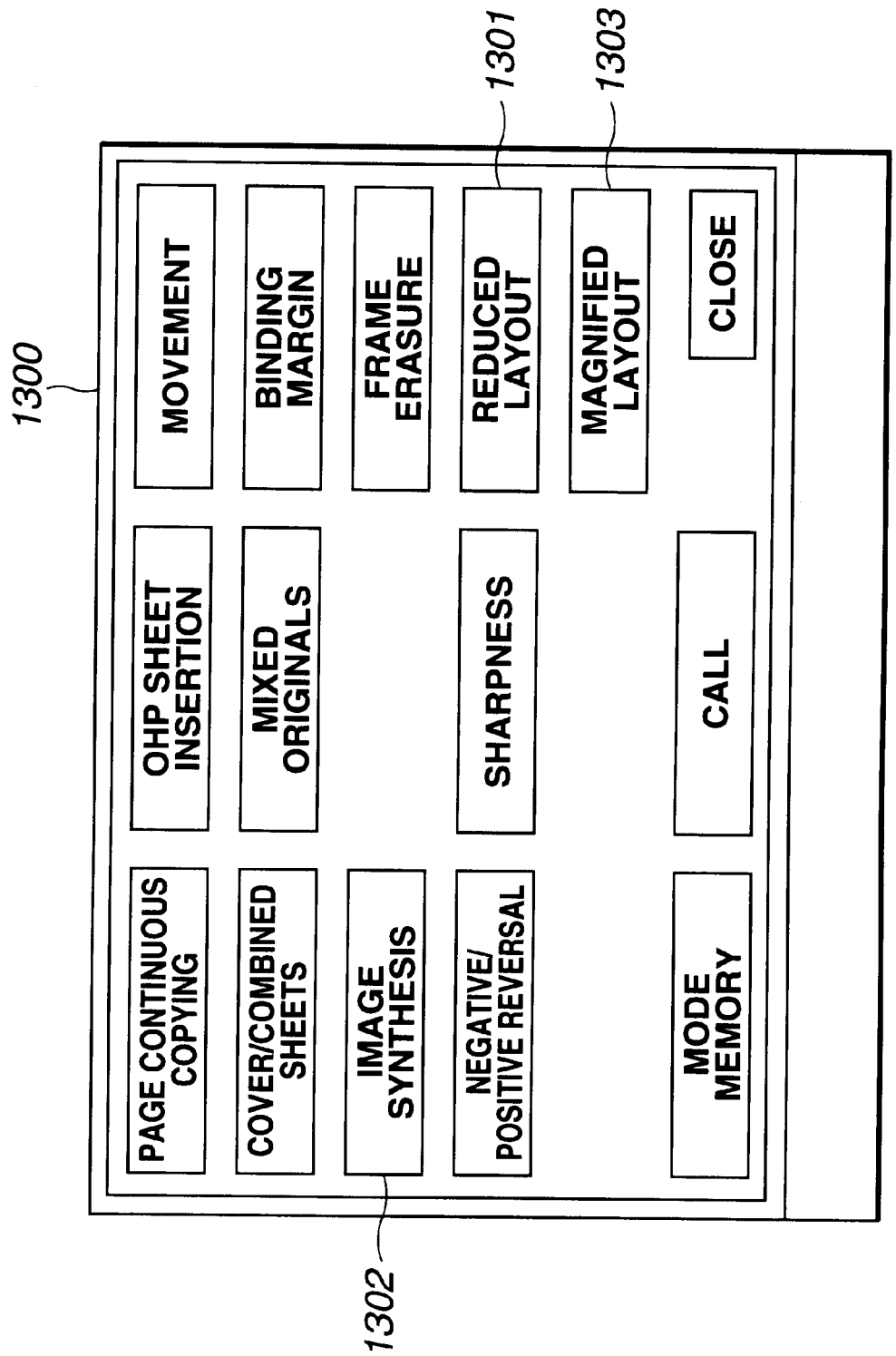

When the user depresses a reduction-layout button 1301 on the picture frame 1300 shown in FIG. 13, a picture frame for selecting the size of the original (not shown) is displayed. When the user assigns the size of the original on this picture frame, the picture frame is switched to a reduced-layout selection picture frame 1400 shown in FIG. 14.

Figure 14:
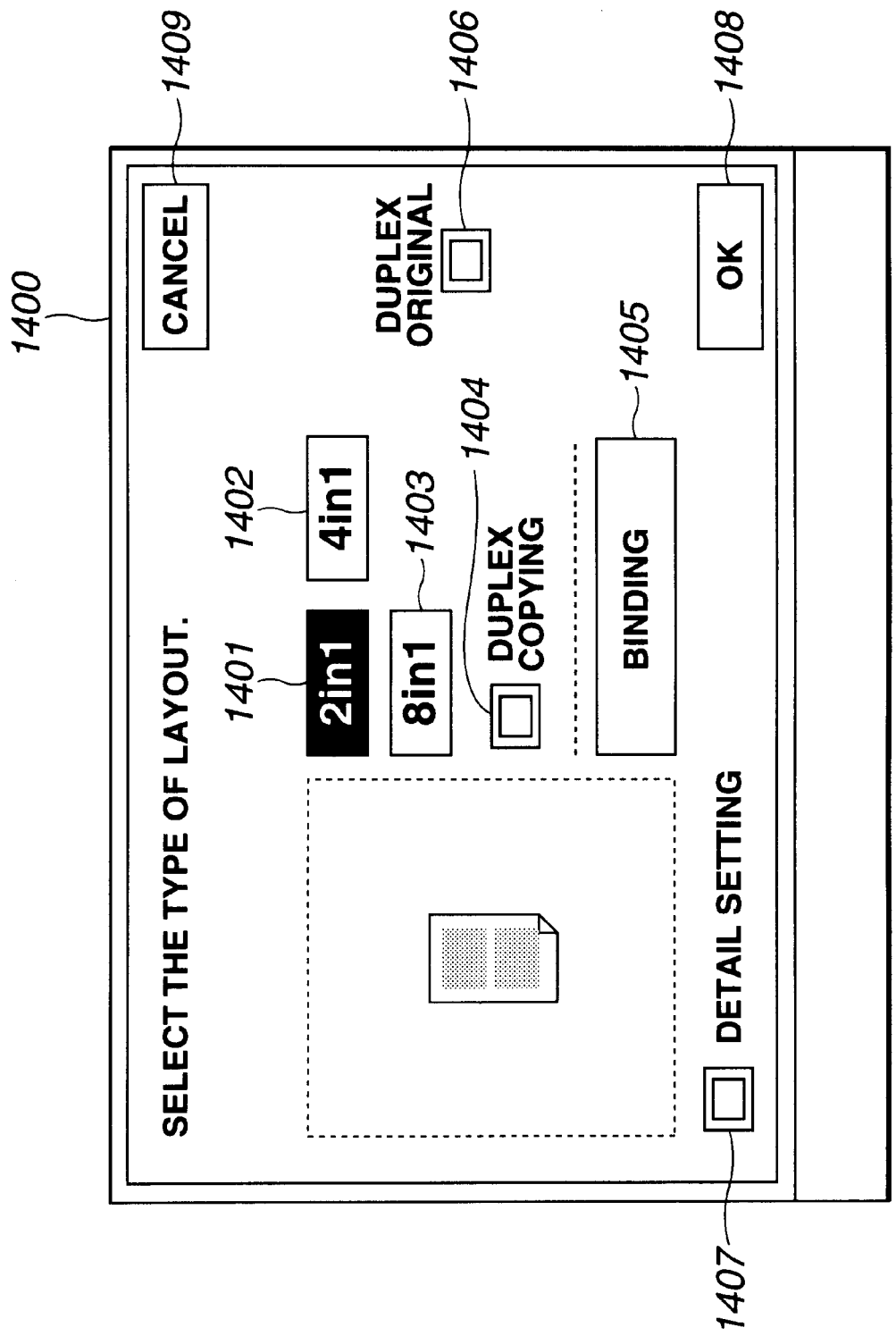

The reduced-layout selection picture frame 1400 shown in FIG. 14 is for selecting the type of layout. In FIG. 14, each of a 2in1 button 1401, a 4in1 button 1402 and an 8in1 button 1403 is for selecting the type of layout.

When the user depresses the 2in1 button 1401, setting for forming images by automatically reducing the size of the read originals for two pages and outputting reduced images on a selected sheet is performed for the copier 100. The 4in1 button 1402 is for setting for forming images by automatically reducing the size of the read originals for four pages and outputting reduced images on a selected sheet. The 8in1 button 1403 is for setting for forming images by automatically reducing the size of the read, originals for eight pages and outputting reduced images on a selected sheet.

A duplex-original button 1406 is used when reading an original subjected to duplex printing. When the user depresses the button 1406, the automatic document feeder 280 scans both surfaces of the original.

A duplex-copying button 1404 is for performing duplex setting. When the user depresses the button 1404, the copier 100 performs duplex output. A binding button 1405 is for setting a pamphlet mode. When the user depresses the button 1405, the copier 100 output images in the pamphlet mode.

Figure 42:
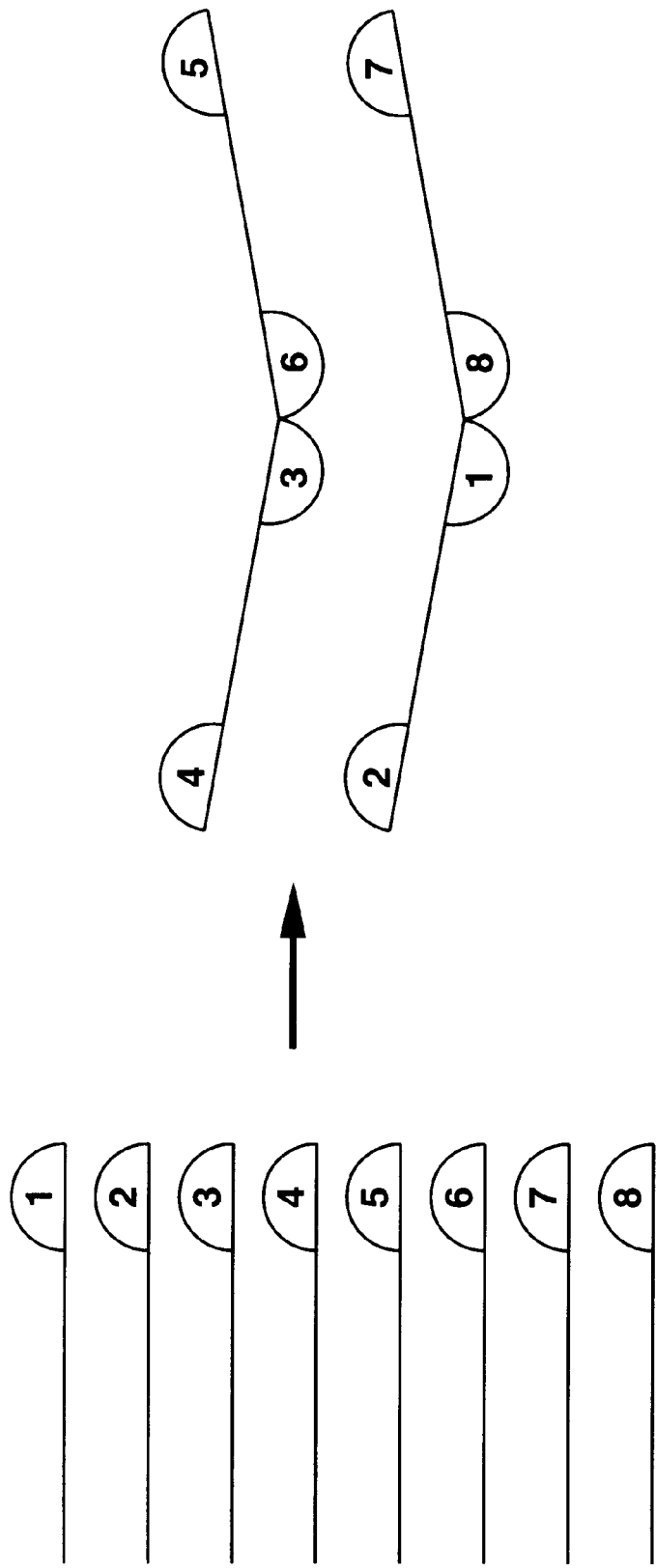
FIG. 42 is a diagram illustrating a pamphlet mode.

The pamphlet mode will now be described with reference to FIG. 42. For example, as shown in FIG. 42, when outputting A4-size simplex originals for eight pages in the pamphlet mode, A3-size duplex copies for two pages are obtained as shown at the right of FIG. 42. The order of reading image data from the memory at that time is as follows.

First, after reading image data for all originals into the memory, image data corresponding to originals of the first and eighth pages is read, and is copied on the surface of an A3-size recording sheet. Then, image data for the second and seventh pages is copied on the back of the recording sheet. Then, image data for the third and sixth pages is copied on the surface of the recording sheet, and image data for the fourth and fifth pages is copied on the back of the recording sheet.

Thus, in this embodiment, it is possible to first read and store all originals into the memory, and then read the stored originals in an arbitrary order of pages in accordance with the output mode, such as the pamphlet mode or the like.

Figure 15:
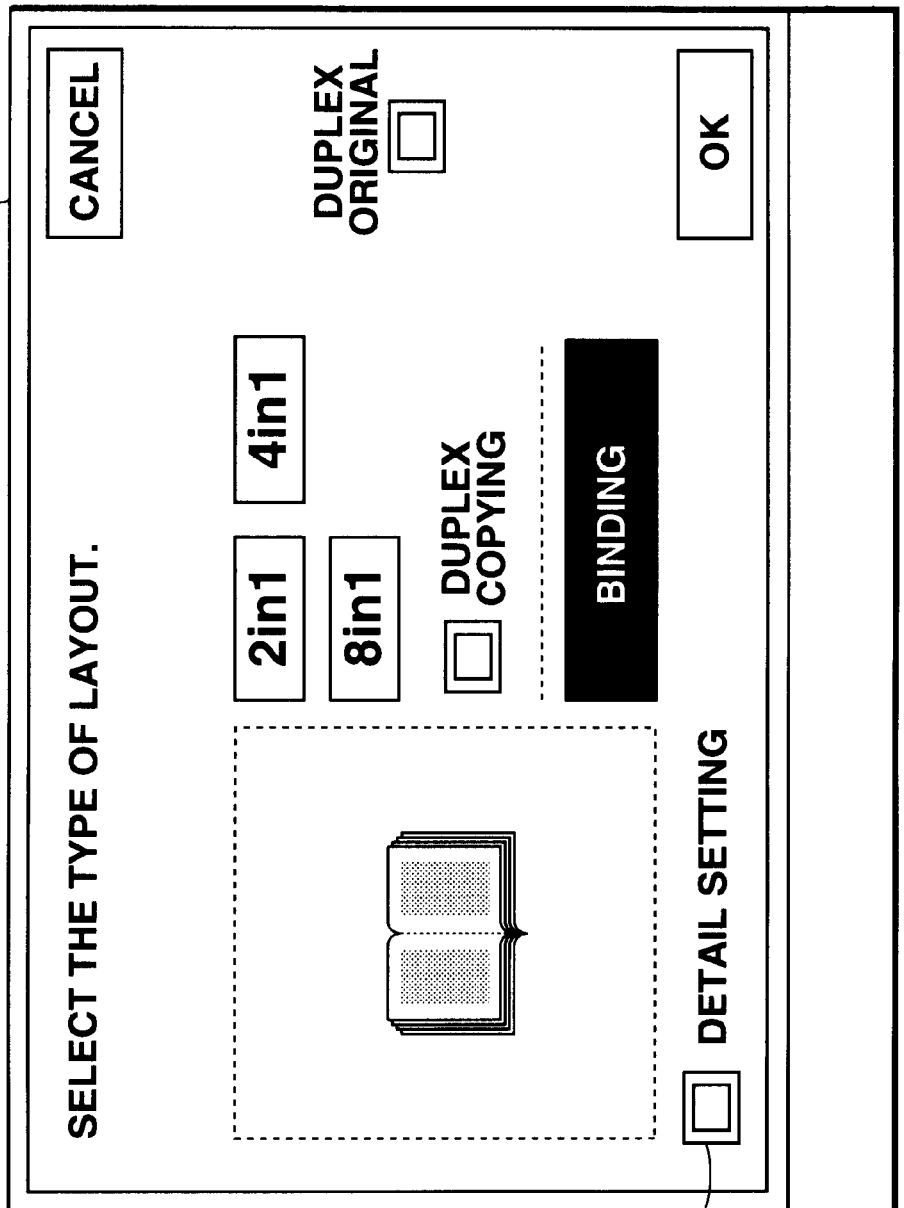

When the user depresses a binding button 1405, a detail-setting key 1407 on a picture frame 1500 shown in FIG. 15 is subjected to halftone dot meshing to prohibit setting using the detail-setting button 1407.

A cancel key 1409 is for cancelling the reduced-layout mode. When the user depresses the cancel key 1409, the picture frame returns to the application picture frame 1300 shown in FIG. 13.

Figure 16:
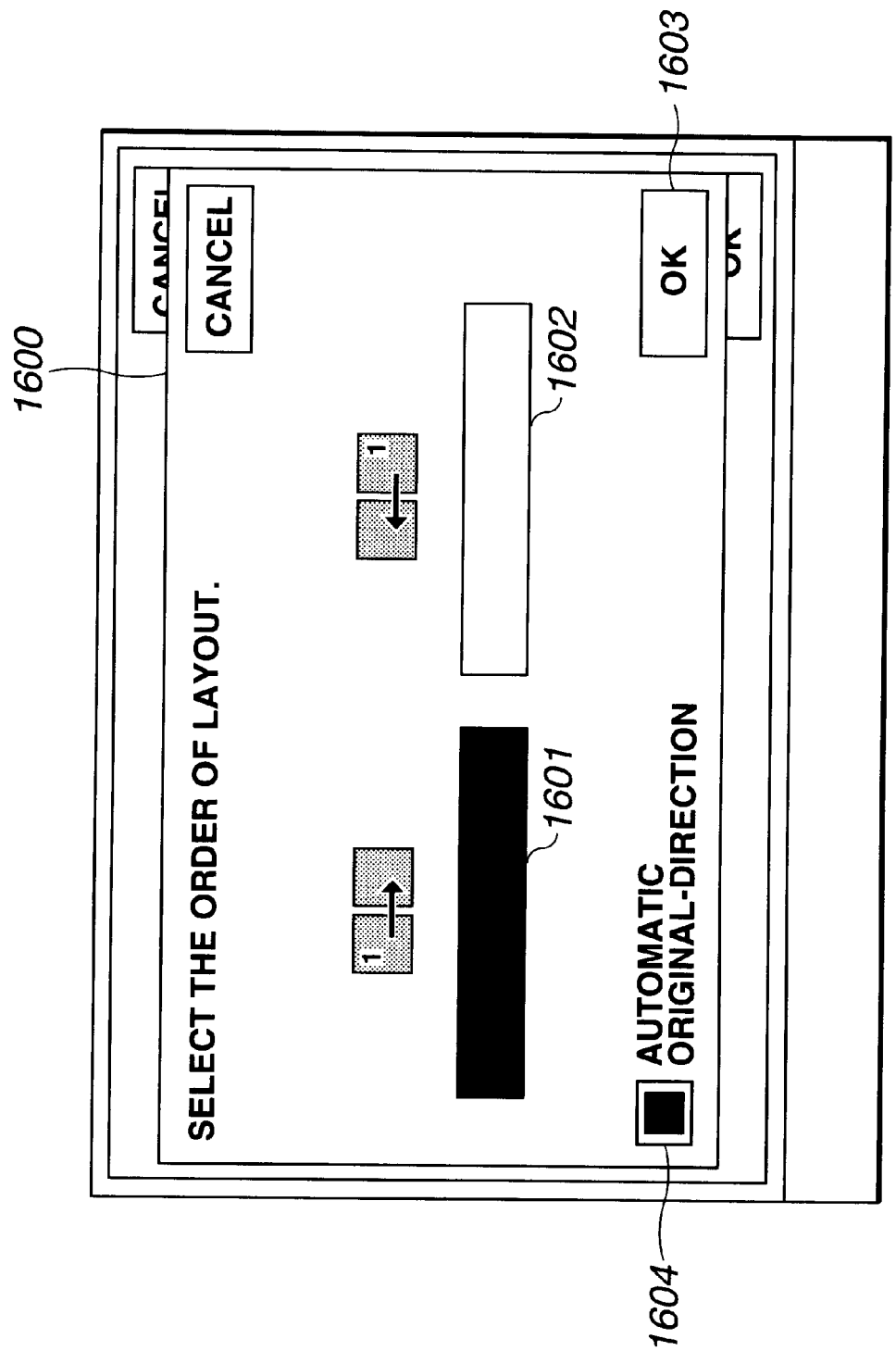

When the user selects the 2in1 button 1401, and the detail-setting button 1407 is depressed in a state in which the binding button 1405 is not depressed on the reduced-layout selection picture frame 1400, the picture frame is switched to a picture frame shown in FIG. 16.

FIG. 16 illustrates a 2in1-layout-order setting picture frame 1600. Each of buttons 1601 and 1602 is for selecting the order of image formation of read images on a recording sheet.

When the user selects the button 1601, the first page and the second page of read originals is laid out to the left and the right of an output sheet, respectively. When the user selects the deplex-original setting button 1406 on the reduced-layout selection picture frame 1400 shown in FIG. 14, the surface and the back of the read original are laid out at the left and the right of an output sheet.

When the user selects the button 1602, the first page and the second page of read originals are laid out to the right and the left of an output sheet, respectively. When the user selects the deplex-original setting button 1406 on the reduced-layout selection picture frame shown in FIG. 14, the surface and the back of the read original are laid out at the right and the left of an output sheet.

A button 1604 is for selecting whether or not automatic original-direction detection is to be performed. When the user depresses the button 1604, the button 1604 is subjected to reversal display, and setting of performing automatic original-direction detection is provided. When the user again depresses the button 1604 in the state in which the button 1604 is subjected to reversal display, the reversal display of the button 1604, is released, and setting of not performing automatic original-direction detection is provided.

When the user depresses an OK key 1603, the order of layout selected by the button 1601 or 1602 is set, and the picture frame returns to the reduced-layout selection picture frame 1400. When the user depresses the start key 614 after selecting an output sheet by depressing an OK key 1408 on the picture frame 1400, reduced layout is performed with the type of layout and in the order of layout set by the user.

Figure 17:
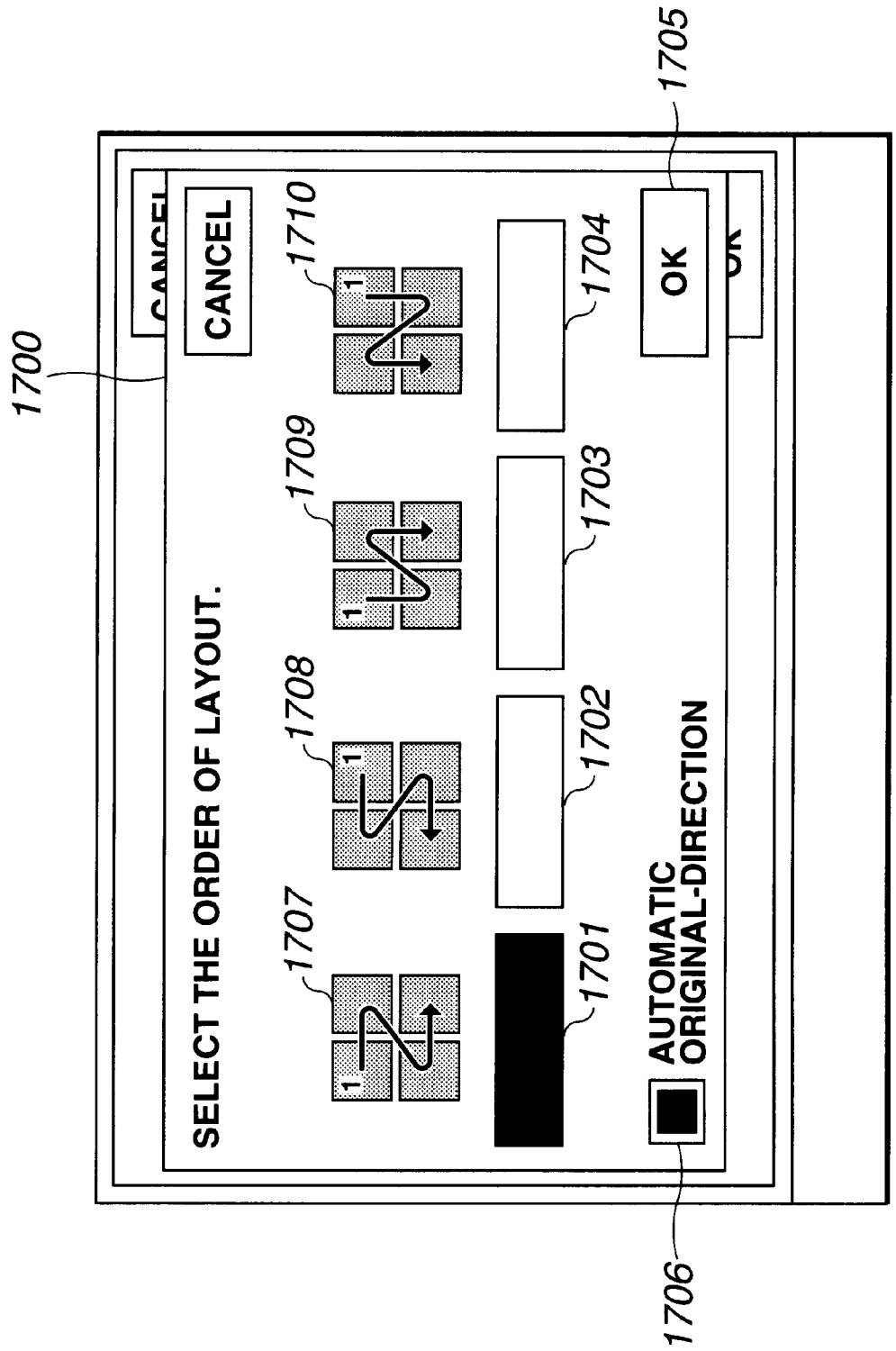

When the user depresses the detail-setting button 1407 in a state in which the user has selected the 4in1 button 1402 or the 8in1 button 1403 on the reduced-layout selection picture frame 1400, an Nin1-layout-order selection picture frame 1700 shown in FIG. 17 is displayed. The user can select one of four layout orders 1701, 1702, 1703 and 1704 displayed on this picture frame.

For example, when performing layout by reading four originals and dividing an output sheet into upper left, upper right, lower left and lower right portions, if the user selects the button 1701, layout is performed so that the first, second, third and fourth pages of originals are laid out to the upper left, upper right, lower left and lower right portions of the output sheet (this layout will be hereinafter termed a "Z-type reduced layout").

If the user selects the button 1702, layout is performed so that the first, second, third and fourth pages of originals are laid out to the upper right, upper left, lower right and lower left portions of the output sheet (this layout will be hereinafter termed an "inverse Z-type reduced layout").

If the user selects the button 1703, layout is performed so that the first, second, third and fourth pages of originals are laid out to the upper left, lower left, upper right and lower right portions of the output sheet (this layout will be hereinafter termed an "inverse N-type reduced layout").

If the user selects the button 1704, layout is performed so that the first, second, third and fourth pages of originals are laid out to the upper right, lower left, upper left and lower left portions of the output sheet (this layout will be hereinafter termed an "N-type reduced layout").

A button 1706 is for selecting whether or not automatic original-direction detection is to be performed. When the user depresses the button 1706, the button 1706 is subjected to reversal display as shown in FIG. 17, and setting of performing automatic original-direction detection is provided. When the user again depresses the button 1706 in the state in which the button 1706 is subjected to reversal display, the reversal display of the button 1706 is released, and setting of not performing automatic original-direction detection is provided.

When the user depresses an OK key 1705, the order of layout selected by one of the buttons 1701, 1702, 1703 and 1704 is set, and the picture frame returns to the reduced-layout selection picture frame 1400. When the user depresses the start key 614 after selecting an output sheet by depressing the OK key 1408 on the picture frame 1400, reduced layout is performed with the type of layout and in the order of layout set by the user.

Next, a description will be provided of the flow of the operation when magnified layout has been selected by the user on the applicational picture frame 1300 shown in FIG. 13. When a magnified-layout button 1303 is selected by the user, a magnified layout selection picture frame 1800 shown in FIG. 18 is displayed.

Figure 18:
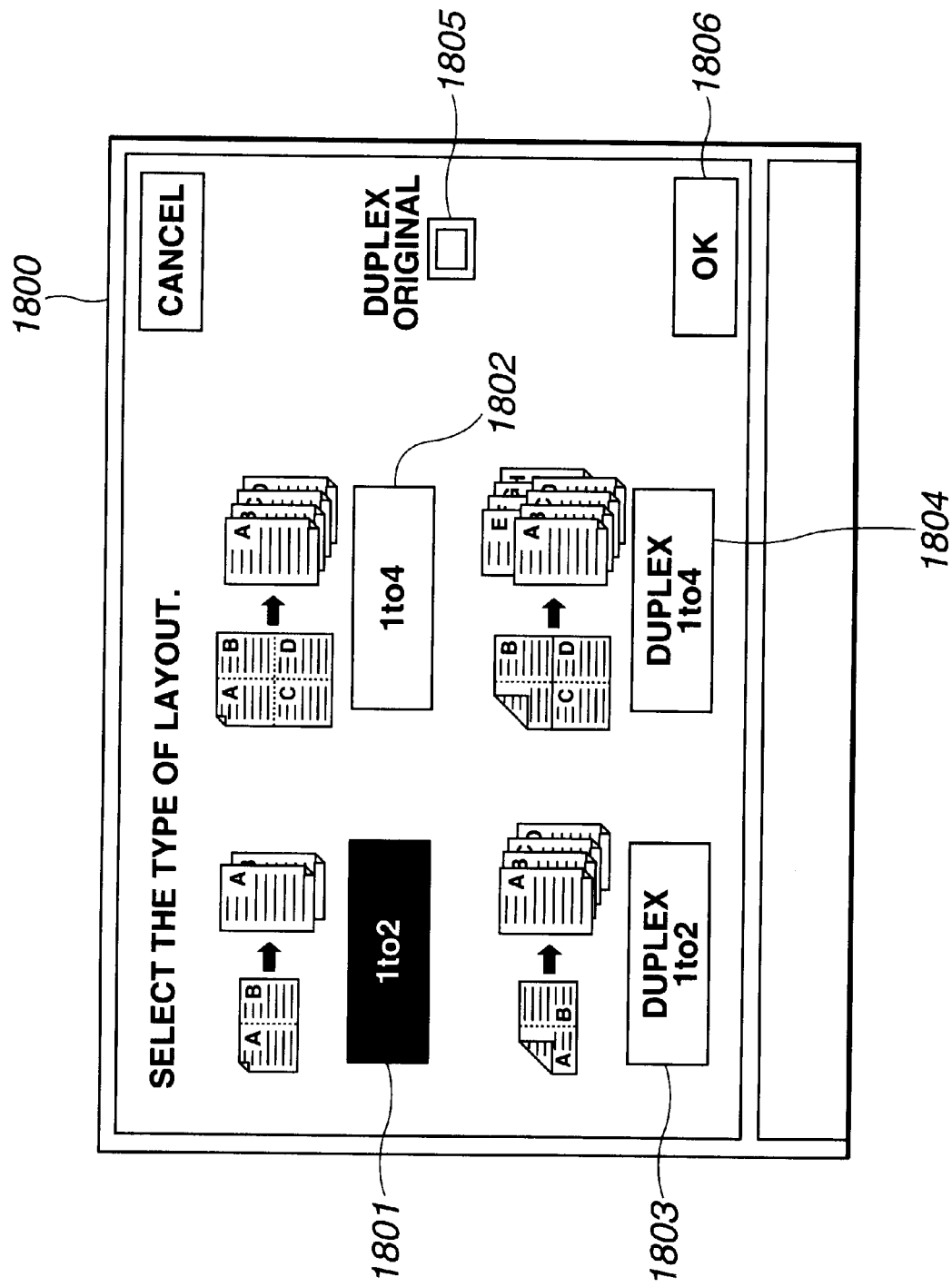

In FIG. 18, each of a 1to2 button 1801, a 1to4 button 1802, a duplex 1to2 button 1803 and a duplex 1to4 button 1804 is used for selecting the type of magnified layout.

The 1to2 button 1802 is a setting button for dividing a read original into left and right images, reading the two images, and outputting each of the two images onto an output sheet.

The 1to4 button 1802 is a setting button for dividing a read original into upper left, upper right, lower left and lower right images, reading the four images, and outputting each of the four images onto an output sheet in the order of reading.

The duplex 1to2 button 1803 is a setting button for dividing each of two surfaces of a duplex original into left and right images, reading the four images, and outputting each of the four images onto an output sheet.

The duplex 1to4 button 1804 is a setting button for dividing each of two surfaces of a duplex original into upper left, upper right, lower left and lower right images, reading the four images, and outputting each of the four images onto an output sheet in the order of reading. A duplex button 1805 is used for setting duplex output.

Figure 19:
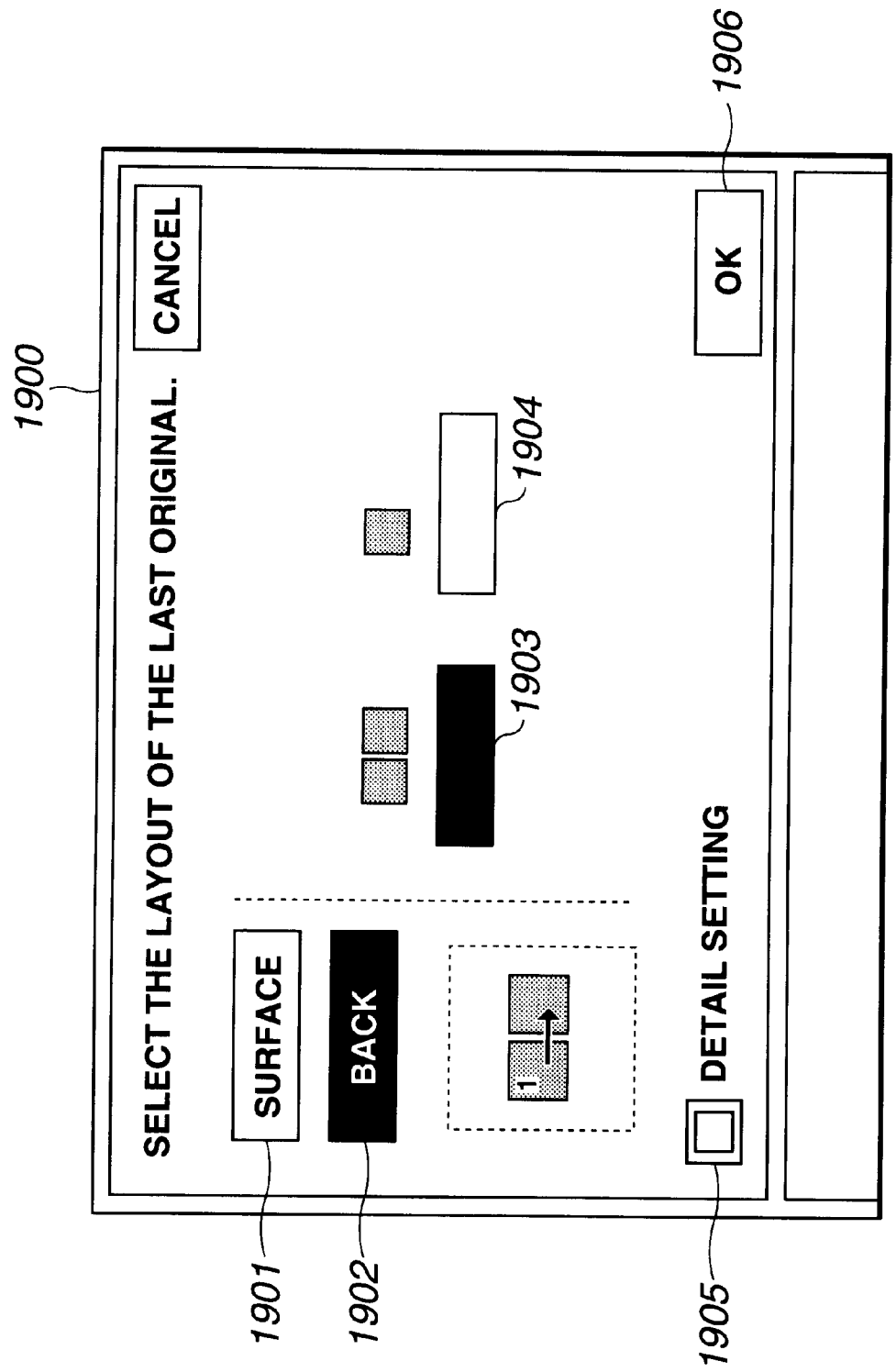

When the user depresses an OK key 1806 after selecting the 1to2 button 1801 or the duplex 1to2 button 1803 on the magnified-layout selection picture frame 1800, a 1to2 last-original-layout setting picture frame 1900 shown in FIG. 19 is displayed.

This picture frame 1900 is for setting whether or not the back of the last original also has an image. When the user selects a button 1901, setting of not reading the back of the last original is provided. When the user selects a button 1902, setting of also reading the back of the last original is provided.

When the 1to2 button 1801 has been selected by the user on the magnified-layout selection picture surface 1800, the button 1902 is subjected to halftone dot meshing and cannot perform setting.

Each of buttons 1903 and 1904 is for selecting whether there exist two images or one image on the last surface to be read of the last original (corresponding to the surface of the last original when the button 1901 is set, and to the back of the last original when the button 1902 is set). When the button 1903 is selected by the user, reading of two images for each original is performed for all originals. When the button 1904 is selected, only one image is read for the last surface to be read of the last original.

If an operation of reading two images is performed when only one image is present on the last page of the last original, a blank sheet is discharged. The picture frame 1900 is for performing setting for preventing such a problem.

Figure 20:
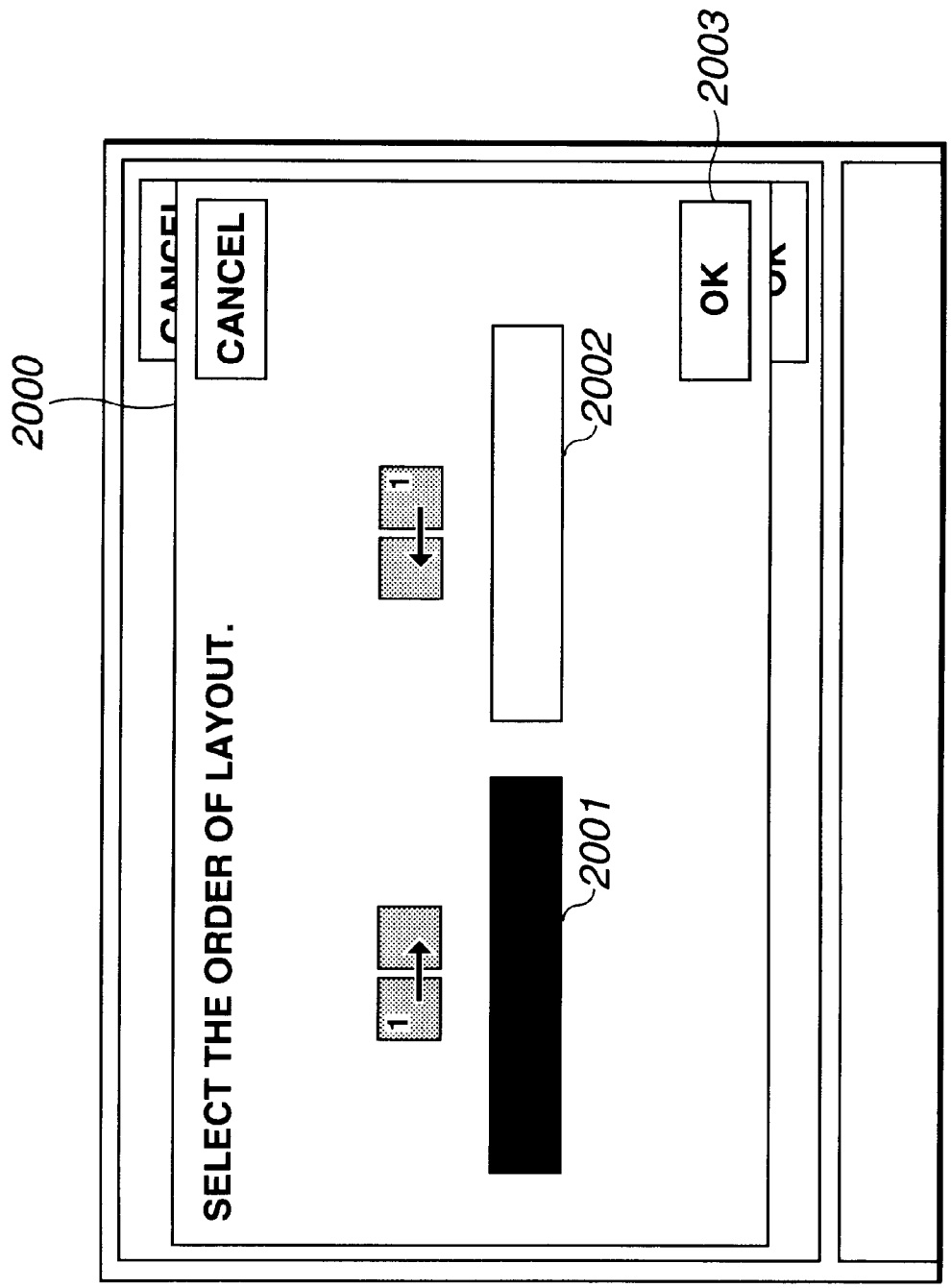

Next, a description will be provided of a magnified-layout-order selection picture frame 2000 displayed when the user depresses a detail setting button 1905 on the magnified-layout selection picture frame 1900, with reference to FIG. 20.

In FIG. 20, each of buttons 2001 and 2002 is for selecting the order of reading, i.e., whether reading of an original to be read is performed from the left image or from the right image. When the button 2001 is selected and an OK key 2003 is depressed by the user, setting of performing image reading from the left image is provided (hereinafter termed a "left-to-right-type magnified layout"). When the button 2002 is selected and the OK key 2003 is depressed by the user, setting of performing image reading from the right image is provided (hereinafter termed a "right-to-left-type magnified layout").

When the user depresses the OK key 2003, the picture frame returns to the application picture frame 1300. When the start key 614 is depressed in the state in which the picture frame 1300 is displayed, layout is performed by performing reading in the order set by the user.

Figure 21:
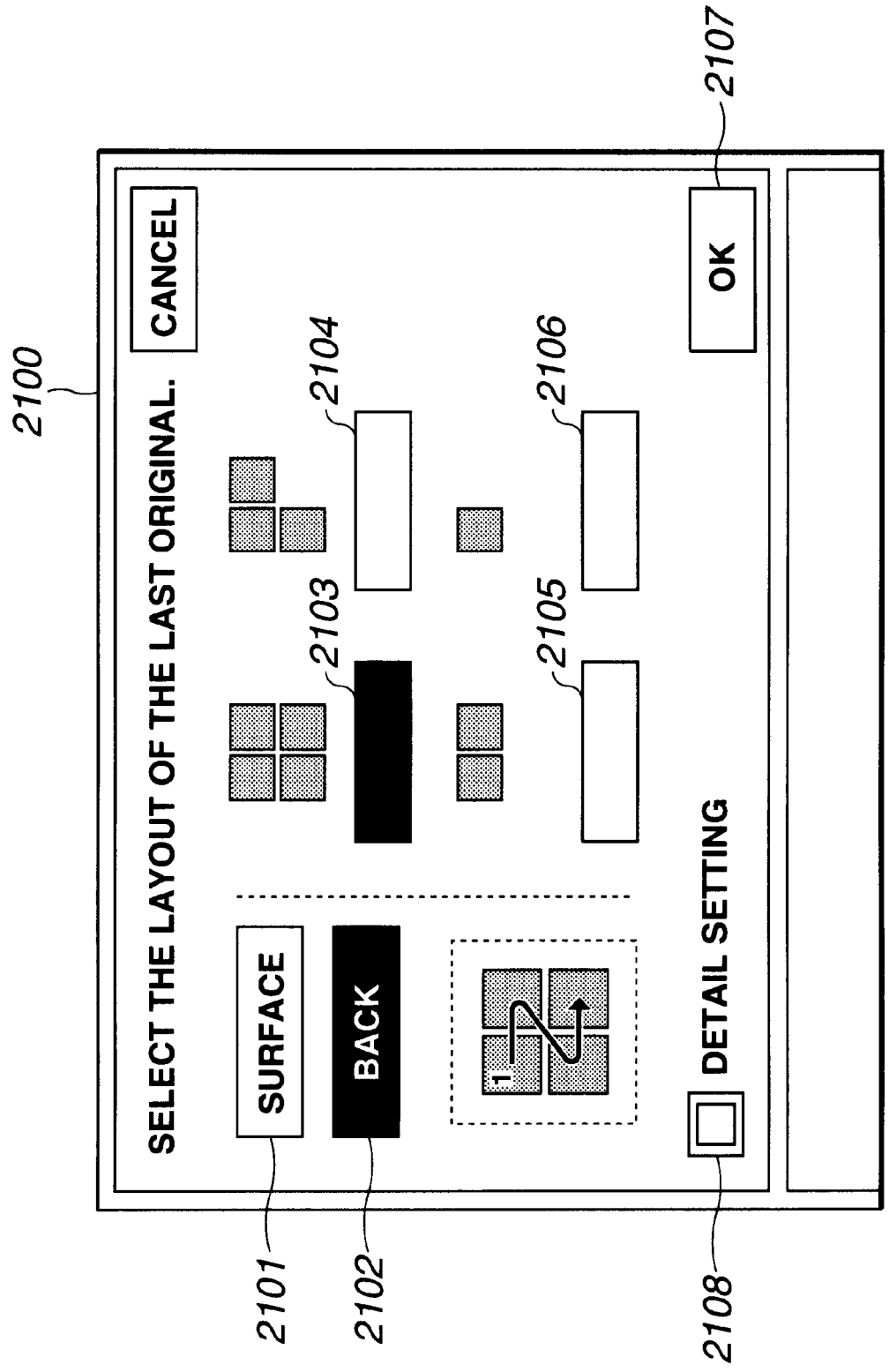

Next, a description will be provided of a 1to4 last-original-layout selection picture frame 2100 displayed when the user selects the 1to4 button 1802 or the 1to4 button 1804, and depresses the OK key 1806 on the magnified-layout selection picture frame 1800, with reference to FIG. 21.

The picture frame 2100 shown in FIG. 21 is for setting whether or not an image is also present on the back of the last original, as described with reference to FIG. 19. When the user selects a button 2101, setting of not reading the back of the last original is provided. When the user selects a button 2102, setting of reading the back of the last original is provided.

When the 1to4 button 1802 has been selected by the user on the magnified-layout selection picture frame 1800, the button 2102 is subjected to halftone dot meshing, and cannot perform setting.

Each of buttons 2103, 2104, 2105 and 2106 is for selecting how many images are present on the last surface to be read of the last original (corresponding to the surface of the last original when the button 2101 is set, and to the back of the last original when the button 2102 is set).

When the user selects the button 2103, four images are read for each of all originals. When the button 2104 is selected, three images are read for each of all originals.

When the user selects the button 2105, two images are read for each of all originals. When the button 2106 is selected, one image is read for each of all originals.

Figure 22:
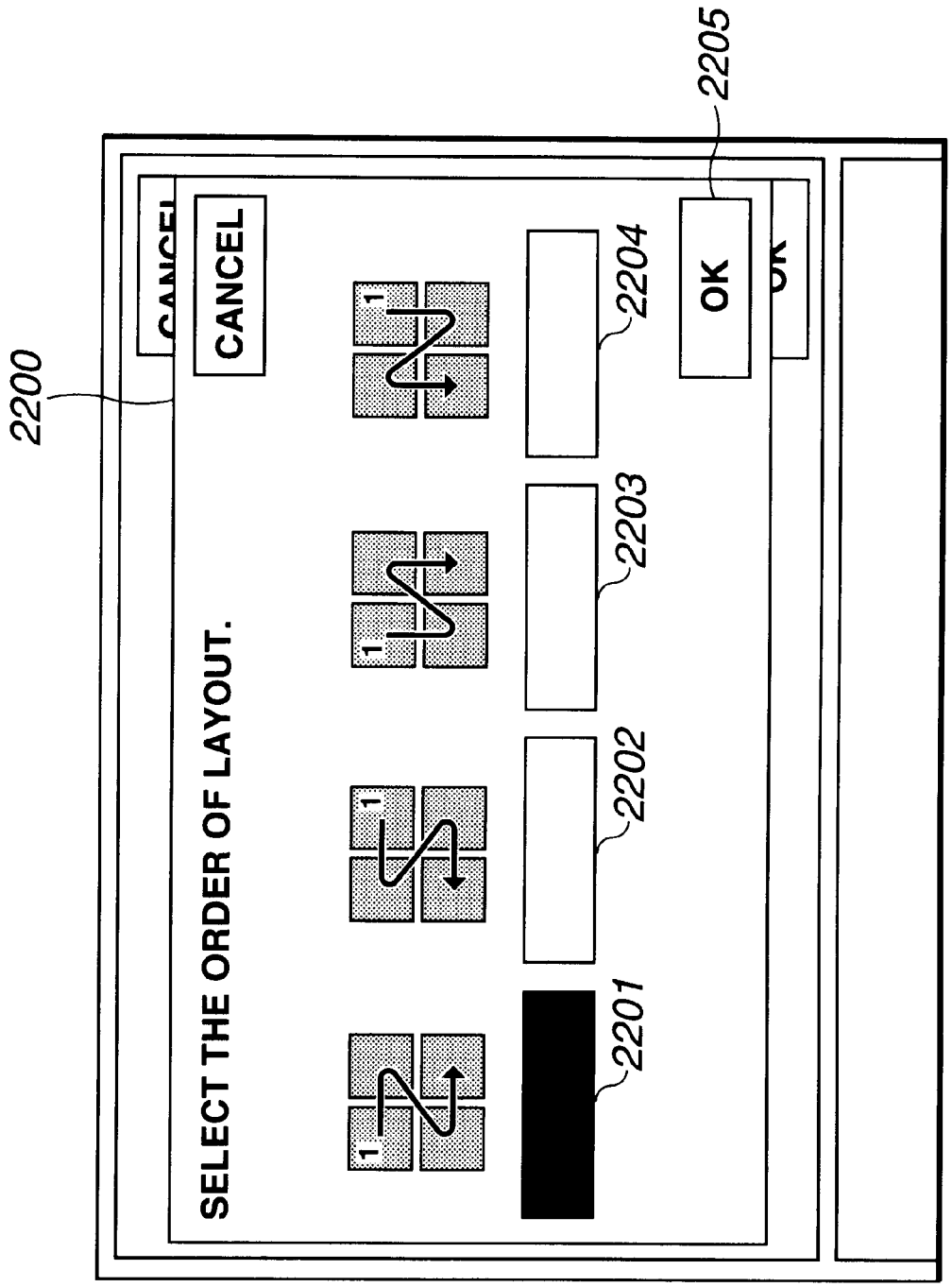

Next, a description will be provided of a magnified-layout-order selection picture frame 2200 displayed when the user depresses a detail-setting button 2108, with reference to FIG. 22.

Each of buttons 2201, 2202, 2203 and 2204 on the picture frame 2200 is for selecting the order of reading for the upper left, lower left, upper right and lower right images of an original to be read.

When the user selects the button 2201, setting of reading the original in the order of the upper left image →the upper right image→the lower left image→the lower right image is provided (hereinafter termed a "Z-type reduced layout"). When the user selects the button 2202, setting of reading the original in the order of the upper right image→the upper left image→the lower right image→the lower left image is provided (hereinafter termed an "inverse Z-type reduced layout").

When the user selects the button 2203, setting of reading the original in the order of the upper left image→the lower left image→the upper right image→the lower right image is provided (hereinafter termed an "inverse N-type reduced layout"). When the user selects the button 2204, setting of reading the original in the order of the upper right image→the lower right image→the upper left image→the lower left image is provided (hereinafter termed an "N-type reduced layout").

When the user selects one of the above-described buttons 2201, 2202, 2203 and 2204, and depresses an OK key 2203, the picture frame returns to the application picture frame 1300. When the start key 614 is depressed by the user in the state in which the picture frame 1300 is displayed, layout is performed by performing reading in the order set by the user.

Next, a description will be provided of a method for setting of an image synthesis function, and a method for setting registration/erasure of a form image. The image synthesis function in this embodiment is a function of storing a plurality of form images (for example, tables and illustrations) on the HD 304 as registered images, synthesizing a form image with image data read by the scanner, and printing the resultant image.

Figure 23:
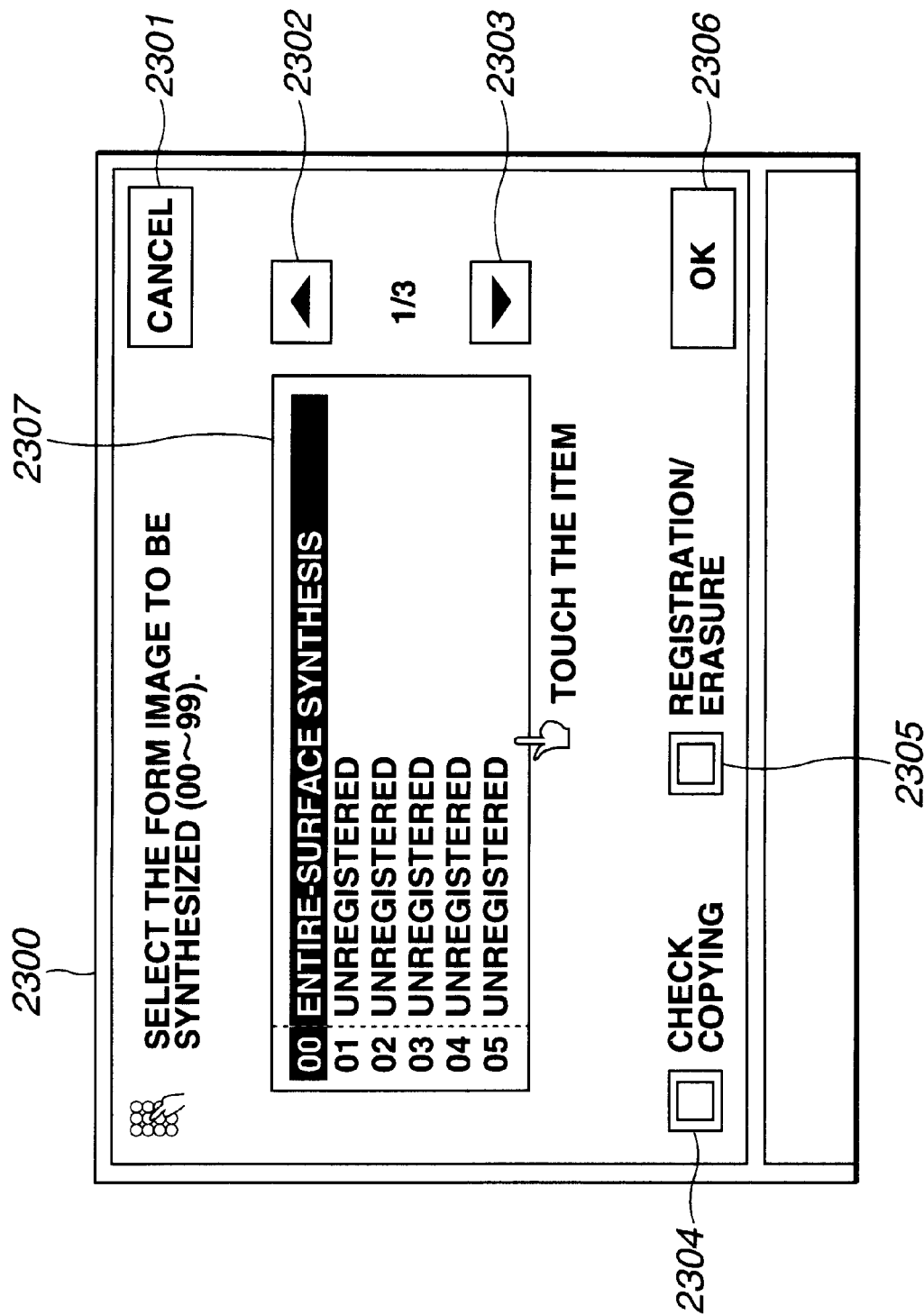

A picture frame 2300 shown in FIG. 23 is an image-synthesis setting picture frame for a form image stored on the HD 304 and read original-image data. This picture frame 2300 is displayed when the user depresses an image synthesis key 1302 on the application picture frame 1300 shown in FIG. 13.

The list of form images registered on the HD 304 is displayed on the picture frame 2300. In FIG. 23, for example, it is displayed that the number of form images which can be registered on the HD 304 is 100, and the registered form images are numbered as 00–99. In the case of FIG. 23, it is indicated that only one form image is registered on the HD 304.

The user selects a desired form image from among form images whose list is displayed within a display region 2307, on the picture frame 2300. The form image selected by the user is subjected to black-and-white reversal display as shown in FIG. 23.

Figure 32:
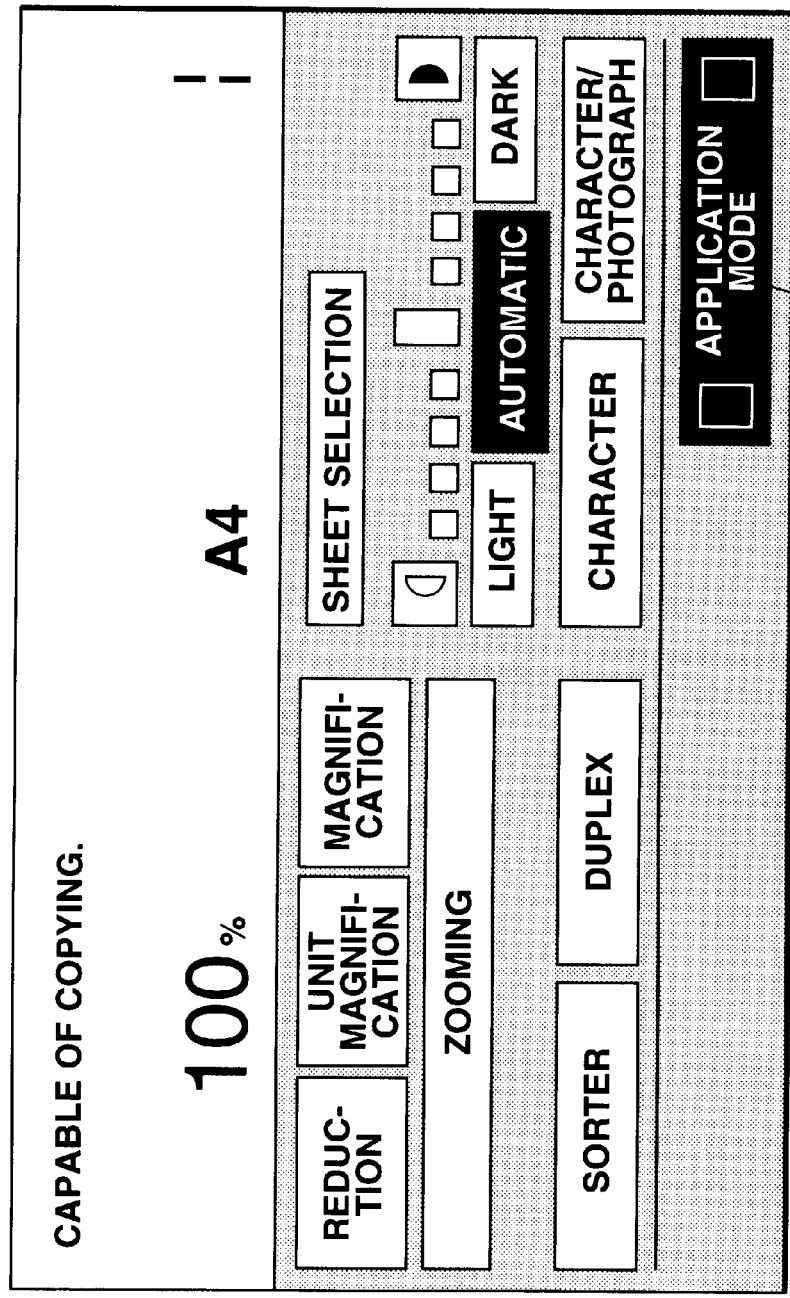

When the user selects s form image and depresses an OK key 2306, setting of image synthesis of the form image selected by the user and a read original-image is performed for the copier 100 on the picture frame 2300, and the picture frame is switched to a standard picture frame shown in FIG. 32. As shown in FIG. 32, an application-mode key 3201 is subjected to black-and-white reversal display in order to notify the user that the application mode is set.

A check copying button 2304 on the picture frame 2300 is for performing test copying before forming an image synthesis copy of the form image selected by the user and the read original-image data.

When the user depresses the check copying button 2304, the button 2304 is subjected to black-and-white reversal display. When the user depresses an OK key 2306 in the state in which the check copying button 2304 is black, setting of performing test copying before forming an image synthesis copy is provided for the copier 100.

A cancel button 2301 is for cancelling setting of image synthesis. When the user depresses the cancel button 2301, the picture frame returns to the application picture frame 1300 shown in FIG. 13.

An upward scroll button 2302 and a downward scroll button 2303 are used for scrolling the picture frame when displaying a large number of job contents which cannot be displayed within one picture frame. When the user depresses the button 2302, the picture frame is scrolled upward. When the user depresses the button 2303, the picture frame is scrolled downward.

Figure 24:
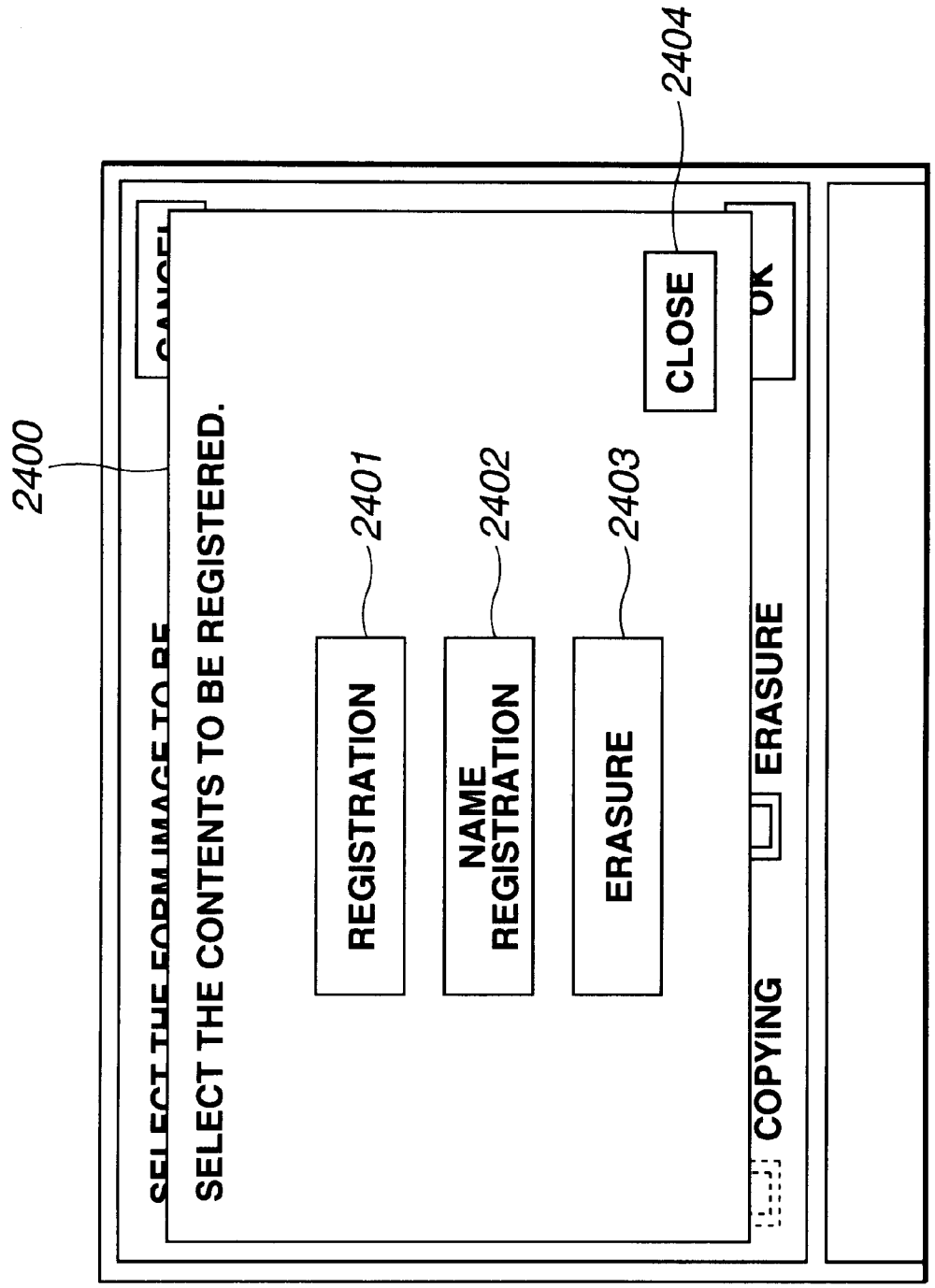

When the user depresses a registration/erasure button 2305, the picture frame shifts to a registration-contents setting picture frame 2400 shown in FIG. 24.

The picture frame 2400 shown in FIG. 24 is for setting registration of a form image in a selected form location, or for setting erasure of a seleted form image.

In FIG. 24, a registration button 2401 is for shifting to registration of the form image in the form location selected in FIG. 23. Registration of a form image will be described later. A name registration button 2402 is for shifting to registration of the name of the form image selected in FIG. 23.

An erasure button 2403 is for shifting to erasure of the form image selected in FIG. 23. Erasure of a form image will also be described later.

Reference numeral 2404 represents a close button. When this button 2404 is depressed, setting of registration/erasure of a form image is not performed, and the picture frame returns to the image-synthesis setting picture frame shown in FIG. 23.

Figure 25:
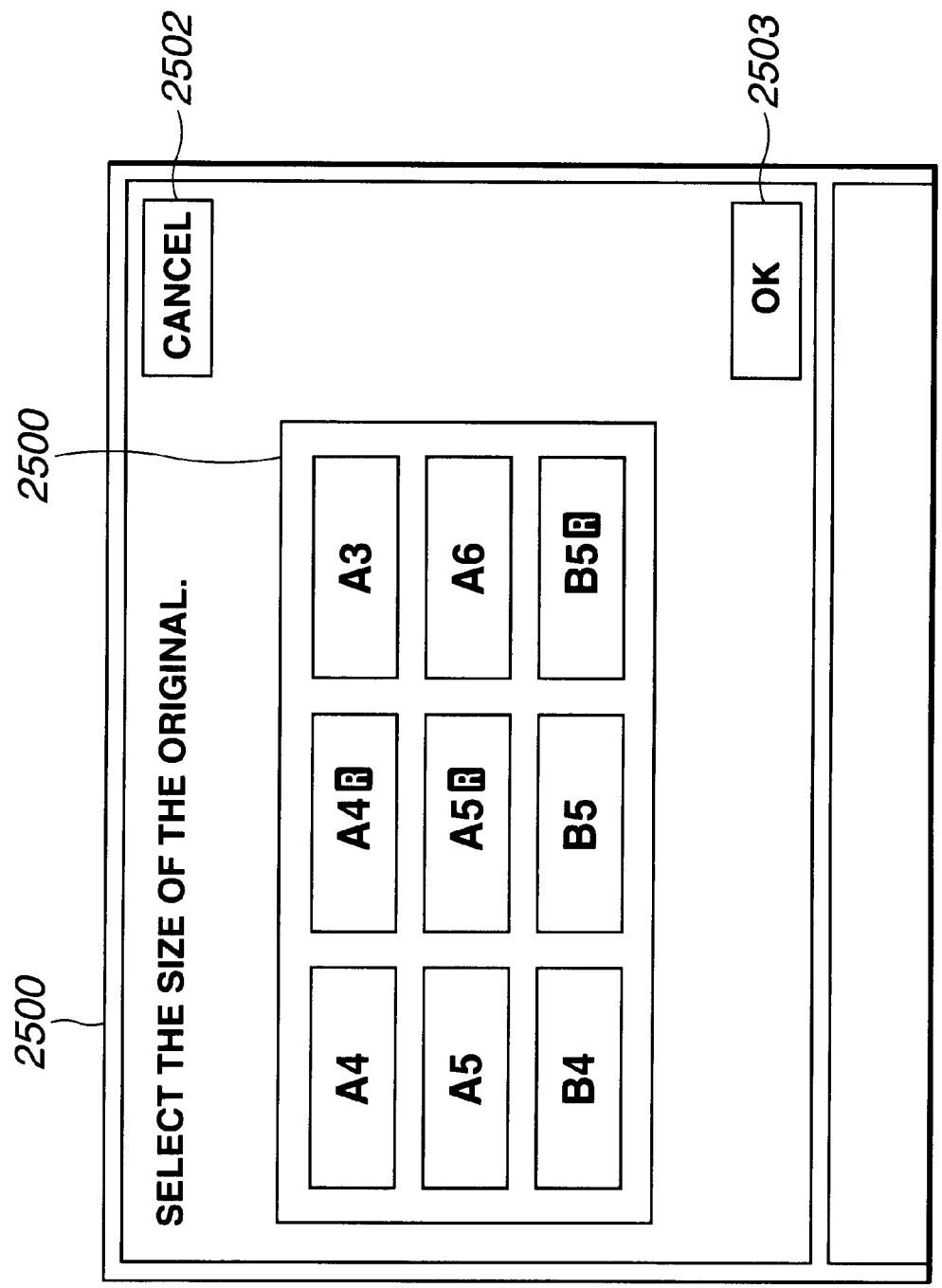

A description will now be provided of the operation when the user depresses the registration button 2401 on the picture frame 2400 shown in FIG. 24. When the user depresses the registration button 2401 on the picture frame 2400 shown in FIG. 24, the picture frame shifts to an original-size setting picture frame 2500 shown in FIG. 25.

On the picture frame 2500, the user selects the size of the original of image data to be registered on the HD 304 as a form image. Reference numeral 2501 represents a size display region. By depressing an original-size button displayed within this display region 2501, the user can select a desired original-size. The original-size button selected by the user is subjected to black-and-white reversal display.

Although in this embodiment only A/B-type original sizes are provided, inch-size originals may also be selected.

When the user depresses an OK button 2503, setting is performed with the original-size selected by the user, and the picture frame shifts to a picture frame 2600 for setting the type of a form to be registered. A cancel button 2502 is for returning to the registration-contents setting picture frame 2400 shown in FIG. 24 without setting an original-size.

Figure 26:
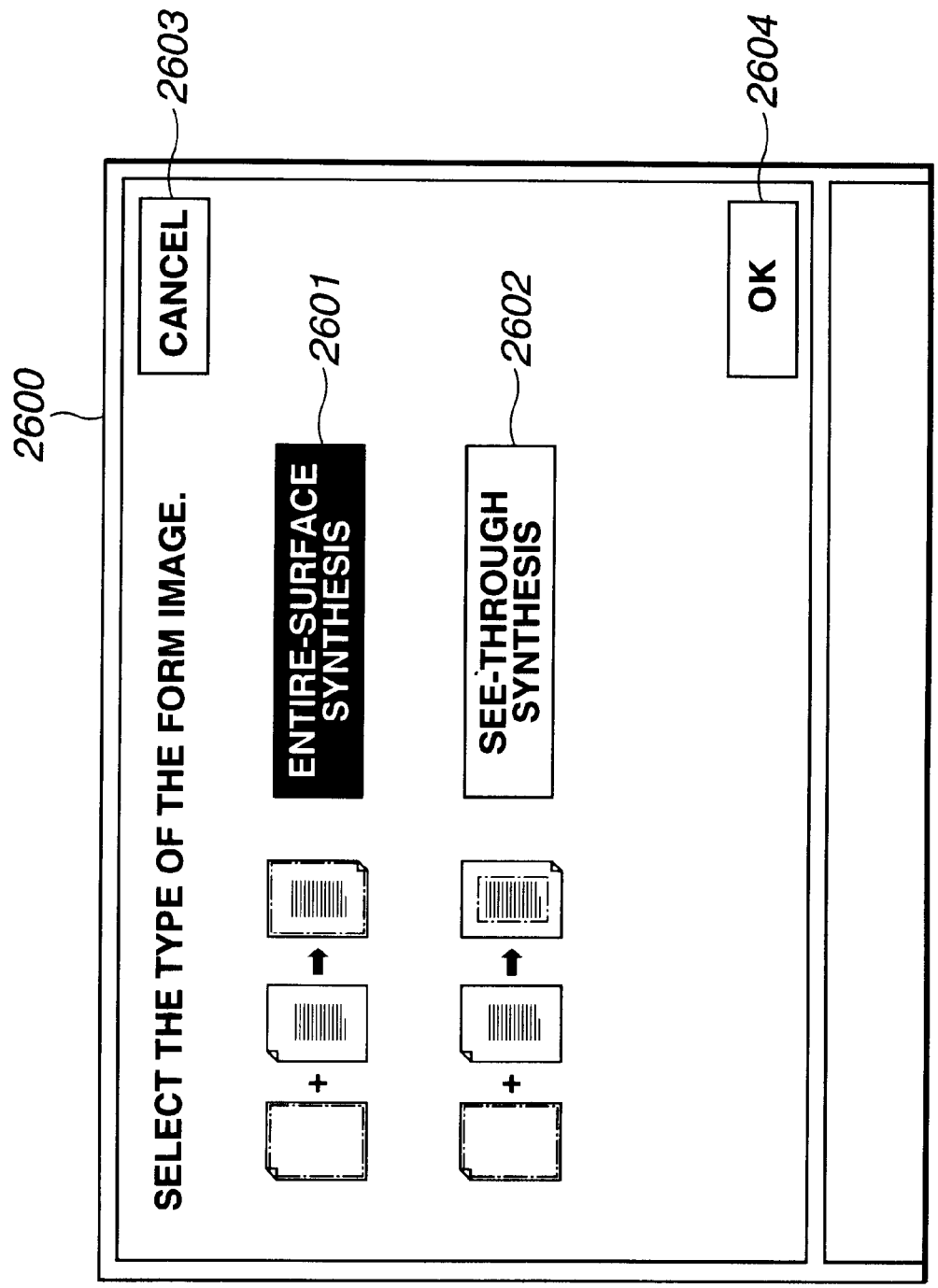

The form-type setting picture frame 2600 shown in FIG. 26 will now be described. In FIG. 26, reference numeral 2601 represents an entire-surface synthesis selection button. When the user depresses the entire-surface synthesis selection button 2601, the button 2601 is subjected to black-and-white reversal display, and a state of being capable of performing selection is provided.

Reference numeral 2602 represents a see-through-synthsis selection button. When the user depresses the see-through-synthesis selection button 2602, the button 2602 is subjected to black-and-white reversal display, and a state of being capable of performing selection is provided. The entire-surface-synthesis selection button 2601 and the see-through-synthesis selection button 2602 are exclusive, so that one of these buttons is in a state of black-and-white reversal. A button subjected to black-and-white reversal is in a state of selection.

Reference numeral 2603 represents a cancel button. When the cancel button 2603 is depressed, setting on this picture frame is not performed, and the picture frame returns to the original-size setting picture frame 2500 shown in FIG. 25.

Reference numeral 2604 represents an OK button. When the user selects entire-surface synthesis and depresses the OK button 2604, setting of registering an original-image to be read as a form image is provided, and the picture frame returns to a basic picture frame 2700 shown in FIG. 27.

Figure 27:
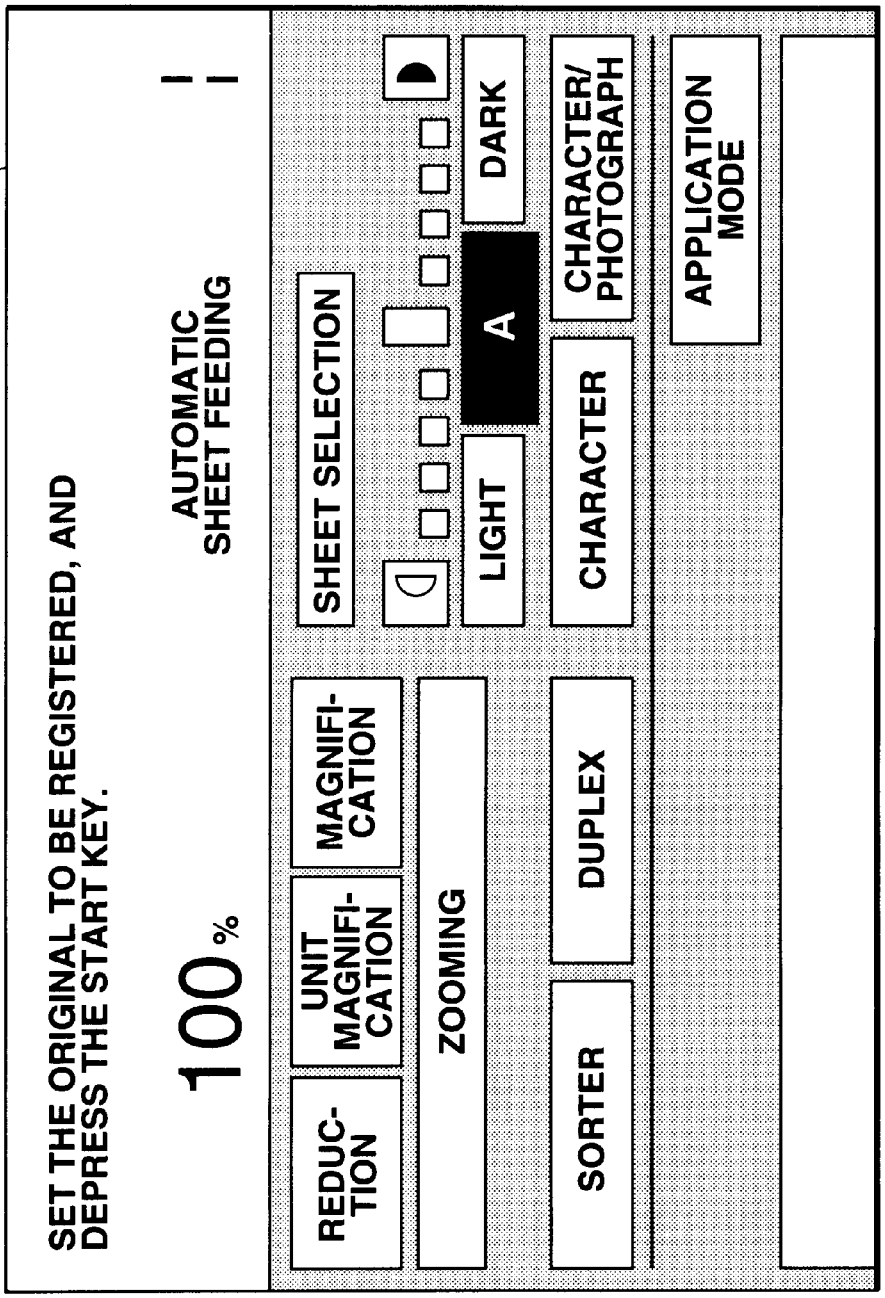

On the other hand, when see-through synthesis is selected and the OK button 2604 is depressed, setting of reducing the density of an original-image to be read and registering the original-image as a form image is provided, and the picture frame returns to the basic picture frame 2700 shown in FIG. 27.

The basic picture frame shown in FIG. 27 illustrates a state of awaiting reading of a form image. When the user depresses the start key 614 of the copier 100 in this state, the copier 100 starts original-reading processing.

Figure 28:
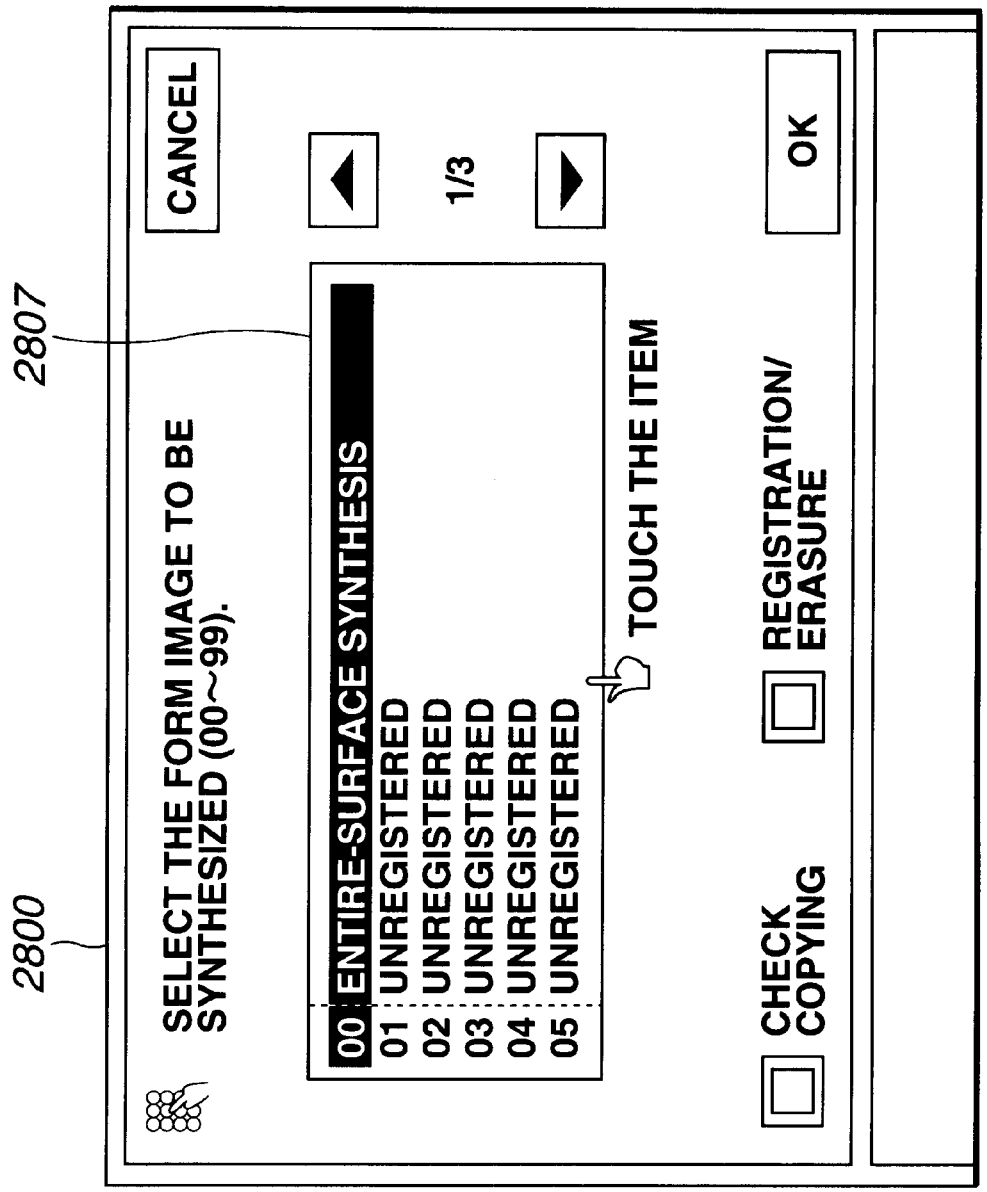

After completing reading of the form image on the picture frame shown in FIG. 27, the picture frame shifts to a picture frame 2800 shown in FIG. 28. The form image having a number 00 displayed in the list on a display region 2807 is replaced by read image data.

In this embodiment, reregistration of a form image in a region where the form image has been stored in advance is performed. However, by selecting the number of an unregistered form image from among form images whose list is displayed on the picture frame 2300 shown in FIG. 23, and depressing the registration/erasure button 2305, the user can perform the above-described setting of registration and newly register a form image.

Figure 29:
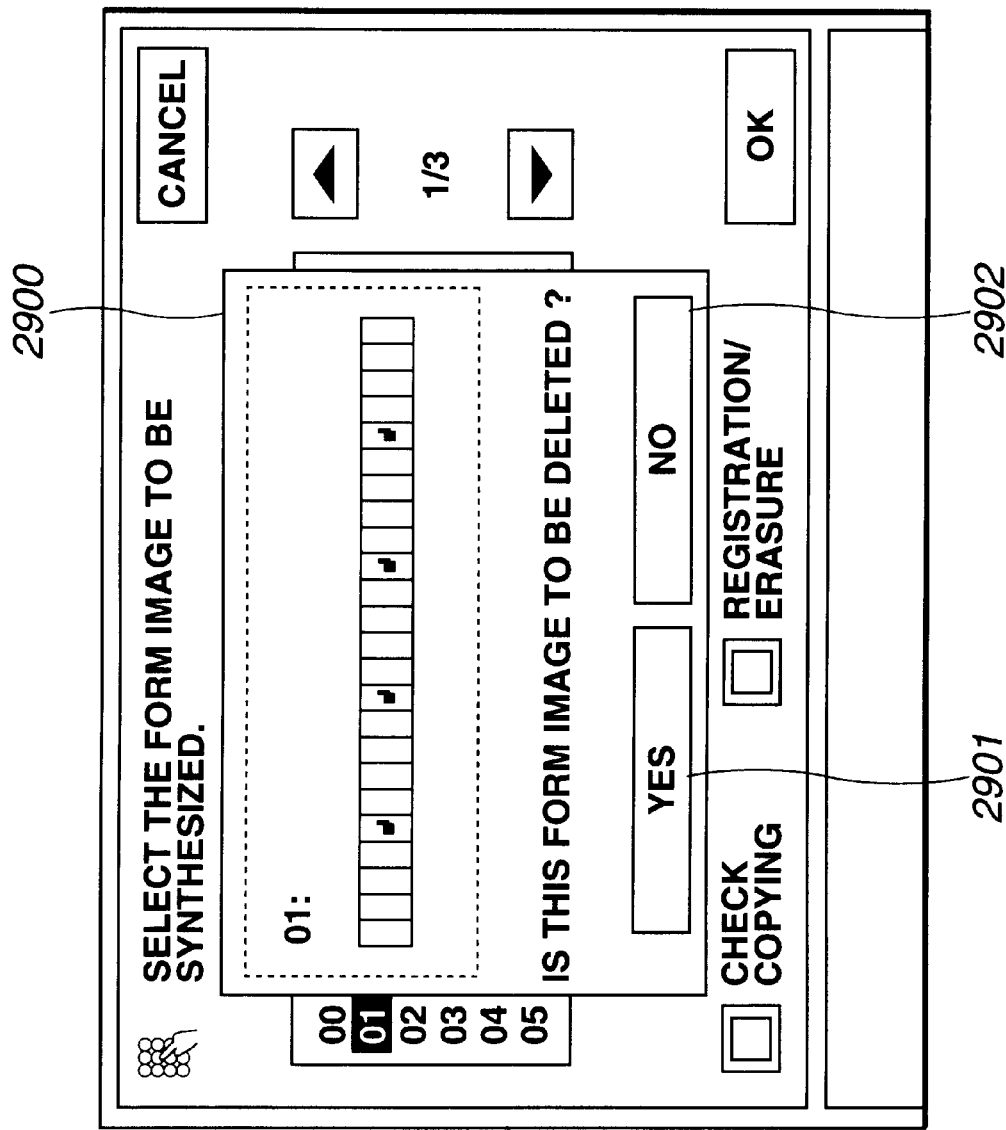

Next, a description will be provided of the operation when the user depresses the erasure button 2403 on the picture frame 2400 shown in FIG. 24. When the user depresses the erasure button 2403 on the picture frame 2400 shown in FIG. 24, a picture frame 2900 for confirming erasure of a form image shown in FIG. 29 is popped up.

On the picture frame 2900, the user can set whether or not a form image selected on the picture frame 2300 shown in FIG. 23 is to be erased from the HD 304. A NO button 2902 shown on the picture frame 2900 is for returning to the setting-contents selection picture frame 2400 shown in FIG. 24 without erasing the form image selected in FIG. 23.

Figure 30:
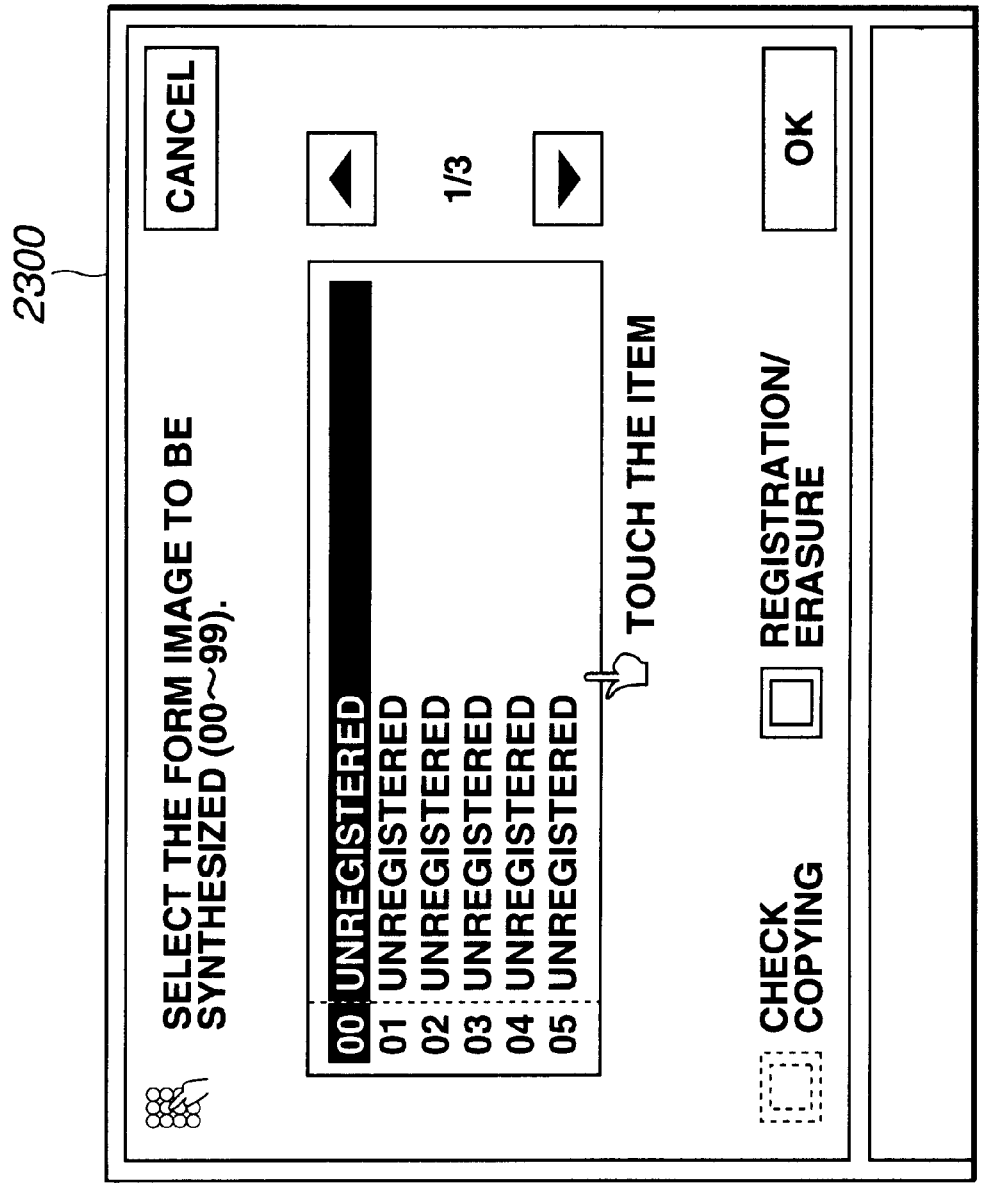

An YES button 2901 is for returning to the image-synthesis setting picture frame 2300 shown in FIG. 23 after erasing the form image selected in FIG. 23. In this case, as shown in FIG. 23, only one form image is registered on the HD 304. Hence, when this form image has been erased from the HD 304, the image-synthesis setting picture frame 2300 shown in FIG. 23 is shifted to a picture frame shown in FIG. 30.

Next, a description will be provided of the processing when the user depresses the image synthesis button 1302 shown in FIG. 13 during output of an form image (during output of image synthesis).

Figure 31:
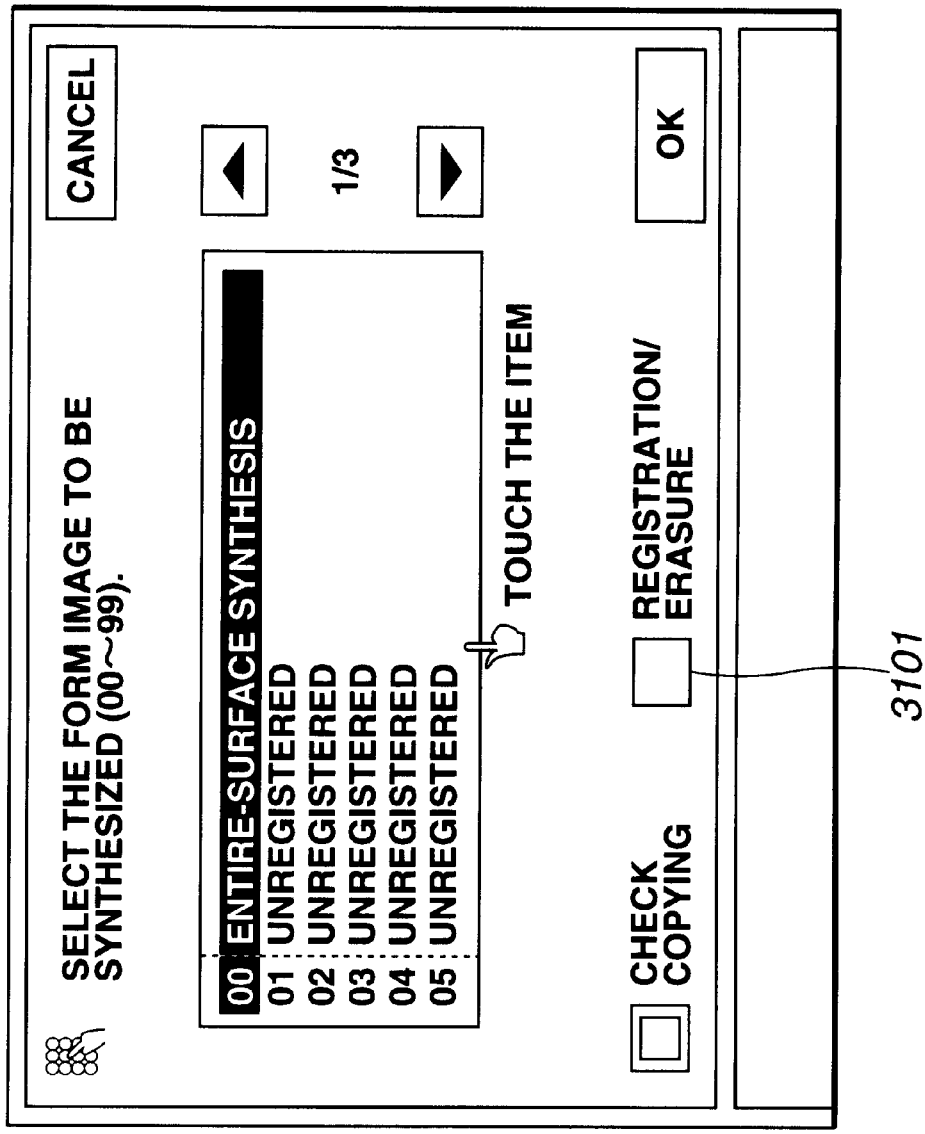

When the user depresses the image synthesis button 1302 shown in FIG. 13 during output of a form image (during output of image synthesis), an image-synthesis setting picture frame shown in FIG. 31 is displayed.

In contrast to the picture frame shown in FIG. 23, in the picture frame shown in FIG. 31, a registration/erasure button 3101 is subjected to light display. When the display of a button is light as in this case, a state of not reacting even if the user depresses the button (an ineffective state) is provided. Thus, registration or erasure of a form image from the HD 304 during output of image synthesis is prohibited. When a plurality of form images are registered on the HD 304, the user can select none of the form images.

In this embodiment, as shown in FIG. 31, the registration/erasure button 3101 on the image-synthesis setting picture frame is made in an ineffective state during output of image synthesis. However, the registration/erasure button 3101 may be put in an ineffective state only when the user selects a form image used in image synthesis output processing. In this case, only the form image being used cannot be registered/erased.

Next, a description will be provided of a case in which the sorter key 625 is depressed by the user on the basic picture frame shown in FIG. 6.

The sorter key 625 is for selecting sheet discharging processing. When the user depresses the sorter key 625, the picture frame is switched to a sheet-discharging-processing selection picture frame shown in FIG. 33.

Figure 33:
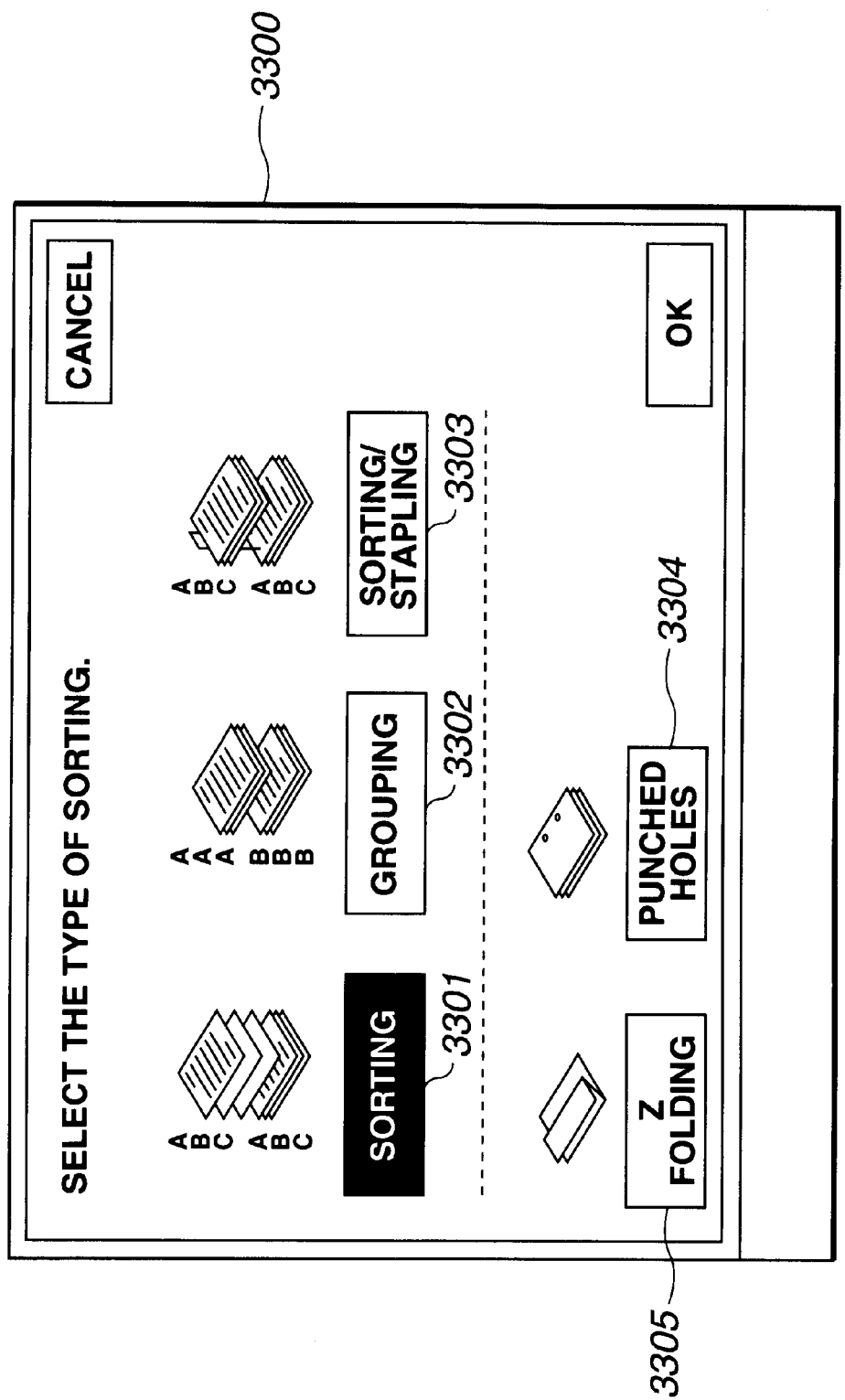

In FIG. 33, a button 3301 is for selecting sorting sheet discharging processing, and a button 3302 is for selecting grouping sheet discharging processing. A button 3305 is for selecting sheet discharging processing in which a sheet is discharged while a half portion of the sheet is folded in the form of a Z. A button 3304 is for selecting sheet discharging processing in which a sheet is discharged with holes punched therein.

A button 3303 is for selecting sorting/stapling sheet discharging processing. When the user depresses the button 3303, the picture frame is switched to a staple-position setting picture frame 3400 shown in FIG. 34.

Figure 34:
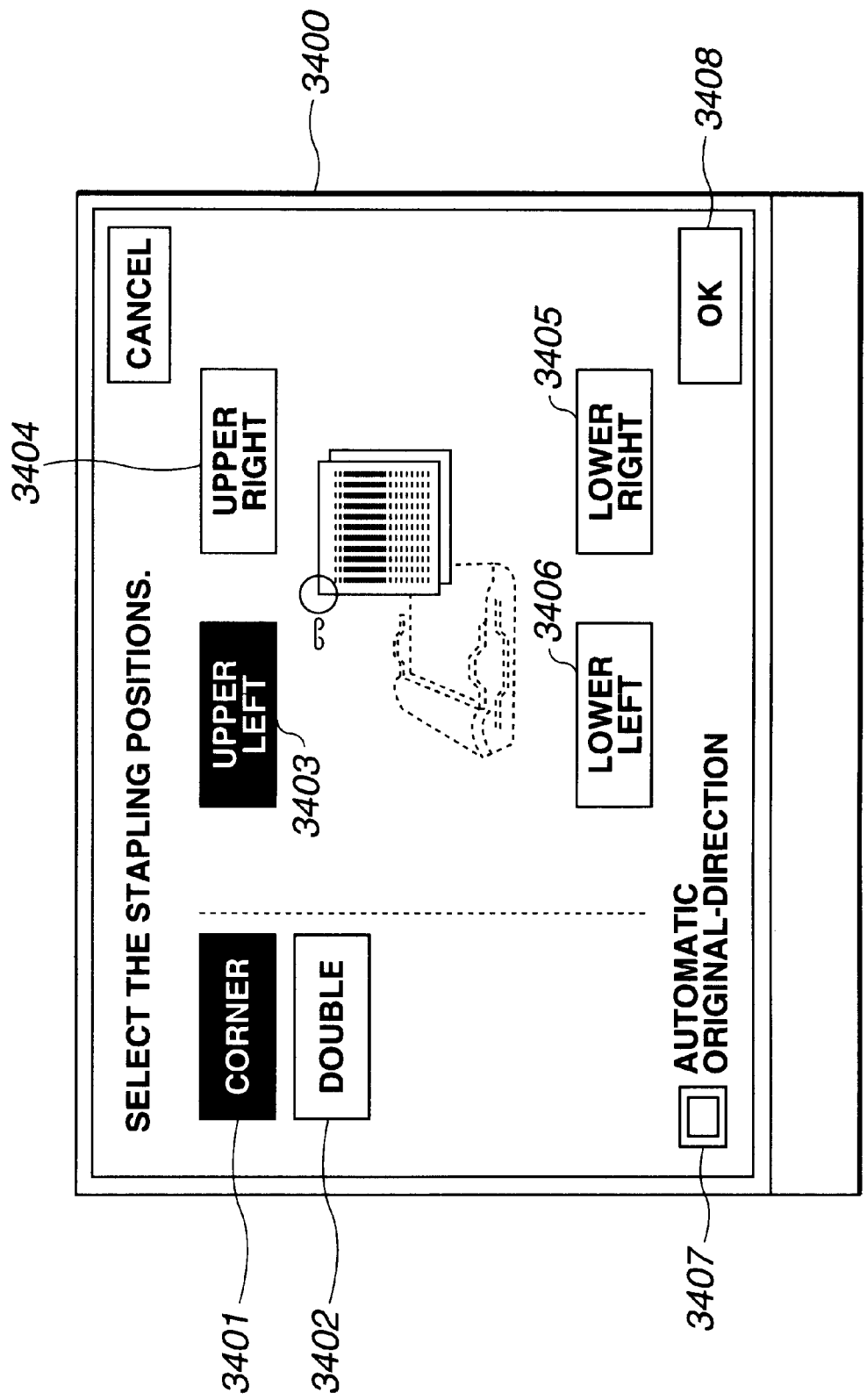

In FIG. 34, each of buttons 3401 and 3402 is for selecting the type of stapling. When the user depresses the button 3401, setting of performing single stapling at a corner is provided. When the user depresses the button 3402, setting of performing stapling at two portions is provided.

Each of buttons 3403, 3404, 3405 and 3406 is for setting the position of a staple. A button 3407 is for setting whether or not automatic original-direction detection is to be performed when stapling sorting has been selected. When the user depresses the button 3407, the direction of an original is determined when reading the original, and control is performed so that stapling is performed at the position selected by one of the buttons 3403, 3404, 3405 and 3406. When automatic original-direction detection is not to be performed, the direction of the original is not determined, and stapling is performed at the position selected by one of the buttons 3403, 3404, 3405 and 3406 on the image of the original.

A personal box According to this embodiment will now be described with reference to FIG. 35. The HD 304 is configured by a temporary region 900 and a personal-box region 901. The temporary region 900 is for temporarily storing image data for performing electronic sorting. After completion of a job, the image data is erased.

The personal-box region 901 is for storing image data obtained by developing a PDL image from the host computer 1000 into a personal box corresponding to the personal-box number received from the host computer 1000 within the personal-box region 901.

Figure 35:
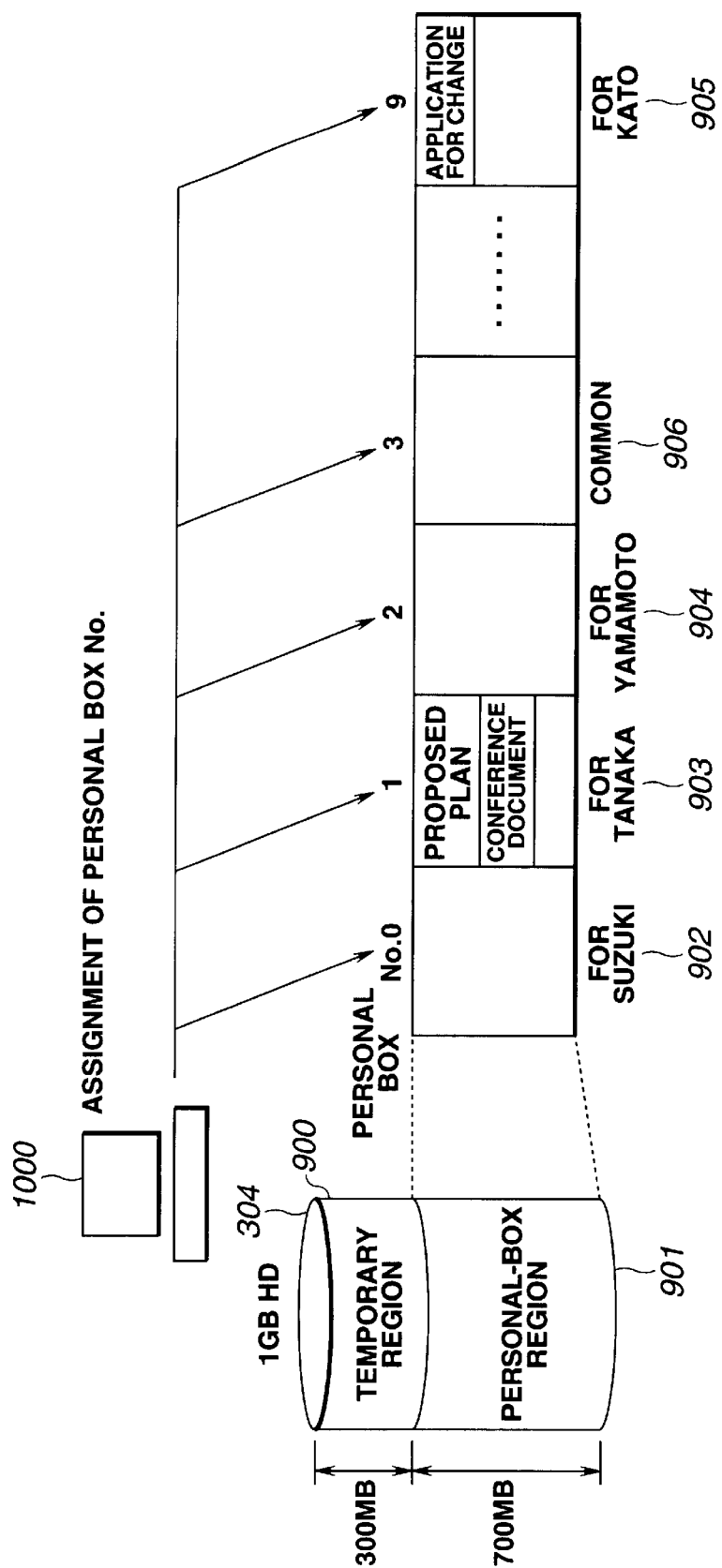
FIG. 35 is a diagram illustrating personal boxes.

As shown in FIG. 35, in this embodiment, in the case of a 1 GB hard disk, capacities of 300 MB and 700 MB are used for the temporary region 900 and the personal-box region 901, respectively. When the number of personal boxes is 10, the region of a box possessed by an individual person or a common box shared by users has a capacity of 70 MB. Each personal box has a number. For example, boxes 902, 903, 904, 905 and 906 have personal-box numbers 0, 1, 2, 9 and 3, respectively.

The user selects a personal box where image data to be printed is stored from the personal-box region 901 on the operation unit 172.

In addition to image data, data relating to a printing mode necessary during printing for the image data stored in a personal box (setting-item data, such as the number of copies of the image data, the size of recording sheets to be output, indication of simplex output or duplex output, sheet discharging processing, and the like) and information relating to automatic erasure processing of the image data (the time of storage of the image data in the box, and the time of automatic erasure) are also stored in the personal-box region 901.

As described above, in this embodiment, data relating to the printing mode output from the host computer 1000 is stored in the personal-box region 901 of the HD 304 together with a series of image data (i.e., data for one job) so as to correspond to the series of image data. Accordingly, when a plurality of documents (image data) are stored in a personal box, data relating to the printing mode set by the host computer 1000 (in this case, initial-setting data) is stored for each document. The data relating to the printing mode set by the host computer 1000 is held on the HD 304 until the series of image data corresponding to the data relating to the printing mode is erased from the personal box, so as to be readable from the HD 304 immediately in accordance with a predetermined operation by the user (by depressing a renewed-setting-clear button 3905 (to be described later)). When renewed setting of a printing mode by the user on the operation unit of the copier is performed using picture frames 3800 and 3900 shown in FIGS. 38 and 39, respectively, as will be described later, both printing-mode data set in advance by the host computer and priting-mode data renewedly set on the operation unit may be held on the HD 304, so that any one of the stored data may be readable from the HD 304 in accordance with a request from the user. In this case, also, printing-mode data is stored for each series of image data (for each job).

Each personal box can set an automatic erasure function. The automatic erasure function is a function for performing automatic image-data erasing processing in which image data stored in a personal box is automatically erased from the HD 304 in accordance with the lapse of a set period until automatic erasure from storage of image data in the personal box (for example, 2 hours). The period until automatic erasure can be set by the user.

By setting the automatic erasure function for a personal box, it is possible to solve the problem of the HD 304 becoming full due to image data arbitrarily transmitted from the host computer 1000, thereby becoming incapable of storing desired image data. The time until automatic erasure differs depending on the time of storage of image data in the personal box.

A description will now be provided of the processing of storing image data from the host computer 1000 into a personal box, with reference to FIG. 35. For example, when Mr. Tanaka intends to store image data in his box 903, the box number 1 is assigned through the host computer 1000.

For example, when Mr. Tanaka intends to store image data in another person's, for example, Mr. Kato's, box 905, the box number of the box to which image data is to be transmitted, i.e., the box number 9, is assigned through the host computer 1000. It is thereby possible to store image data formed by oneself in another person's box.

Figure 36:
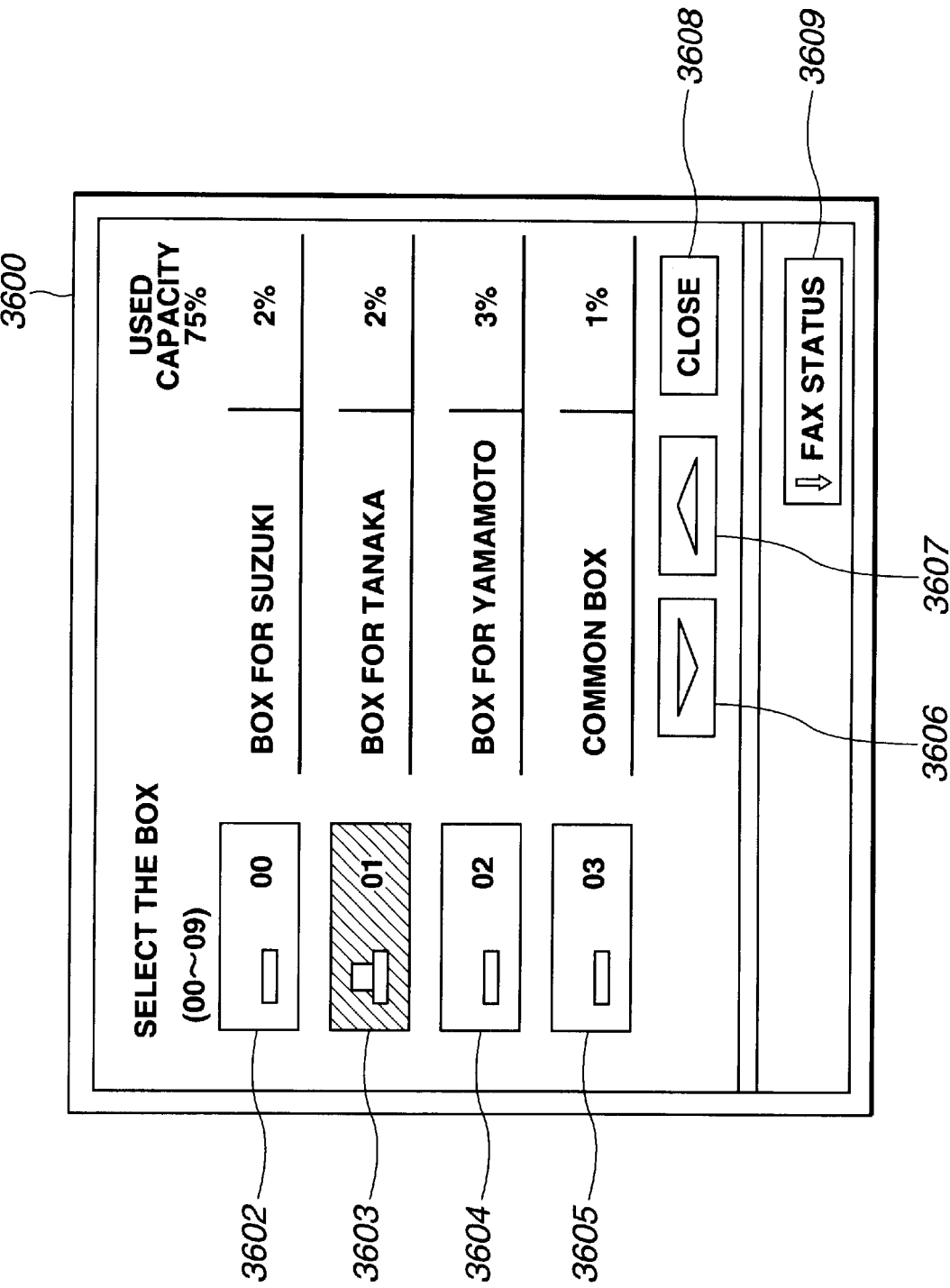
FIGS. 36–39 are diagrams, each illustrating a picture frame on the operation unit shown in FIG. 5.

A picture frame shown in FIG. 36 is a main picture frame 3600 for personal boxes displayed on the display panel 620 of the operation unit. The picture frame 3600 is displayed when the user depresses the personal-box key 634 of the operation unit shown in FIG. 5.

The picture frame 3600 shown in FIG. 36 is for displaying, for example, that the number of personal boxes is 10, box numbers 00–10 are provided for the respective boxes, and image data for each person input from the host computer 1000 is stored in the corresponding one of the boxes. In each of the personal boxes, image data is stored in a state in which PDL data from the host computer 1000 is developed into bit-map data.

A name is provided for each personal box number on a picture frame (not shown) of the operation unit. For example, a name "Tanaka's box" is provided for box number 1, indicating that this is a box used by Mr. Tanaka.

A percent value displayed at the right end of the row for each box indicates the ratio of use of that box to the capacity of the !hard disk for the entire personal-box region. For example, when the capacity of the hard disk for the personal-box region is 700 MB, the box number 01 occupies 2% of the capacity, i.e., about 14 MB.

Buttons 3602, 3603, 3604 and 3605 are for entering in a mode for displaying the contents of jobs stored in boxes having the box numbers 00, 01, 02 and 03, respectively.

For example, when Mr. Tanaka has stored image data in his personal box by selecting box number 1 at the host computer 1000, and then intends to print the image data stored in the his personal box using the copier 100, he depresses the button 3603 for his box number, 01, on the picture frame 3600.

When Mr. Tanaka depresses the button 3603, the picture frame is switched to a printing-mode picture frame for printing the image data stored in the personal box. The printing mode will be described later.

When the user selects a box used by an individual person, such as the box number 00, 01, 02 or the like, instead of a box shared by a plurality of people, such as the "common box" having the box number 03 shown in FIG. 36, a password input picture frame may be displayed after the user has depressed the box number, and a printing-mode picture frame may be displayed in accordance with the user's input of a password corresponding to the box on that picture frame.

Althogh in this embodiment, image data received from the host computer is stored in a personal box, image data representing an original read by the reading unit of the copier 100 may be stored in a personal box. In such a case, also, the printing mode set on the operation unit 172 and the image data are stored in the personal-box region 901 so as to correspond to each other, and data relating to the printing mode set on the operation unit 172 (initial setting printing-mode data) is held on the HD 304 until the image data is erased from the personal box.

Reference numerals 3606 and 3607 represent upward and downward scroll keys, respectively. By depressing these keys, it is possible to scroll the picture frame, and to see the name and the capacity of use of the box number of each personal box where image data is stored and which is not displayed on the picture frame.

Reference numeral 3608 represents a close key. By depressing the key 3608, it is possible to return to the main picture frame shown in FIG. 5. A reference numeral 3609 represents a fax-status key. By depressing the key 3609, it is possible to confirm the state of facsimile transmission/reception.

Figure 37:
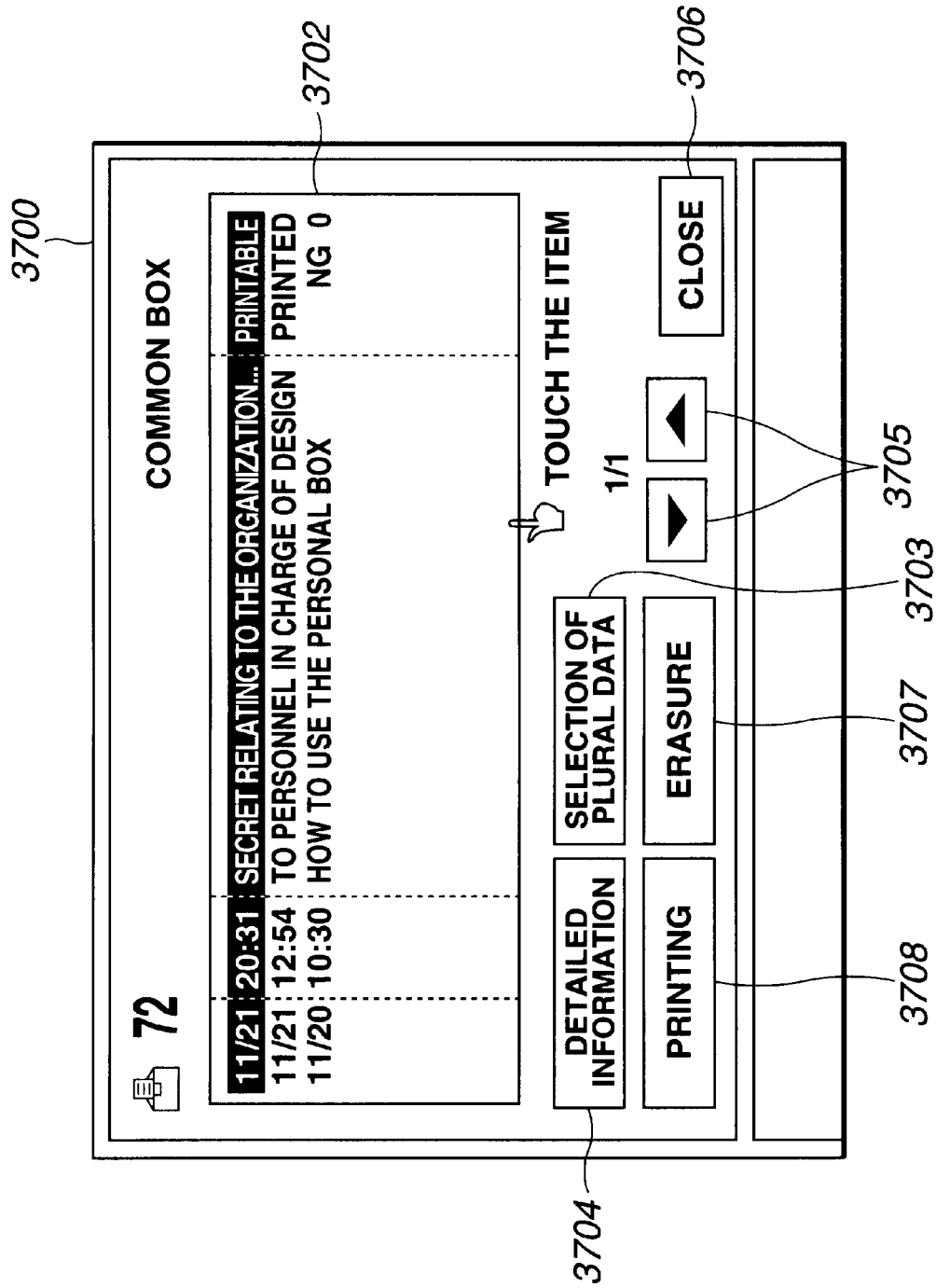

FIG. 37 illustrates a personal-box printing picture frame 3700 (corresponding to a printing-mode picture frame) for displaying the list of image data stored in the personal box selected by the user on the main picture frame 3600 for the personal boxes shown in FIG. 36.

The personal box printing picture frame 3700 shown in FIG. 37 is displayed, for example, when the user depresses the button 3605 for the "common box" having the box number 03 on the main picture frame 3600 for the personal boxes shown in FIG. 36.

The list of information relating to image data stored in this box (the date and time of data storage, the document name, and indication of whether or not the document has been printed) is displayed on a display region 3702.

In the case shown in FIG. 37, when printing image data from a personal box, it is possible to select a plurality of series of desired image data (documents) from among a plurality of series of image data stored in the personal box, and print the pluralilty of series of desired image data (document) at a time.

It is also possible to select a plurality of series of desired image data (documents) from among a plurality of series of image data stored in the personal box, and erase the pluralilty of series of desired image data (documents) from the HD 304 at a time.

A plural-data selection button 3703 is for allowing, when intending to print a plurality of series of image data stored in the personal box at a time (i.e., to print a plurality of documents at a time), or to erase a plurality of image data at a time (i.e., to erase a plurality of documents at a time) from the HD 304, selection of a plurality of series of image data (i.e., a plurality of jobs) from among a series of image data (i.e., data for one job) stored in the personal box.

Figure 41:
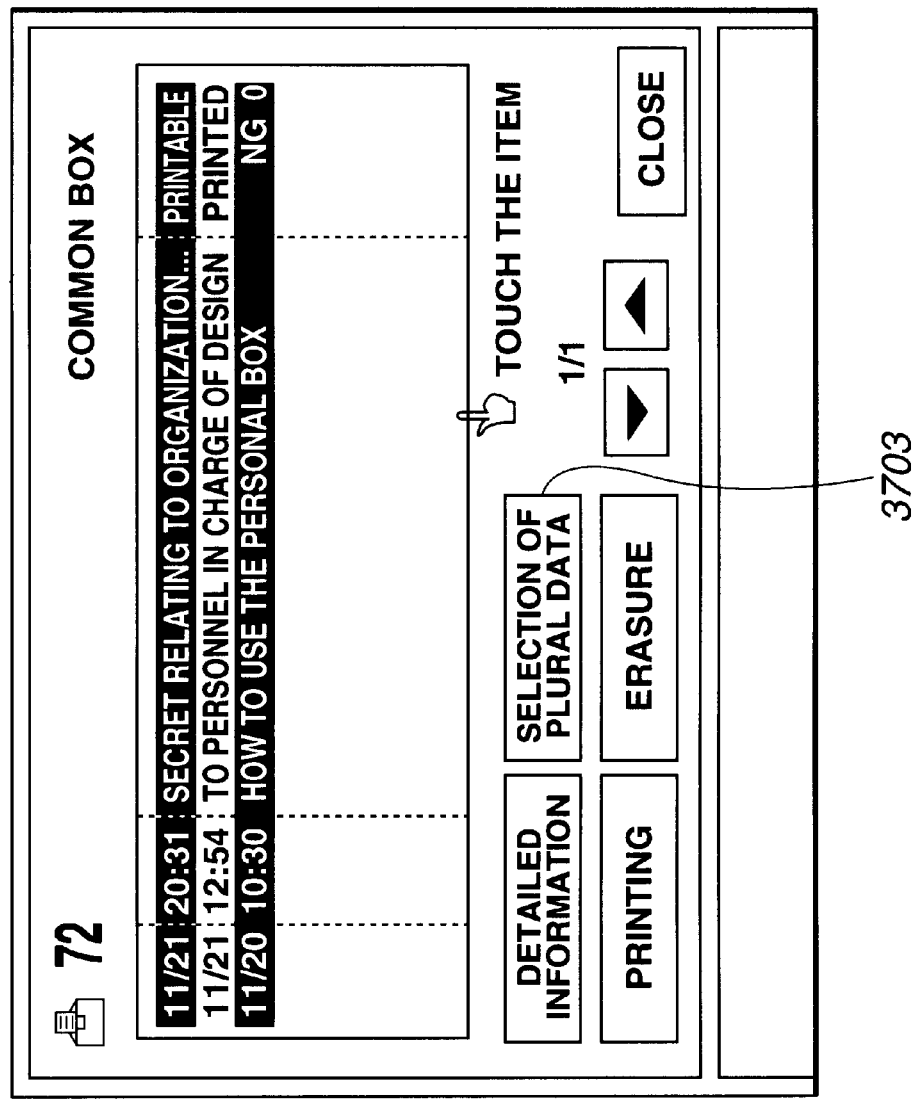
FIG. 41 is a diagram illustrating a picture frame on the operation unit shown in FIG. 5.

When the user depresses the plural-data selection button 3703 and selects a plurality of desired image data from among image data displayed within the display region 3702, a plurality of jobs selected by the user are subjected to black-and-white reversal display, as indicated on a picture frame shown in FIG. 41.

A detailed-information button 3704 is for shifting to a picture frame (not shown) displaying detailed information relating to the image data selected by the user (such as the capacity of use of the image data with respect to the total storage capacity of the HD 304, the number of originals and the number of output copies set by the host computer 1000 in advance, and the like).

Upward and downward scroll buttons 3705 are for scrolling the picture frame when displaying a large number of jobs which cannot be displayed on one picture frame). A close button 3706 is for returning to the main picture frame 3600 for the personal boxes shown in FIG. 36.

An erasure button 3707 is for erasing the image data selected by the user on the display region 3702 from the personal box.

A printing button 3708 is for printing the image data selected by the user on the display region 3702.

Figure 38:
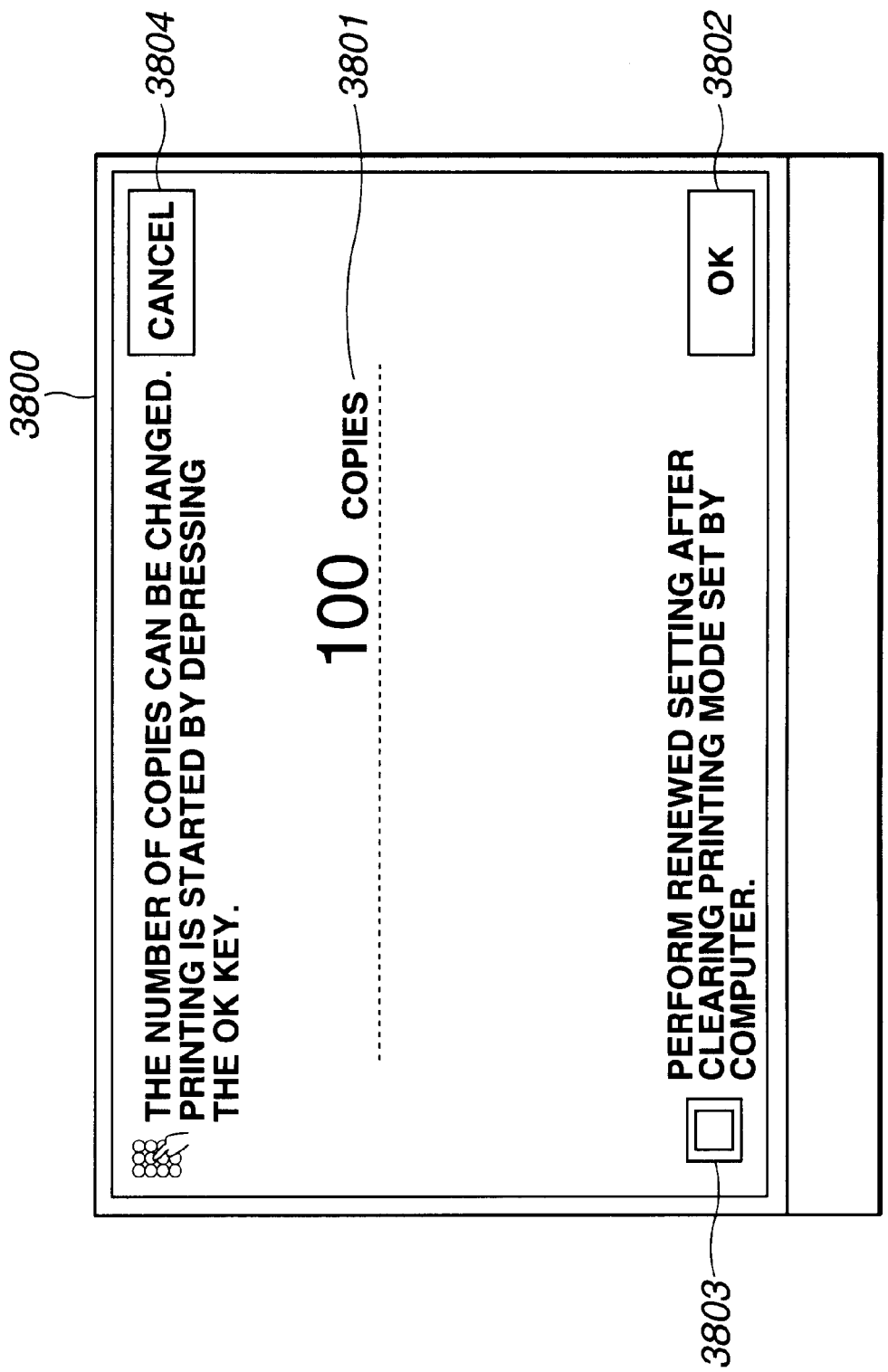

In the case shown in FIG. 37, when the user selects only one desired image data on the display region 3702 without depressing the plural-data selection button 3703, and depresses the printing button 3708, a copy-number changing picture frame 3800 shown in FIG. 38 is displayed. The user can change setting of the number of output copies of image data on the picture frame 3800. The picture frame further shifts from the picture frame 3800 shown in FIG. 38 to a printing-mode setting picture frame 3900 shown in FIG. 39. On the picture frame 3900, the user can change setting of the printing mode for the image data.

On the other hand, when the user depresses the plural-data selection button 3703, selects a plurality of desired image data on the display region 3702, and depresses the printing button 3708, printing of the image data is started based on the number of output copies of the image data and the printing mode set in advance by the host computer 1000, without displaying the picture surface 3800 in order to prohibit changes in the number of output copies of the image data and setting of the printing mode.

For example, in the state of the picture frame shown in FIG. 41, i.e., in a state in which after depressing the plural-data selection button 3703, the user selects, for example, a 6-page job that is a document titled "Secret Relating to the Organization" as a 4-page job that is a document titled "How to Use the Personal Box" from among a plurality of jobs within the box (corresponding to a plurality of respective series of image data) within the panel, if the user depresses the printing button on the picture frame, image data of the job of the document titled "Secret Relating to the Organization" and the job of the document titled "How to Use the Personal Box" is sequentially read from the HD 304, without shifting to the picture frames for renewedly setting the printing mode (the picture frame 3800 and 3900), and printing processing based on the printing-mode data (initial setting printing-mode data) set in advance by the host computer 1000 is executed.

As for display of a picture frame, when the user depresses the plural-data selection button 3703, then selects a plurality of documents (files) desired by the user from within the box, and depresses the printing button, a message picture frame describing, for example, "The number of currently selected files is two. Since a plurality of files are selected, the settings cannot be changed. If it is intended to change the setting for printing, select only one file." may be displayed on the display panel 620 in order to ask the user to confirm the contents. When the user depresses the OK button on the picture frame, printing processing may be started.

Thus, an erroneous change of the printing mode by a user who does not know or remember all printing modes for a plurality of series of desired image data (a plurality of jobs) intends to print a plurality of image data (jobs) at a time is prevented.

A description will now be provided of the copy-number changing picture frame 3800 shown in FIG. 38. This picture frame 3800 is displayed when the user selects only one desired image data in the display region 3702 on the picture frame 3700 shown in FIG. 37 without depressing the plural-data selection button 3703, and depresses the printing button 3708.

In the case shown in FIG. 38, when the picture frame is switched from the picture frame 3700 shown in FIG. 37 to the picture frame 3800 shown in FIG. 38, the number of copies of image data set in advance by the host computer 1000 is displayed on the picture frame 3800. For example, in FIG. 38, it is indicated that the number of copies of image data set in advance by the host computer 1000 is 100.

When the user inputs the number of output copies of image data using the ten-digit keypad 622 of the operation unit in the state in which the picture frame 3800 is displayed, the number of copies of image data set in advance by the host computer 1000 can be changed.

The number of output copies of image data is displayed on a dislay region 3801. A numerical value corresponding to the number of copies of image data input by the user using the ten-digit keypad 622 is displayed on the display region 3801.

When the user inputs the number of copies of image data using the ten-digit keypad 622 of the operation unit in order to change the number of copies of image data, and depresses an OK button 3802, the copier 100 performs printing of image data for the number of copies displayed in the display region 3801.

A printing-mode renewed setting button 3803 is for changing the printing mode set in advance by the host computer 1000. When the user depresses the button 3803, a printing-mode setting picture frame 3900 shown in FIG. 39 is displayed.

An erasure or cancellation button 3804 is for canceling image-data printing processing. When the user depresses the button 3804, the picture frame returns to the personal-box printing picture frame 3700 shown in FIG. 37 without performing image-data printing processing.

Figure 39:
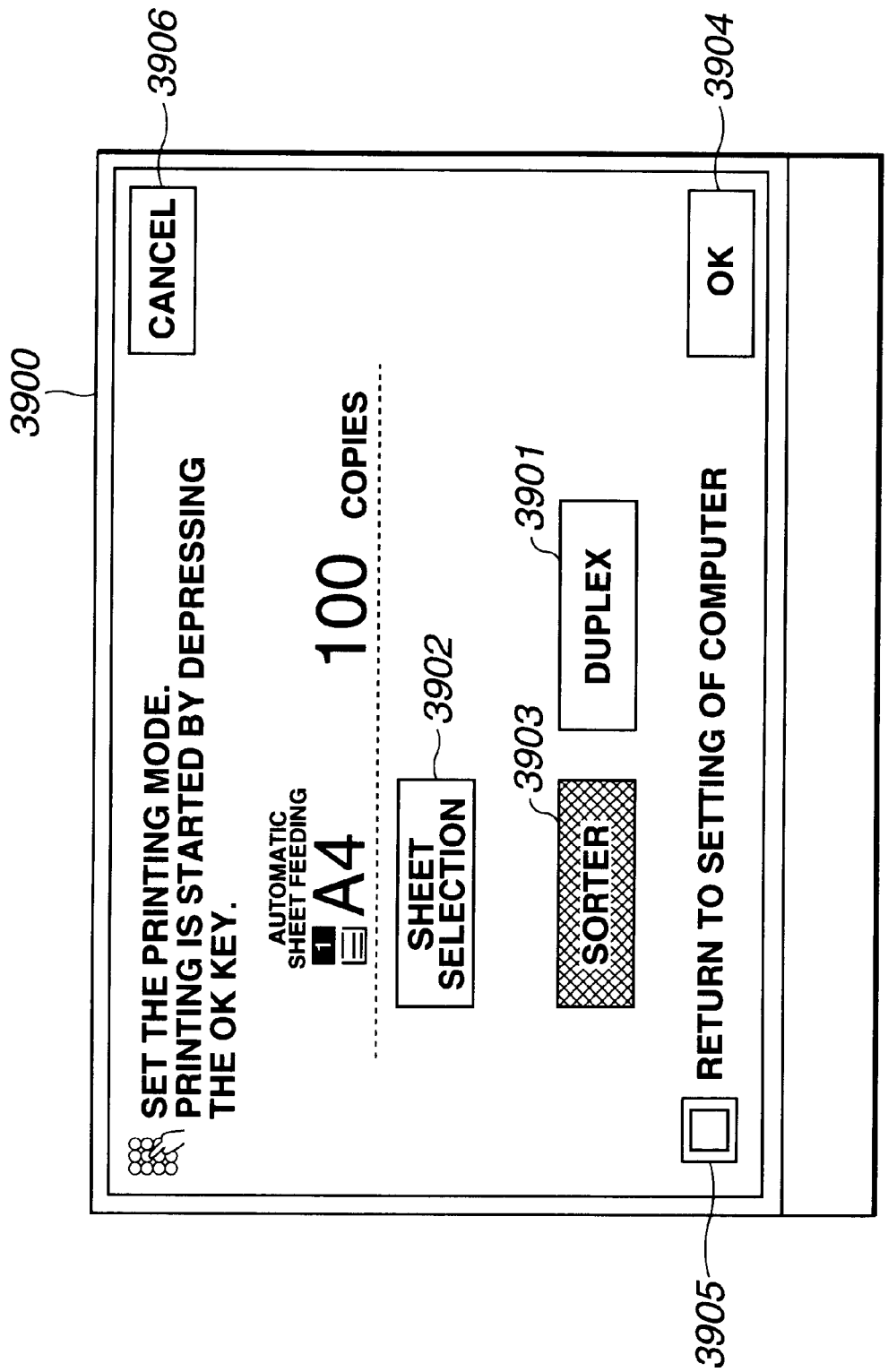

A description will now be provided of a printing-mode setting picture frame 3900 shown in FIG. 39. This picture frame 3900 is displayed when the user depresses the printing-mode renewed setting button 3803 on the picture frame 3800 shown in FIG. 38. The user can change the printing mode set in advance by the host computer 1000 (such as the number of copies of image data, the size of recording sheets to be output, indication of simplex output or duplex output, sheet discharging processing, and the like) on the picture frame 3900.

In the case shown in FIG. 39, when the picture frame 3900 is displayed, the printing mode for image data set in advance by the host computer 1000 is displayed.

For example, on the picture frame 3900 shown in FIG. 39, a mode in which the number of copies of image data is 100, the size of recording sheets to be output is A4, and simplex output is to be performed is displayed. As for setting of sorting, it is assumed that the pamphlet mode is selected.

In this case, the printing mode set in advance by the host computer 1000 assigns a number of output copies of image data of 100, simplex output for all pages to be output, and a size of recording sheets to be output of A4.

When the same setting is applied to all pages to be output as in the above-described case, the user can newly set duplex output for all pages, using a duplex setting button 3901.

Similarly, when the same sheet size is applied to all pages to be output, the user can newly set a sheet size for all pages using a sheet selection button 3902.

To set sorting, the pamphlet mode is set in advance by the host computer 1000 as described above. In this embodiment, layout processing in the pamphlet mode is performed when developing PDL data into bit-map data. The image data developed at the layout processing is stored on the HD 304. Hence, in order to prevent renewed setting of sorting by the user during output, a sorter selection button 3903 is subjected to halftone dot meshing.

That is, before processing of storing image data selected by the user on the HD 304, the CPU 171 determines whether or not the image data has already been subjected to predetermined processing (for example, layout processing, such as Nin1 or the like, and processing of synthesizing the image data with a form image). When it has been determined that editing processing for the image data has been performed before storage of the image data on the HD 304, in order to prevent the user from performing a changing operation relating to the image-data editing processing (such as performing renewed setting to instruct outputting of image data stored on the HD 304 in a state of 4in1 processing in a 2in1 state, performing renewed setting to instruct outputting of image data stored on the HD 304 in a state of synthesis with a form image in a state before the form image is synthesized, or the like), a button relating to such setting (for example, the button 3903 in the case of FIG. 39) is subjected to halftone dot meshing, indicating that it is in an ineffective state (a state in which it will not react even if the user depresses the button). On the other hand, in order to allow the user to perform a changing operation not relating to the image-data editing processing (such as performing renewed setting to instruct outputting of two copies instead of outputting one copy set by the host computer, performing renewed setting of duplex output instead of simplex output, a change in the size of printing sheets, or the like), buttons relating to such settings (for example, buttons 3901, 3902, and the like) are put in an effective state. Accordingly, when setting-item data relating to the type of sorting included in data relating to the printing mode set by the host computer represents, for example, a stapling sorting mode (in which binding processing is performed for a group of sheets having images formed thereon) instead of the pamphlet mode, the sorter selection button 3903 may be made in an effective state without being subjected to halftone dot meshing, in order to allow the user to perform such renewed setting. In this case, for example, by depressing the sorter selection button 3903, the user can change the stapling sorting mode to a non-sorting mode, a grouping sorting mode, or a sorting mode.

In order to faithfully reproduce image data formed by the host computer 1000, the CPU 171 may perform control such that the above-described processing of determining whether or not image-data editing processing has been performed before processing of storing image data on the HD 304 is not performed, setting items relating to predetermined processing for image data to be performed before processing of forming an image on a sheet (for example, image-data synthesis processing, Nin1 processing, magnified/reduced layout processing, image-data rotation processing, and the like) are not allowed to be changed by the user, and renewed setting relating to the predetermined processing for the image data is prohibited in advance. On the other hand, the CPU 171 may perform control such that other setting items which are not directly related to the predetermined processing for the image data, for example, setting relating to the number of output sheets where images are to be formed, setting relating to whether or not images are to be formed on both surfaces of a sheet, setting relating to processing of aligning sheets having images formed thereon, setting relating to the size of printing sheets, and the like, are allowed to be changed by the user, so that renewed setting of these items is allowed.

Thus, in this case, a button corresponding to an item which cannot be renewedly set by the user (setting of a sorter in the case of FIG. 39) is subjected to halftone dot meshing.

As described above, on the picture frame 3800 shown in FIG. 38, the user can change the number of output copies of a series of image data (documents) set in advance by the host computer 1000. In this embodiment, on the picture frame 3900, the number of output copies of image data can also be changed. In this case, the user sets the number of output copies of image data using the ten-digit keypad 622 of the operation unit.

On the picture frame 3900, when the user renewedly sets a printing mode and depresses an OK button 3904, the copier 100 peforms processing of printing image data in the printing mode set by the user.

A cancel button 3906 is for returning to the printing picture frame 3700 for the personal box without performing image-data printing processing.

A button 3905 for clearing renewed setting is for returning the printing mode renewedly set by the user to the printing mode set by the host computer 1000. When the user depresses the button 3905, the copier 100 returns the printing mode for a series of image data (corresponding to one document) to the printing mode set by the host computer 1000, and the picture frame returns to the copy-number setting picture frame 3800.

As described above, printing-mode data set by the host computer 1000 and stored on the HD 304 together with image data includes a plurality of setting-item data, such as setting relating to the number of output sheets where images are to be formed, setting relating to whether or not images are to be formed on both surfaces of a sheet, setting relating to processing of aligning sheets having images formed thereon (a non-sorting mode, a sorting mode, a stapling sorting mode, or the like), setting relating to the size of printing sheets, and the like. The printing mode set in advance by the host computer 1000 can be changed by the user for each set item on the setting picture frame 3800 or 3900 displayed on the operation panel 620 of the operation unit 172. If the user has changed one of a plurality of setting items on the operation unit 172 of the copier 100, and desires to return the changed setting item to the contents set by the host computer 1000, all of the plurality of setting items can return to the contents set by the host computer 1000, by merely a single depressing of the button 3905 on the picture frame 3900.

It is thereby possible to avoid the need for troublesome operations of returning each of a plurality of setting items to setting mode by the host computer 1000, when the user has changed some of the plurality of setting items on the operation unit 172, but desires to return the setting to the printing mode set by the host computer 1000.

Furthermore, when selecting a desired document (image data) from a box shared by plural persons, such as a common box, from among a plurality of personal boxes, and printing the selected document, if the user has depressed the button 3905 once before instructing printing, even if somebody has changed the printing mode for the document on the operation unit 172, the user can faithfully output data formed by the host computer 1000 without being aware of the change.

As described above, in this embodiment, the printing mode changed by the user on the operation unit 172 can return to the printing mode set by the host computer at a previous time, in accordance with a predetermined instruction.

Accordingly, when returning the printing mode changed on the operation unit 172 to the printing mode set by the host computer, it is possible to simplify the operation to be performed by the user, thereby improving the operability for the personal box.

Figure 40:
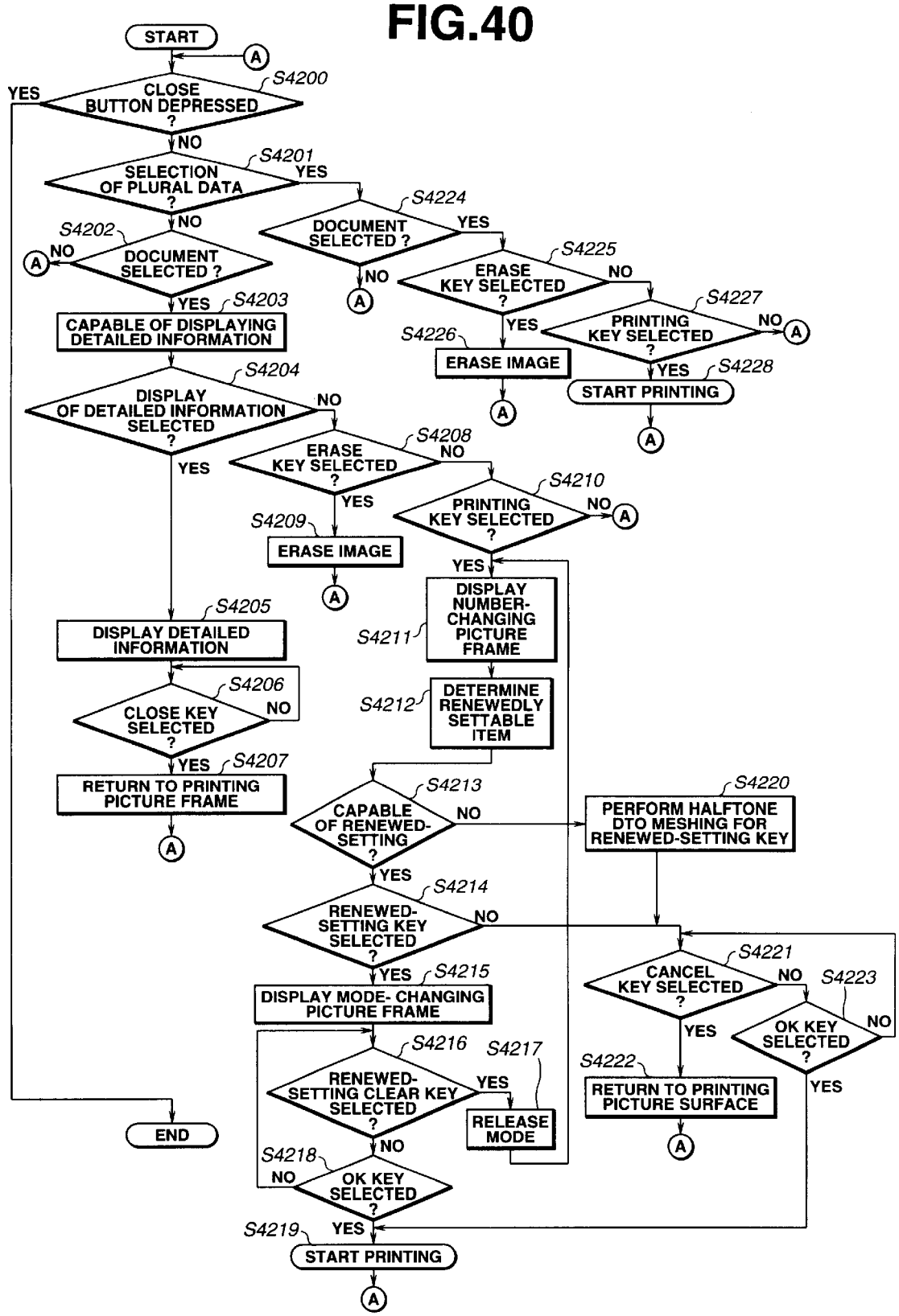
FIG. 40 is a flowchart illustrating the processing when printing image data stored in a personal box.

Next, a description will be provided of the processing of printing image data stored in a personal box, with reference to the flowchart shown in FIG. 40. This processing is performed every time the printing picture frame 3700 of the personal box shown in FIG. 37 is displayed on the display panel 620 of the operation unit. A program for executing the processing is stored in the ROM 174 as program codes. The CPU 171 reads and executes the program codes.

First, it is determined if the close button 3706 has been depressed by the user on the picture frame 3700 shown in FIG. 37 (step S4200). If the result of the determination in step S4200 is affirmative, this processing is terminated.

If the result of the determination in step S4200 is negative, then, it is determined if the user has depressed the plural-data selection button 3703 (step S4201).

If the result of the determination in step S4201 is negative, then, it is determined if image data has been selected by the user on the display region 3702 on the picture frame 3700 (step S4202).

If the result of the determination in step S4202 is negative, the process returns to step S4200. If the result of the determination in step S4202 is affirmative, the system assumes (enters) a state in which it is capable of displaying detailed information about the image data on the operation panel 620 (step S4203).

Upon completion of the processing of step S4203, it is determined if the detailed-information button 3704 has been depressed by the user on the picture frame 3700 shown in FIG. 37 (step S4204).

If the result of the determination in step S4204 is affirmative, a picture frame indicating detailed information relating to the image data selected by the user (such as the used capacity of the image data with respect to the entire storage capacity of the HD 304, the numbers of originals and output copies set in advance by the host computer 1000, and the like) is displayed on the display panel 620 (step S4205).

Then, it is determined if the close button 3706 on the picture frame 3700 shown in FIG. 37 has been depressed by the user in the state of displaying the detailed-information picture frame in step S4205 (step S4206). The processing of step S4206 is repeated until the close button 3706 is depressed by the user in the state of displaying the detailed-information picture frame.

If the result of the determination in step S4206 is affirmative, the picture frame returns to the printing picture frame 3700 of the personal box (step S4207), and the process returns to step S4200.

If the result of the determination in step S4204 is negative, then it is determined if the erasure button 3707 on the picture frame 3700 has been depressed by the user (step S4208).

If the result of the determination in step S4208 is affirmative, the image data selected by the user in step S4204 is erased from the HD 304 (step S4209), and the process returns to step S4200.

If the result of the determination in step S4208 is negative, then it is determined if the printing button 3708 on the picture frame 3700 has been depressed by the user (step S4210).

If the result of the determination in step S4210 is negative, the process returns to step S4200.

If the result of the determination in step S4210 is affirmative, the copy-number setting picture frame 3800 shown in FIG. 38 is displayed on the operation panel 620 (step S4211). When the user intends to change the number of output copies of image data set in advance by the host computer 1000, the user inputs the desired number of output copies using the ten-digit keypad 622 on the operation unit 172.

When the copy-number setting picture frame 3800 has been displayed in step S4211, then, in step S4202, determination of items which can be renewedly set (such as the number of output copies of image data, the size of sheets, indication of duplex printing/simplex printing, setting of sorting, and the Like) is performed for the image data selected by the user in step S4202 (step S4212). Then, it is determined if setting can be renewedly performed (step S4213).

If the result of the determination in step S4213 is affirmative, i.e., if there is at least one item which can be rnewedly set by the user, then it is determined if the user has depressed the button 3803 for renewed setting on the picture frame 3800 (step S41214).

If the result of the determination in step S4214 is affirmative, the printing-mode setting picture frame 3900 is displayed (step S4215). At that time, when there are items which cannot be renewedly set by the user, the corresponding buttons (for example the button 3903) are subjected to halftone dot meshing, and these items cannot be renewedly set by the user.

Then, it is determined if the user has depressed the button 3905 for clearing renewed setting on the picture frame 3900 (step S4216). If the result of the determination in step S4216 is affirmative, mode release is performed (step S4217), and the process returns to step S4211.

The mode release in step S4217 indicates an operation of releasing the printing mode renewedly set by the user at a time, and returning to the printing mode stored in advance on the HD 304, i.e., processing for returning the printing mode renewedly set by the user to the printing mode set in advance by the host computer 1000.

If the result of the determination in step S4216 is negative, then, it is determined if the user has depressed teh OK button 3904 on the picture frame 3900 (step S4218).

If the result of the determination in step S4218 is affirmative, printing of the image data is started based on the printing mode displayed on the picture frame 3900 (step S4219).

If the result of the determination in step S4218 is negative, the process returns to step S4216.

If the result of the determination in step S4213 is negative, the button 3803 for renewed setting is subjected to halftone dot meshing in order to prohibit the user from renewedly setting a printing mode and to prevent a shift to the printing-mode setting picture frame 3900 (step S4220).

If the result of the determination in step 4214 is negative, or after execution of step S4220, then, it is determined if the user has depressed the erasure button 3804 on the picture frame 3800 (step S4221).

If the result of the determination in step S4221 is affirmative, the picture frame is switched to the printing picture frame 3700 of the personal box (step S4222), and the process returns to step S4200.

If the result of the determination in step S4221 is negative, then it is determined if the user has depressed the OK button 3802 on the picture frame 3800 (step S4223).

If the result of the determination in step S4223 is affirmative, printing of the image data is started, based on the number of output copies displayed on the picture frame 3800 (step S4219). If the result of the determination in step S4223 is negative, the process returns to step S4221.

If the result of the determination in step S4201 is affirmative, then it is determined if the user has selected a plurality of image data (i.e., a plurality of jobs) on the display region 3702 on the picture frame 3700 (step S4224).

If the result of the determination in step S4224 is negative, the process returns to step S4200. If the result of the determination in step S4224 is affirmative, then it is determined if the user has depressed the erasure button 3707 on the picture frame 3700 (step S4225).

If the result of the determination in step S4225 is affirmative, then the plurality of image data selected by the user in step S4224 are erased from the HD 304 (step S4226), and the process returns to step S4200.

If the result of the determination in step S4225 is negative, then it is determined if the user has depressed the printing button 3708 on the picture frame 3700 (step S4227).

If the result of the determination in step S4227 is negative, the process returns to step S4200.

If the result of the determination in step S4227 is affirmative, then printing processing for the plurality of image data (i.e., the plurality of jobs) selected by the user in step S4224 is executed immediately, without peforming display switching operation from the picture frame 3700 to the picture frames 3800 and 3900 (step S4228), and the process then returns to step S4200.

According to the above-described processing, it is possible to return the printing mode changed by the user on the operation unit to the printing mode set by the host computer at a time in accordance with a predetermined instruction. Accordingly, when returning the printing mode changed on the operation unit to the printing mode set by the host computer 1000, it is possible to simplify the operation to be performed by the user.

Furthermore, when printing image data from a personal box, it is possible to select a plurality of desired image data (documents) from among image data (documents) stored in the personal box, and print the plurality of image data (documents) at a time. Hence, it is possible to simplify the operation to be performed by the user.

Similarly, by selecting a plurality of desired image data from among image data stored in a personal box, the plurality of image data can be erased from the HD 304 at a time.

When the user selects a plurality of image data (i.e., data for one job) from among image data stored in a personal box, it is prohibited to change the printing mode set by the host computer. This prevents the problem that, when printing a plurality of image data at a time, a user who does not grasp all printing modes for a plurality of desired image data may erroneously change the printing mode.

Accordingly, it is possible to improve the operability for a personal box, simplify the operation to be performed by the user, and improve the ease of using the personal box.

The objects of the present invention may, of course, also be achieved by supplying a system or an apparatus with a storage medium storing program codes of software for realizing the functions of the above-described embodiment, and reading and executing the program codes stored in the storage medium by means of a computer (or a CPU or an MPU (microprocessor unit)) of the system or the apparatus. In such a case, the program codes themselves read from the storage medium realize the functions of the above-described embodiment, so that the storage medium storing the program codes constitutes the present invention.

For example, a floppy disk, a hard disk, an optical disk, a magnetooptical disk, a CD(compact disc)-ROM, a CD-R (recordable), a magnetic tape, a nonvolatile memory. card, a ROM or the like may be used as the storage medium for supplying the program codes. The present invention may, of course, be applied not only to a case in which the functions of the above-described embodiment are realized by executing program codes read by a computer, but also to a case in which an OS (operating system) or the like operating in a computer executes a part or the entirety of actual processing, and the functions of the above-described embodiment are realized by the processing.

The present invention may, of course, be applied to a case in which, after writing program codes read from a storage medium into a memory provided in a function expanding board inserted into a computer or in a function expanding unit connected to the computer, a CPU or the like provided in the function expanding board or the function expanding unit performs a part or the entirety of actual processing, and the functions of the above-described embodiment are realized by the processing.

Although in the embodiment, a case of adopting an electrophotographic method using a laser beam in a printing mechanism has been described, the prensent invention is not limited to such an approach, but any other printing method (such as an LED printer, a thermal transfer printer, an ink-jet printer or the like) may, of course, also be adopted.

The individual components shown in outline or designated by blocks in the drawings are all well known in the image storage device arts, and their specific construction and operation are not critical to the operation or the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image storage apparatus comprising:
   storage means for storing a series of image data in a storage region and storing an image forming mode corresponding to the series of image data,
   changing means for changing the image forming mode for the series of image data stored in said storage region, so as to be available for the series of image data stored in the storage region, control means for causing to return the image forming mode for the series of image data changed by said changing means to a state which existed before change by said changing means, so as to be available for the series of image data stored in the storage region, in accordance with a predetermined instruction.

2. An image storage apparatus according to claim 1, wherein the image forming mode includes a plurality of setting-item data for the series of image data, wherein said changing means can change each of the setting-item data, and wherein said control means causes to return all of the setting-item data included in the image forming mode to the state which existed before change by said changing means, so as to be available for the series of image data stored in the storage region, in accordance with the predetermined instruction.

3. An image storage apparatus according to claim 2, wherein the plurality of setting-item data comprise setting data relating to a number of sheets where images are to be formed, setting data relating to whether or not images are to be formed on both surfaces of each of the sheets, setting data relating to aligning processing for the sheets having the images formed thereon, and setting data relating to a size of the sheets where images are to be formed.

4. An image storage apparatus according to claim 1, wherein the image forming mode includes a plurality of setting-item data, wherein said device further comprises determination means for determining whether or not setting-item data which can be changed is present from among the plurality of setting-item data, and wherein said control means selectively prohibits an operation of changing the image forming mode by said changing means, in accordance with a result of the determination by said determination means.

5. An image storage apparatus according to claim 1, wherein the image forming mode includes a plurality of setting-item data each of which can be changed by said changing means, wherein said image storage device further comprises determination means for determining whether or not predetermined processing has been performed for the image data before the processing of storing the image data by said storage means, and wherein said control means controls said changing means so as to prohibit a change in one of the plurality of setting-item data in accordance with a result of the determination by said determination means.

6. An image storage apparatus according to claim 1, wherein said image storage device outputs the series of image data stored in the storage region to an image forming apparatus for forming an image on a sheet based on the image data and the image forming mode corresponding to the image data.

7. An image storage apparatus according to claim 1, wherein the image forming mode includes a plurality of setting-item data, and wherein said control means controls said changing means so as to prohibit, in advance, an operation of changing setting-item data relating to predetermined processing for image data stored in the storage region, and so as to allow an operation of changing setting-item data not relating to the predetermined processing for the image data.

8. An image storage apparatus according to claim 7, wherein the setting-item data relating to the predetermined processing for the image data includes setting data relating to magnification changing processing for the image data.

9. An image storage apparatus according to claim 7, wherein the setting-item data not relating to the predetermined processing for the image data includes setting data relating to a number of sheets where images are to be formed.

10. An image storage apparatus according to claim 1, wherein said storage means can store the series of image data in one of a plurality of storage regions, and wherein a plurality of respective series of image data can be stored in each of the storage regions.

11. An image storage apparatus according to claim 10, wherein said storage means stores an image forming mode so as to correspond to each series of image data stored in the storage region.

12. An image storage apparatus according to claim 11, further comprising selection means for selecting one of the plurality of respective series of image data stored in the storage region, wherein said changing means changes the image forming mode corresponding to the series of image data selected by said selection means, and wherein said control means causes to return the image forming mode of the series of image data selected by said selection means and changed by said changing means to a state which existed before change by said changing means, so as to be available for the series of image data selected by said selection means, in accordance with the predetermined instruction.

13. An image storage apparatus according to claim 1, wherein said storage means stores a series of image data output from an external apparatus in the storage region, and stores an image forming mode set by the external apparatus. so as to correspond to the series of image data, and wherein said control means returns the image forming mode of the series of image data changed by said changing means to a state in which it was previously set by the external apparatus in accordance with the predetermined instruction.

14. An image storage apparatus according to claim 1, wherein said storage means can store a plurality of respective series of image data in the storage region, and wherein said control means performs control so that a state where the image forming mode changed by said changing means is to be returned differs depending on each series image data.

15. An image storage apparatus comprising:

storage means for enabling to store a plurality of series of image data in a storage region and storing an image forming mode corresponding to each series of image data; and control means for controlling so as to execute:

a first step of enabling to select one or more series of image data from a plurality of series of image data stored in the storage region, a second step of changing an image forming mode corresponding to the series of image data selected in said first step, and a third step of prohibiting a shift from said first step to said second step so as to prohibit a change of the image forming mode corresponding to the series of image data selected, in accordance with selection of two or more series of image data from said plurality of series of image data stored in the storage region in said first step.

16. An image storage apparatus according to claim 15, wherein said control means can control so as to execute a fourth step of outputting the series of image data selected in said first step to an image forming apparatus for forming an image on a sheet based on image data and an image forming mode corresponding to the image data, and wherein said control means, in said third step, in accordance with selection of two or more series of image data from said plurality of series of image data stored in the storage region in said first step, controls so as to prohibits the shift from said first step to said second step, and causes a shift from said first step to said fourth step so as to cause said image forming apparatus to execute an image forming operation of the series of image data selected in said first step.

17. An image storage apparatus according to claim 15, wherein in said third step, in accordance with selection of a series of image data from said plurality of series of image data stored in the storage region in said first step, a shift from said first step to said second step is allowed, so as to allow a change of the image forming mode corresponding to the series of image data selected.

18. An image storage apparatus according to claim 15, wherein the image forming mode includes a plurality of setting-item data, and wherein, in said second step, each setting item can be changed.

19. An image storage apparatus according to claim 18, wherein the plurality of setting-item data comprise setting data relating to a number of sheets where images are to be formed, setting data relating to whether or not images are to be formed on both surfaces of each of the sheets, and setting data relating to a size of the sheets where images are to be formed.

20. An image storage apparatus according to claim 15, wherein the image forming mode includes a plurality of setting-item data, and wherein, in said second step, an operation of changing setting-item data relating to predetermined processing for image data stored in the storage region is prohibited in advance, and an operation of changing setting-item data not relating to the predetermined processing for the image data is allowed.

21. An image storage apparatus according to claim 20, wherein the setting-item data relating to the predetermined processing for the image data includes setting data relating to magnification changing processing for the image data.

22. An image storage apparatus according to claim 20, wherein the setting-item data not relating to the predetermined processing for the image data includes setting data relating to a number of sheets where images are to be formed.

23. An image storage apparatus according to claim 15, wherein said storage means stores a series of image data output from an external apparatus in the storage region, and stores an image forming mode set by the external apparatus so as to correspond to the series of image data.

24. An image storage apparatus according to claim 15, wherein the image forming mode includes a plurality of setting-item data, wherein said device further comprises determination means for determining whether or not setting-item data which can be changed are present among the plurality of setting-item data, and wherein said control means selectively prohibits an operation of changing the image forming mode in said second step, in accordance with a result of the determination by said determination means.

25. A method for controlling an image storage apparatus including storage means for storing a series of image data in a storage region and storing an image forming mode corresponding to the series of image data, said method comprising:

a changing step of changing the image forming mode for the series of image data stored in the storage region, so as to be available for the series of image data stored in the storage region; and a control step of causing to return the image forming mode for the series of image data changed in said changing step to a state which existed before change in said changing step, so as to be available for the series of image data stored in the storage region, in accordance with a predetermined instruction.

26. A method according to claim 25, wherein the image forming mode includes a plurality of setting-item data for the series of image data, wherein said changing step can change each of the setting-item data, and wherein said control step causes to return all of the setting-item data included in the image forming mode to the state which existed before change in said changing step, so as to be available for the series of image data stored in the storage region, in accordance with the predetermined instruction.

27. A method according to claim 26, wherein the plurality of setting-item data comprise setting data relating to a number of sheets where images are to be formed, setting data relating to whether or not images are to be formed on both surfaces of each of the sheets, setting data relating to aligning processing for the sheets having the images formed thereon, and setting data relating to a size of the sheets where images are to be formed.

28. A method according to claim 25, wherein the image forming mode includes a plurality of setting-item data, wherein said method further comprises a determination step of determining whether or not setting-item data which can be changed is present from among the plurality of setting-item data, and wherein said control step prohibits an operation of changing the image forming mode in said changing step, in accordance with a result of the determination in said determination step.

29. A method according to claim 25, wherein the image forming mode includes a plurality of setting-item data each of which can be changed in said changing step, wherein said method further comprises a determination step of determining whether or not predetermined processing has been performed for the image data before the processing of storing the image data by the storage means, and wherein said control step controls a changing operation in said changing step so as to prohibit a change in one of the plurality of setting-item data, in accordance with a result of the determination in said determination step.

30. A method according to claim 25, further comprising the step of outputting the series of image data stored in the storage region to an image forming apparatus for forming an image on a sheet based on the image data and the image forming mode corresponding to the image data.

31. A method according to claim 25, wherein the image forming mode includes a plurality of setting-item data, and wherein said control step controls a changing operation in said changing step so as to prohibit in advance an operation of changing setting-item data relating to predetermined processing for image data stored in the storage region, and so as to allow an operation of changing setting-item data not relating to the predetermined processing for the image data.

32. A method according to claim 31, wherein the setting-item data relating to the predetermined processing for the image data includes setting data relating to magnification changing processing for the image data.

33. A method according to claim 31, wherein the setting-item data not relating to the predetermined processing for the image data includes setting data relating to a number of sheets where images are to be formed.

34. A method according to claim 25, wherein the storage means can store the series of image data in one of a plurality of storage regions, and wherein a plurality of respective series of image data can be stored in each of the storage regions.

35. A method according to claim 34, wherein the storage means stores an image forming mode so as to correspond to each series of image data stored in the storage region.

36. A method according to claim 35, further comprising a selection step of selecting one of the plurality of respective series of image data stored in the storage region,
  wherein said changing step changes the image forming mode corresponding to the series of image data selected in said selection step,
  and wherein said control step causes to return the image forming mode of the series of image data selected in said selection step and changed in said changing step to a state which existed before change in said changing step, so as to be available for the series of image data selected in said selection step, in accordance with the predetermined instruction.

37. A method according to claim 25, wherein the storage means stores a series of image data output from an external apparatus in the storage region, and stores an image forming mode set by the external apparatus so as to correspond to the series of image data,
  and wherein said control step returns the image forming mode of the series of image data changed in said changing step to a state which was set previously by the external apparatus, in accordance with the predetermined instruction.

38. A method according to claim 25, wherein the storage means can store a plurality of respective series of image data in the storage region,
  and wherein said control step performs control so that a state where the image forming mode changed in said changing step is to be returned differs depending on each series of image data.

39. A method for controlling an image storage apparatus including storage means for enabling to store a plurality of series of image data in a storage region and storing an image forming mode corresponding to each series of image data, said method comprising:
  a first step of enabling to select one or more series of image data from a plurality of series of image data stored in the storage region;
  a second step of changing an image forming mode corresponding to the series of image data selected in said first step; and
  a third step of prohibiting a shift from said first step to said second step so as to prohibit a change of the image forming mode corresponding to the series of image data selected, in accordance with selection of two or more series of image data from said plurality of series of image data stored in the storage region in said first step.

40. A method according to claim 39, further comprising a fourth step of outputting the series of image data selected in said first step to an image forming apparatus for forming an image on a sheet based on image data and an image forming mode corresponding to the image data, and wherein, in said third step, in accordance with selection of two or more series of image data from said plurality of series of image data stored in the storage region in said first step, the shift from said first step to said second step is prohibited, and a shift from said first step to said fourth step, so as to cause said image forming apparatus to execute an image forming operation of the series of image data selected in said first step, is caused.

41. A method according to claim 39, wherein in said third step, in accordance with selection of a series of image data from said plurality of series of image data stored in the storage region in said first step, a shift from said first step to said second step is allowed, so as to allow a change of the image forming mode corresponding to the series of image data selected.

42. A method according to claim 39, wherein the image forming mode includes a plurality of setting-item data, and wherein, in said second step, each setting item can be changed.

43. A method according to claim 42, wherein the plurality of setting-item data comprise setting data relating to a number of sheets where images are to be formed, setting data relating to whether or not images are to be formed on both surfaces of each of the sheets, and setting data relating to a size of the sheets where images are to be formed.

44. A method according to claim 39, wherein the image forming mode includes a plurality of setting-item data, and wherein, in said second step, an operation of changing setting-item data relating to predetermined processing for image data stored in the storage region is prohibited in advance, and an operation of changing setting-item data not relating to the predetermined processing for the image data is allowed.

45. A method according to claim 44, wherein the setting-item data relating to the predetermined processing for the image data includes setting data relating to magnification changing processing for the image data.

46. A method according to claim 44, wherein the setting-item data not relating to the predetermined processing for the image data includes setting data relating to a number of sheets where images are to be formed.

47. A method according to claim 39, wherein the storage means stores a series of image data output from an external apparatus in the storage region, and stores an image forming mode set by the external apparatus so as to correspond to the series of image data.

48. A method according to claim 39, wherein the image forming mode includes a plurality of setting-item data, wherein said method further comprises a determination step of determining whether or not setting-item data which can be changed is present from among the plurality of setting-item data,
  and the step of selectively prohibiting an operation of changing the image forming mode said second step, in accordance with a result of the determination in said determination step.

49. A storage medium, capable of being executed by a computer, storing a program for causing an image storage device, including storage means for storing a series of image data in a storage region and storing an image forming mode corresponding to the series of image data, to execute:
  a changing step of changing the image forming mode for the series of image data stored in the storage region, so as to be available for the series of image data stored in the storage region; and
  a control step of causing to return the image forming mode for the series of image data changed by said changing means to a state which existed before change in said changing step, so as to be available for the series of image data stored in the storage region, in accordance with a predetermined instruction.

50. A storage medium, capable of being read by a computer, storing a program for causing an image storage device, including storage means for enabling to store a plurality of series of image data in a storage region and storing an image forming mode corresponding to each series of image data, to execute:
- a first step of enabling to select one or more series of image data from a plurality of series of image data stored in the storage region;
- a second step of changing an image forming mode corresponding to the series of image data selected in said first step; and
- a third step of prohibiting a shift from said first step to said second step so as to prohibit a change of the image forming mode corresponding to the series of image data selected, in accordance with selection of two or more series of image data from said plurality of series of image data stored in the storage region in said first step.

51. An image storage apparatus according to claim 1, wherein said storage means enables to store a series of image data from an image reader unit in the storage region.

52. An image storage apparatus according to claim 1, wherein said control means causes a display unit to perform first display for inputting the predetermined instruction, and wherein said control means causes the image forming mode to return in response to the predetermined instruction input via the first display performed by the display unit.

53. An image storage apparatus according to claim 15, wherein said storage means enables to store a series of image data from an image reader unit in the storage region.

54. An image storage apparatus according to claim 15, wherein, in said second step, a display unit is caused to perform display for changing the image forming mode, and
  wherein, in said third step, changing of the image forming mode is prohibited by prohibiting execution of the display in said second step.

55. A method according to claim 25, wherein said storage means enables to store a series if image data from an image reader unit in the storage region.

56. A method according to claim 25, wherein, in said control step, a display unit is caused to perform first display for inputting the predetermined instruction, and the image forming mode is caused to return in response to the predetermined instruction input via the first display performed by the display unit.

57. A method according to claim 39, wherein said storage means enables to store a series of image data from an image reader unit in the storage region.

58. A method according to claim 39, wherein, in said second step, a display unit is caused to perform display for changing the image forming mode, and
  wherein, in said third step, changing of the image forming mode is prohibited by prohibiting execution of the display in said second step.

59. A method for controlling an image storage apparatus including storage means for storing a series of image data in a storage region and storing an image forming mode corresponding to the series of image data, said method comprising:
  changing step of changing the image forming mode for the series of image data stored in the storage region, so as to be available for the series of image data stored in the storage region, via to a setting operation by a user, and
  control step of causing to execute first display for inputting a predetermined instruction from the user for causing to return the image forming mode for the series of image data changed in said changing step to a state which existed before change in said changing step so as to be available for the series of image data stored in the storage region, on a display unit.

60. A method according to claim 59, wherein, in said control step, said display unit is caused to execute second display for performing said setting operation by user for allowing a change of the image forming mode for the series of image data stored in the storage region.

61. A method according to claim 60, wherein, in said control step, said display unit is caused to execute said first display and said second display.

62. A method according to claim 61, wherein, in said control step, said display unit is caused to display a setting screen including said first display and said second display.

63. A method according to claim 60, wherein said second display includes information allowing the user to detect the image forming mode.

64. A method according to claim 60, wherein said storage means enables to store at least a series of image data from an image reader unit or a series of image data from an external apparatus in the storage region.

65. A method according to claim 60, further comprising an image forming step of causing an image forming apparatus to form an image using the series of image data in the storage region in accordance with the image forming mode.

66. A method for controlling an image storage apparatus including storage means for enabling to store a plurality of series of image data in a storage region and storing an image forming mode corresponding to each series of image data, said method comprising:
  selection step of enabling to select one or more series of image data from a plurality of series of image data stored in the storage region;
  changing step of changing an image forming mode corresponding to the series of image data selected in said selection step; and
  controlling step of prohibiting a changing process of the image forming mode of the series of image data selected from said plurality of series of image data stored in the storage region via to said selection step in said changing step when a plurality of series of image data are selected from the storage region in said selection step.

67. A method according to claim 66, wherein said changing step changes the image forming mode of the series of image data selected in said selection step, based on an instruction from a user input via to first display on a display unit, and wherein said controlling step causes to prohibit said changing process of the image forming mode of the series of image data selected, by prohibiting execution of the first display by said display unit.

68. A method according to claim 66, wherein said controlling step allows said changing process of the image forming mode of the series of image data selected from said plurality of series of image data stored in the storage region via to said selection step in said changing step when said plurality of series of image data are not selected from the storage region in said selection step.

69. A method according to claim 68, wherein, in said controlling step, an image forming apparatus can be controlled to form an image using the series of image data in the storage region in accordance with the image forming mode, and wherein controlling step causes to execute, all at once, image forming operate of said plurality of series of image data selected from the storage region without involving said changing step when prohibiting of said changing process of the image forming mode of the series of image data and causes to execute image forming operate of said series of image data selected from the storage region via to said changing step when allowing of said changing process of the image forming mode of the series of image data.

70. A method according to claim 66, wherein said storage means enables to store at least a series of image data from an image reader unit or a series of image data from an external apparatus in the storage region.

71. An image storage apparatus comprising:

storage means for storing a series of image data in a storage region and storing an image forming mode corresponding to the series of image data;

changing means for changing the image forming mode for the series of image data stored in the storage region, so as to be available for the series of image data stored in the storage region, via to a setting operation by a user, and control means for causing to execute first display for inputting a predetermined instruction from the user for causing to return the image forming mode for the series of image data changed by said changing means to a state which existed before change by said changing means so as to be available for the series of image data stored in the storage region, on a display unit.

72. An image storage apparatus comprising:

storage means for enabling to store a plurality of series of image data in a storage region and storing an image forming mode corresponding to each series of image data;

selection means for enabling to select one or more series of image data from a plurality of series of image data stored in the storage region;

changing means for changing an image forming mode corresponding to the series of image data selected by said selection means; and controlling means for prohibiting a changing process of the image forming mode of the series of image data selected from said plurality of series of image data stored in the storage region via to said selection means by said changing means when a plurality of series of image data are selected from the storage region by said selection means.

* * * * *

UNITED STATES PATENT AND TRADEMARK OFFICE
CERTIFICATE OF CORRECTION

PATENT NO. : 6,559,967 B1
DATED : May 6, 2003
INVENTOR(S) : Akiba et al.

It is certified that error appears in the above-identified patent and that said Letters Patent is hereby corrected as shown below:

Column 3,
Line 38, "stored" should read -- is stored --.

Column 5,
Line 5, "rcorded" should read -- recorded --.

Column 8,
Line 7, "modes." should read -- modes --.

Column 9,
Line 34, "wil" should read -- will --.

Column 15,
Line 6, "selects s" should read -- selects a --.

Column 16,
Line 19, "synthsis" should read -- synthesis --.

Column 18,
Line 12, "According" should read -- according --.

Column 19,
Line 50, "!hard" should read -- hard --.

Column 21,
Line 14, "frame)." should read -- frame --.
Line 67, "file." may" should read -- file," it may" --.

Column 26,
Line 28, "Like)" should read -- like) --.
Line 36, "(step 41214)." should read -- (step 4214). --.
Line 56, "teh" should read -- the --.

Column 28,
Line 20, "memory." should read -- memory --.

Column 30,
Line 45, "image" should read -- of image --.

UNITED STATES PATENT AND TRADEMARK OFFICE
CERTIFICATE OF CORRECTION

PATENT NO. : 6,559,967 B1
DATED : May 6, 2003
INVENTOR(S) : Akiba et al.

It is certified that error appears in the above-identified patent and that said Letters Patent is hereby corrected as shown below:

<u>Column 31,</u>
Line 8, "prohibits" should read -- prohibit --.

<u>Column 35,</u>
Line 40, "if" should read -- of --.

Signed and Sealed this

Second Day of December, 2003

JAMES E. ROGAN
*Director of the United States Patent and Trademark Office*